US012123421B2

(12) United States Patent
Marsh et al.

(10) Patent No.: US 12,123,421 B2
(45) Date of Patent: Oct. 22, 2024

(54) BENCH-TOP TIME OF FLIGHT MASS SPECTROMETER

(71) Applicant: Micromass UK Limited, Wilmslow (GB)

(72) Inventors: Cedric Marsh, Congleton (GB); Peter Carney, Dukinfield (GB); Jason Lee Wildgoose, Stockport (GB); David Wallis, Trafford (GB); Paul McIver, Trafford (GB); Soji Chummar, Ashton Under Lyne (GB); George Andreas Antoniades, Trafford (GB); Dipesh Mistry, Manchester (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 18/515,728

(22) Filed: Nov. 21, 2023

(65) Prior Publication Data

US 2024/0084805 A1 Mar. 14, 2024

Related U.S. Application Data

(63) Continuation of application No. 17/057,357, filed as application No. PCT/GB2019/051503 on May 31, 2019, now Pat. No. 11,879,470.

(30) Foreign Application Priority Data

May 31, 2018 (GB) ..................................... 1808912

(51) Int. Cl.

*F04D 19/04* (2006.01)
*F04D 29/12* (2006.01)
*F04D 29/70* (2006.01)
*H01J 49/24* (2006.01)
*H01J 49/40* (2006.01)

(52) U.S. Cl.

CPC ......... *F04D 19/042* (2013.01); *F04D 29/122* (2013.01); *F04D 29/701* (2013.01); *H01J 49/24* (2013.01); *H01J 49/405* (2013.01)

(58) Field of Classification Search

CPC ........ F16J 15/127; H01J 49/24; H01J 49/147; H01J 49/02; H01J 49/405; H01J 37/08; H01J 37/3171; H01J 2237/006; H01J 2237/017; H01J 2237/022; H01J 2237/082; H01J 2237/083; H01J 2237/0812; H01J 2237/0815; H01J 2237/0827; H01J 2237/31701

See application file for complete search history.

(56) References Cited

U.S. PATENT DOCUMENTS 10,058,014 B1 * 8/2018 Connor ................ H05K 9/0015
2006/0272776 A1 * 12/2006 Horsky .................. C23C 14/48 156/345.37

FOREIGN PATENT DOCUMENTS

EP 1272024 A1 * 1/2003 ............ B32B 15/08

* cited by examiner

*Primary Examiner* — David E Smith
*Assistant Examiner* — Hsien C Tsai
(74) *Attorney, Agent, or Firm* — Goodwin Procter LLP

(57) ABSTRACT

A mass spectrometer comprising: a vacuum housing comprising a first vacuum chamber having a first gas exhaust port; a gas pump (1700) having a first gas inlet port connected to the first gas exhaust port (H1) by a first gas conduit for evacuating the first vacuum chamber, and a first apertured cover (2010) arranged over the first gas exhaust port (H1) or first gas inlet port, or in the first gas conduit therebetween.

19 Claims, 43 Drawing Sheets

Fig. 16F

| Control Name | Relative voltage | | | Absolute volatge range (V) | Polarity* |
|---|---|---|---|---|---|
| | Range from (V) | Range (V) | w.r.t. | | |
| Capillary | 0 | 1500 | Ground | 1500 | Same |
| Source offset | 0 | 30 | Step 1 gradient | 400 | Same |
| Step 1 gradient | 0 | 30 | Step 1 offset | 370 | Same |
| Step 1 offset | 0 | 40 | Step 2 offset (cone) | 340 | Same |
| Step 2 gradient | 0 | 40 | Step 2 offset (cone) | 340 | Same |
| Step 2 offset (cone) | 0 | 200 | Aperture 1 | 300 | Same |
| Aperture 1 | 0 | 10 | Ion guide gradient | 100 | Same |
| Ion guide gradient | 0 | 5 | Ion guide offset A | 90 | Same |
| Ion guide offset A | 0 | 5 | Ion guide offset B (entrance) | 85 | Same |
| Ion guide offset B (entrance) | 0 | 80 | Ground | 80 | Same |
| Aperture 2 | 0 | 10 | Ion guide offset (entrance) | 80 | Opposite |
| Aperture 2 trap | 0 | 10 | Ion guide offset (entrance) | 90 | Same |
| Acceleration 1 | 0 | 100 | Ion guide offset (entrance) | 80 | Opposite |
| Acceleration 2 | 0 | 100 | Ion guide offset (entrance) | 80 | Opposite |
| Aperture 3 | 0 | 0 | Ground | 0 | n/a |
| Transport 1 | 0 | 100 | Ion guide offset (entrance) | 80 | Opposite |
| Transport 2 | 0 | 100 | Ion guide offset (entrance) | 85 | Opposite |
| Steering | -5 | 5 | Transport 2 | 85 | Opposite |
| Tube lens | 0 | 0 | Ground | 0 | n/a |
| Entrance plate | 0 | 0 | Ground | 0 | n/a |
| Pusher | 0 | 1100 | Ground | 1000 | Same |
| Pusher offset | -5 | 5 | Ground | 10 | Same |
| Third grid | 0 | 0 | Ground | 0 | n/a |
| Second grid | 0 | 0 | Ground | 0 | n/a |
| Flight tube | 0 | 4500 | Ground | 4500 | Opposite |
| Reflectron grid | 0 | 0 | Ground | 0 | n/a |
| Reflectron | 0 | 1725 | Ground | 1725 | Same |
| Detector | 0 | 4000 | Flight tube | 8500 | Positive |

BENCH-TOP TIME OF FLIGHT MASS SPECTROMETER

CROSS-REFERENCE TO RELATED APPLICATIONS

This application is a continuation of U.S. patent application Ser. No. 17/057,357, filed Nov. 20, 2020, which is a U.S. national phase filing claiming the benefit of and priority to International Patent Application No. PCT/GB2019/051503, filed May 31, 2019, which claims priority from and the benefit of United Kingdom Patent Application No. 1808912.8 filed on May 31, 2018. The entire contents of these applications are incorporated herein by reference.

FIELD OF THE INVENTION

The present invention relates generally to mass spectrometry and in particular to a small footprint or bench-top Time of Flight ("TOF") mass spectrometer which has 15 particular application in the biopharmaceutical industry.

BACKGROUND

Conventional mass spectrometers which may be used, for example, in the biopharmaceutical industry tend to be relatively complex and have a relatively large footprint. Scientists in the biopharmaceutical industry need to collect high resolution accurate mass data for their samples in order to provide more comprehensive information than can be obtained using LCUV analysis. Conventionally, this is typically achieved either by running relatively complex mass spectrometry equipment or by outsourcing the analysis to a specialist service.

It is desired to provide a reduced footprint Time of Flight ("TOF") mass spectrometer which may have particular application in the biopharmaceutical industry.

SUMMARY

From a first aspect, the present invention provides a mass spectrometer comprising: a vacuum housing comprising a first vacuum chamber having a first gas exhaust port; a gas pump having a first gas inlet port connected to the first gas exhaust port by a first gas conduit for evacuating the first vacuum chamber; and a first apertured cover arranged over the first gas exhaust port or first gas inlet port, or in the first gas conduit therebetween.

The apertured cover is configured to allow gas to pass therethrough, from the first gas exhaust port of the first vacuum chamber to the first gas inlet port of the gas pump. The first apertured cover may comprise one or more meshed portion for allowing the gas to pass therethrough. The first apertured cover may also comprise one or more solid portion.

The cover may also prevent solid objects from falling into the first gas pump inlet port (e.g. during maintenance).

The first apertured cover may be electrically conductive so as to prevent electric fields passing therethrough and entering the first gas inlet port and/or first gas exhaust port, through the first gas conduit. This reduces or eliminates electrical pickup in the system, which may otherwise adversely affect the detector or other electrical components. For example, RF electric fields from ion guides or other electronic components arranged in the vacuum housing are prevented from entering the first gas inlet port of the pump by the first apertured cover. This prevents these electric fields from being picked up by the electronics of the gas pump and transmitted as electrical signals to other components of the spectrometer.

The first apertured cover may comprise a main body portion having apertures through which said gas passes and a plurality of protrusions extending away from the main body portion to respective free ends that are arranged in contact with the housing of the gas pump and/or vacuum housing.

The multiple protrusions on the first apertured cover provide multiple respective electrical contact points between the cover and the pump housing and/or vacuum housing. This ensures that electrical charges do not build up on the cover, even if one or some of the contact points provided by the protrusions are compromised.

The vacuum housing and/or pump housing may be electrically grounded, thereby grounding the first apertured cover via the protrusions.

The protrusions may be elongated fingers extending away from the main body portion.

The main body may be substantially planar and extend in a first plane, and the protrusions may be substantially planar and extend in one or more other plane angled relative to the plane of the main body. This arrangement of protrusions allows, for example, the cover to be seated in the gas inlet port or gas exhaust port without the cover falling through the port. The angled configuration of the protrusions also enables the covers to be fitted into the port easily, whilst making electrical contact with surrounding gas pump housing and/or vacuum housing.

The protrusions may be flexible relative to the main body and/or relative to each other.

The cover may have multiple sides and may have one or more protrusions extending from each of at least some of the sides.

As described above, the cover may prevent solid objects from falling into the pump gas inlet port.

The first apertured cover may be arranged substantially horizontally. At least the main body of the first apertured cover may be arranged substantially horizontally.

The gas pump may be mounted to the vacuum housing and the first apertured cover may be provided at the interface between the gas pump and the vacuum housing. This allows easy access to the cover by removal of the turbopump away from the vacuum housing, e.g. to expose the cover and retrieve objects that have fallen onto it.

The gas pump may be removably mounted to the vacuum housing. For example, the mounting may be such that the gas pump can be repeatedly connectable and disconnectable from the vacuum housing.

The first gas inlet port in the gas pump may be arranged coaxially with the first gas exhaust port in the first vacuum chamber.

The axes of the first gas inlet port and first gas exhaust port may be vertical.

The vacuum housing may comprise a second vacuum chamber having a second gas exhaust port. The gas pump may have a second gas inlet port connected to the second gas exhaust port by a second gas conduit for evacuating the second vacuum chamber; and a second apertured cover may be arranged over the second gas exhaust port or second gas inlet port, or in the second gas conduit therebetween.

The first and second vacuum chambers may be adjacent one another and separated by a differential pumping aperture.

The gas pump housing has a first side, and the first and second gas inlet ports may be provided in the first side.

The second apertured cover is configured to allow gas to pass therethrough, from the second gas exhaust port of the second vacuum chamber to the second gas inlet port of the gas pump. The second apertured cover may comprise one or more meshed portion for allowing the gas to pass therethrough. The second apertured cover may also comprise one or more solid portion.

The second apertured cover may also prevent solid objects from falling into the second gas pump inlet port (e.g. during maintenance).

The second apertured cover may be electrically conductive so as to prevent electric fields passing therethrough and entering the second gas inlet port and/or second gas exhaust port through the second gas conduit. This reduces or eliminates electrical pickup in the system, which may otherwise adversely affect the detector or other electrical components. For example, RF electric fields from ion guides or other electronic components arranged in the vacuum housing are prevented from entering the second gas inlet port of the pump by the second apertured cover. This prevents these electric fields from being picked up by the electronics of the gas pump and transmitted as electrical signals to other components of the spectrometer.

The second apertured cover may comprise a main body portion having said apertures through which said gas passes and a plurality of protrusions extending away from the main body portion to respective free ends that are arranged in contact with the housing of the gas pump and/or vacuum housing.

The multiple protrusions on the second apertured cover may provide multiple respective electrical contact points between the cover and the pump housing and/or vacuum housing. This ensures that electrical charges do not build up on the cover, even if one or some of the contact points provided by the protrusions are compromised.

The vacuum housing and/or pump housing may be electrically grounded, thereby grounding the second apertured cover via its protrusions.

The protrusions may be elongated fingers extending away from the main body portion.

The main body of the second apertured cover may be substantially planar and extends in a first plane, and its protrusions may be substantially planar and extend in one or more other plane angled relative to the plane of the main body. This arrangement of protrusions allows, for example, the cover to be seated in the second gas inlet port or second gas exhaust port without the second cover falling through the port. The angled configuration of the protrusions also enables the covers to be fitted into the port easily, whilst making electrical contact with surrounding gas pump housing and/or vacuum housing.

The protrusions may be flexible relative to the main body and/or relative to each other.

The second cover may have multiple sides and may have one or more protrusions extending from each of at least some of the sides.

As described above, the second cover may prevent solid objects from falling into the second gas inlet port.

The second apertured cover may be arranged substantially horizontally.

At least the main body of the second apertured cover may be arranged substantially horizontally.

The gas pump may be mounted to the vacuum housing and the second apertured cover may be provided at the interface between the gas pump and the vacuum housing. This allows easy access to the cover by removal of the turbopump away from the vacuum housing, e.g. to expose the cover and retrieve objects that have fallen onto it. For example, the gas pump may be removably mounted to the vacuum housing.

The second gas inlet port in the gas pump may be arranged coaxially with the second gas exhaust port in the first vacuum chamber.

The axes of the second gas inlet port and second gas exhaust port may be vertical.

The vacuum housing may comprise a further vacuum chamber having a further gas exhaust port; wherein the gas pump has a further gas inlet port connected to the further gas exhaust port by a further gas conduit for evacuating the further vacuum chamber; and a further apertured cover may be arranged over the further gas exhaust port or further gas inlet port, or in the further gas conduit therebetween.

The second and further vacuum chambers may be adjacent one another and separated by a differential pumping aperture.

The gas pump housing may have a first side in which the first gas inlet port is provided and a second side in which said further gas inlet port is provided.

The first and second sides may be substantially orthogonal to each other.

The spectrometer may comprise a Time of Flight mass analyser in said further vacuum port. However, other forms of mass analyser are contemplated herein.

The further apertured cover is configured to allow gas to pass therethrough, from the further gas exhaust port of the further vacuum chamber to the further gas inlet port of the gas pump. The further apertured cover may comprise one or more meshed portion for allowing the gas to pass therethrough. The further apertured cover may also comprise one or more solid portion.

The further apertured cover may also prevent solid objects from passing into the further gas pump inlet port.

The further apertured cover may be electrically conductive so as to prevent electric fields passing therethrough and entering the further gas inlet port and/or further gas exhaust port through the further gas conduit. This reduces or eliminates electrical pickup in the system, which may otherwise adversely affect the detector or other electrical components. For example, RF electric fields from electronic components arranged in the vacuum housing are prevented from entering the further gas inlet port of the pump by the further apertured cover. This prevents these electric fields from being picked up by the electronics of the gas pump and transmitted as electrical signals to other components of the spectrometer.

The further apertured cover may comprise a main body portion having said apertures through which said gas passes and a plurality of protrusions extending away from the main body portion to respective free ends that are arranged in contact with the housing of the gas pump and/or vacuum housing.

The multiple protrusions on the further apertured cover may provide multiple respective electrical contact points between the cover and the pump housing and/or vacuum housing. This ensures that electrical charges do not build up on the cover, even if one or some of the contact points provided by the protrusions are compromised.

The vacuum housing and/or pump housing may be electrically grounded, thereby grounding the further apertured cover via its protrusions.

The protrusions may be elongated fingers extending away from the main body portion.

The main body of the further apertured cover may be substantially planar and extends in a first plane, and its protrusions may be substantially planar and extend in the same plane.

The protrusions may be flexible relative to the main body and/or relative to each other.

The further cover may have multiple sides and may have one or more protrusions extending from each of at least some of the sides, or may circular or oval.

The further apertured cover may be arranged substantially vertically.

The further gas inlet port in the gas pump may be arranged coaxially with the further gas exhaust port in the further vacuum chamber.

The axes of the second gas inlet port and second gas exhaust port may be vertical.

The further cover may be secured to the vacuum housing with fixing members (e.g. screws or bolts) that extend through a peripheral region of the further apertured cover and into the inner wall of the housing.

The further apertured cover may therefore be sized so as to be larger than the further gas exhaust port and have a peripheral region surrounding the further gas exhaust port. The peripheral region may be a non-meshed portion (i.e. substantially solid), so that the fixing members may secured therethrough.

The protrusions may be provided at the circumferential edge of the further apertured cover and the further cover may have radial slots therein between at least some of the protrusions such that the protrusions are capable of flexing relative to each other.

The first aspect of the present invention also provides a method of mass spectrometry comprising: providing the spectrometer described above; and operating the gas pump so as to draw gas from said first vacuum chamber, through said first gas exhaust port, through said first gas conduit, and into said first gas inlet port, wherein the gas passes through said first apertured cover.

From a second aspect the present invention provides a mass spectrometer comprising: a vacuum housing; a gas pump arranged for evacuating gas from the vacuum housing; and an electrically conductive gasket arranged between the vacuum housing and the housing of the gas pump; wherein the electrically conductive gasket is compressible.

The compressible, conductive gasket may be compressed between two surfaces and hence allows the gas pump housing to be positioned in a range of different positions relative to vacuum housing, whilst maintaining electrical contact therebetween. The conductive gasket thereby facilitates easy mounting of the gas pump to the vacuum housing, whilst preventing a potential difference building up between these components. The conductive shielding may also prevent electric fields passing therethrough.

At least the external surface of the conductive gasket may be an electrically conductive fabric or wire mesh.

The conductive gasket may be resiliently compressible.

The conductive gasket may have a compressible foam core.

The spectrometer may further comprise a vacuum gasket seal between the gas pump housing and the vacuum housing proximate the conductive gasket.

The vacuum housing has a first gas exhaust port in a wall thereof and the gas pump has a first gas inlet port for evacuating the vacuum housing through the first gas exhaust port. The spectrometer may comprise an adaptor member arranged between the vacuum housing and the gas pump, wherein the adaptor member has a first side mounted to the vacuum housing about the first gas exhaust port and a second side mounted to the gas pump housing about the first gas inlet port.

The spectrometer may comprise a first vacuum sealing gasket arranged between the adaptor member and the vacuum housing for maintaining a vacuum seal therebetween and around the first gas exhaust port; and/or a second vacuum sealing gasket arranged between the adaptor member and the gas pump housing for maintaining a vacuum seal therebetween around the first gas inlet port.

The first vacuum sealing gasket may be arranged between the first side of the adaptor member and the vacuum housing and/or the second vacuum sealing gasket may be arranged between the second side of the adaptor member and the gas pump housing.

The conductive gasket may be provided between the gas pump housing and the adaptor member.

The adaptor member may be a substantially tubular member having its axis therethrough substantially aligned with an axis through the first gas exhaust port and/or first gas inlet port; and the gas pump housing may have a tubular flange arranged and configured be mounted around the outside or inside of the tubular adaptor member.

A vacuum sealing gasket may be arranged between the tubular flange and tubular adaptor for maintaining a vacuum seal therebetween around the first gas inlet port.

In the embodiments in which the tubular flange is mounted around the outside of the tubular adaptor member, the vacuum sealing gasket may be arranged between the tubular flange and tubular adaptor on a radially outer surface of the adaptor member. Alternatively, or additionally, a vacuum sealing gasket may be arranged between the tubular flange and tubular adaptor on a radially inner surface of the tubular flange. In the embodiments in which the tubular flange is mounted inside of the tubular adaptor member, the vacuum sealing gasket may be arranged between the tubular flange and tubular adaptor on a radially inner surface of the adaptor member. Alternatively, or additionally, a vacuum sealing gasket may be arranged between the tubular flange and tubular adaptor on a radially outer surface of the tubular flange.

The vacuum sealing gasket, gas pump housing and adaptor member may be configured so to enable the axis of the tubular flange to pivot relative to the axis of the tubular adaptor whilst maintaining the vacuum seal around the first gas inlet port.

The compressible conductive gasket may be in contact with both the tubular flange and tubular adaptor and be compressible so as to enable the axis of the tubular flange to pivot relative to the axis of the tubular adaptor whilst maintaining said contact. For example, the tubular flange may extend from the main body of the pump housing to a distal end and may have an internal diameter that increases as a function of distance towards the distal end, so as to allow the tubular flange to pivot relative to the axis of the tubular adaptor mounted inside the flange.

The adaptor member may be a separate and discrete component to the vacuum housing and the gas pump.

The vacuum housing comprises a first vacuum chamber having a first gas exhaust port in a wall thereof and the gas pump has a first gas inlet port for evacuating the first vacuum chamber through the first gas exhaust port. The vacuum housing may comprise a further vacuum chamber having a further gas exhaust port in a wall thereof and the gas pump may have a further gas inlet port for evacuating the further vacuum chamber through the further gas exhaust port. The first gas inlet port is arranged in a first side of the gas pump and the further gas inlet port may be arranged in a second side of the gas pump. The gas pump is mounted to the vacuum housing such that said first gas inlet port is in fluid communication with the first gas exhaust port, and the further gas inlet port is in fluid communication with the further gas exhaust port.

The first gas inlet port may be coaxial or otherwise aligned with the first gas exhaust port, and the further gas inlet port may be coaxial or otherwise aligned with the further gas exhaust port.

The first and second sides of the gas pump may be substantially orthogonal to each other.

The spectrometer may comprise a vacuum sealing gasket between the second side of the gas pump housing and the vacuum housing for vacuum sealing the gas pump housing to the vacuum housing around the further gas inlet port and further gas exhaust port.

The second aspect of the invention also provides a method of mass spectrometry comprising; providing the spectrometer described above; and evacuating gas from the vacuum housing using the gas pump.

The method may comprise mounting the gas pump to the vacuum housing, and compressing said conductive gasket during said mounting.

From a third aspect the present invention provides a mass spectrometer comprising: a main chassis having components mounted thereon; and a cover panel mounted to the chassis so as to cover said components; wherein the cover panel comprises at least one hook protruding inwardly from its internal surface, and the chassis comprises at least one complementary slot that is arranged and configured to receive the at least one hook therein so as to secure the cover panel to the main chassis.

The spectrometer of the present invention enables the cover panel to be removed and reinstalled on the chassis quickly and easily, e.g. for maintenance of the internal components. The use of such slots and hooks enables the number of fixings used to secure to the cover panel to the chassis to be reduced. As a result, the service time to remove the cover panels and the cost of the fixings are reduced.

The internal components of the spectrometer are mounted either directly or indirectly to the main chassis. For example, the spectrometer comprises a vacuum housing in which ion optics are located, wherein the vacuum housing is mounted to the main chassis.

The cover panel is secured to and around the chassis so as to house the internal components of the spectrometer.

The cover panel may be metal and may be electrically grounded, e.g. by being in electrical contact with the electrically grounded main chassis.

Each said at least one hook may include a projecting portion that protrudes away from said internal surface and an elongated distal end portion that extends substantially parallel to the internal surface to which it is connected. The slot may be elongated in a corresponding direction to the hook distal end portion, and the slot may be dimensioned orthogonal to its longitudinal axis such that it narrows from a wider portion towards one of its ends to a narrower portion towards the other of its ends. This allows the distal portion of the hook to be inserted into the slot relatively easily at the wider end of the slot.

The slot may be dimensioned orthogonal to its longitudinal axis such that it tapers down in width from said wider portion to said narrower portion.

The projecting portion of the hook may have a thickness orthogonal to the longitudinal axis of the slot that is substantially the same as the corresponding dimension of the narrower portion of the slot. This allows the distal portion of the hook to be inserted into the slot relatively easily at the wider end of the slot, but when the hook is slid towards the narrower end of the slot, the projecting portion becomes confined by the narrower portion of the slot and held tight in the dimension orthogonal to the longitudinal axis.

The distal end portion of the hook may have a side facing towards the internal surface of the cover panel, wherein the distance between said side facing towards the internal surface and the cover panel decreases as a function of direction towards the projecting portion.

The gap between the distal end portion of the hook and the internal surface of the cover panel, adjacent the projecting portion of the hook, may be substantially the same as the thickness of the chassis material in the portion at which the slot is located. As such, when the hook is slid relative to the slot, the configuration of the distal end portion of the hook pulls the cover panel towards the chassis.

The main chassis may comprises an elongated beam in which the slot is located and the cover panel may comprise a flange extending from its internal surface and that is substantially parallel to the hook. The flange may be arranged and configured to sit against a side of the beam on the chassis in a position such that the hook is located at substantially the same distance from the side of the beam as the distance that the slot is located from the side of the beam.

The flange may therefore be placed against the side of the beam for guiding the hook into the slot. If the flange is horizontal, the flange also allows the weight of the cover panel to be supported on the beam of the chassis.

The slot and hook may be located such that they are substantially vertically oriented, and the slot may narrows as a function of distance in the downwards direction and/or the distal end of the hook points downwards.

The cover panel may comprise a plurality of hooks such as that described above and the chassis may have a corresponding plurality of respective slot such as that described above.

The spectrometer may comprise a plurality of panels secured to the main chassis, each of the type described above.

The main chassis may comprise one or more electrical contact configured to flex inwards as the cover panel is moved against it and secured to the chassis.

The one or more electrical contact may be biased outwardly in a direction towards the cover panel. The flexible contacts ensure that electrical contact is maintained even after the cover panel has been removed and replaced multiple times.

Each of the one or more electrical contact may be formed by a cut out in the main chassis so as to form a tab from the chassis material.

The cut-out may be substantially U-shaped, or comprise a substantially U-shaped portion, so as to form a flexible tab having a free end for engaging the adjacent cover panel.

The cover panel may comprise one or more electrical contact configured to flex outwards as the cover panel is moved against the main chassis and secured to it.

The one or more electrical contact in the cover may be biased inwardly in a direction towards the main chassis.

Each of the one or more electrical contact in the cover panel may be formed by a cut out in the cover panel so as to form a tab from the panel material. The cut-out may be substantially U-shaped, or comprise a substantially U-shaped portion, so as to form a flexible tab having a free end for engaging the main chassis.

The chassis and/or cover panel is electrically grounded.

From a fourth aspect the present invention provides a mass spectrometer comprising: a main housing that houses a Time of Flight mass analyser, the main housing having an aperture through a wall thereof; a voltage supply module mounted to the main housing adjacent the aperture; and an electrical feed-through extending through the aperture that electrically connects the voltage supply module and the mass analyser; wherein a gasket seal is provided in the aperture around the electrical feed-through.

This enables the voltage supply for the mass analyser to be mounted outside of the main housing, thereby reducing or eliminating electric fields from the voltage supply from causing interference with the electronics of the mass analyser, such as the electronics of the ion detector.

The gasket seal may be configured to prevent electric fields passing therethrough and/or is a vacuum seal around the electrical feed-through.

The mass analyser comprises a time of flight region and a pusher assembly for receiving ions and pulsing them into the time of flight region; and the voltage supply module may be electrically connected to the pusher assembly through said aperture.

The pusher assembly may be located in the main housing adjacent to the aperture.

The voltage supply module may be configured to be detachable from the main housing.

The spectrometer may be configured so that the voltage supply module is repeatedly detachable from, and attachable to, the main housing.

The main housing may be a vacuum housing.

The voltage supply module comprises a voltage supply and associated electronics for supplying the required voltages to the mass analyser.

The voltage supply module may comprise: a casing that houses a voltage supply; a window through a wall of the casing in a side of the module facing the aperture in the main housing; and a contact electrode arranged proximate the window so as to contact the electrical feed-through when the voltage supply module is mounted to the main housing.

The contact electrode may be biased in a direction outwards through the window, such as being a spring-loaded electrode.

The contact electrode may be a pin electrode.

The arrangement of the electrical feed-through and gasket on the main housing, and the contact electrode in the window of the voltage supply module, enables the voltage supply module to be electrically connected to, and disconnected from, the main housing relatively easily and quickly.

The voltage supply module may be connected to the main housing such that the window in said casing is arranged over the gasket seal in the wall of the main housing.

The gasket seal in the aperture of the main housing may protrude through the window in the casing of the voltage supply module.

The external wall of the main housing may comprises one or more further gasket seal arranged at the interface between the main housing and the voltage supply module, and surrounding said aperture in the main housing and said window in the casing of the voltage supply module, wherein the one or more further gasket seal is configured to prevent electrical fields passing therethrough and/or to form a vacuum seal; and/or wherein the external wall of the voltage supply module may comprise one or more further gasket seal arranged at the interface between the main housing and the voltage supply module, and surrounding said aperture in the main housing and said window in the casing of the voltage supply module, wherein the one or more further gasket seal is configured to prevent electrical fields passing therethrough and/or to form a vacuum seal.

The voltage supply module may be mounted to the main housing such that a gap is maintained between the wall of the main housing in which the aperture is located and the window of the high voltage supply module.

The mass analyser has been described as a Time of Flight mass analyser, in which the voltage supply is required to supply relatively high voltages and hence it is desired to provide the voltage supply outside of the main housing. However, it is contemplated that other types of mass analyser may be used.

Although a voltage supply module has been described, the module may house electronics other than those for a voltage supply and that may communicate with the mass analyser or alternatively electronics inside the main housing other than a mass analyser.

From a fifth aspect the present invention provides a mass spectrometer comprising: a main housing that houses a mass analyser having an ion detector, the main housing having an aperture through a wall thereof; an electronics module mounted to the main housing adjacent the aperture, wherein the electronics module comprises a base plate and a box-cover connected to the base plate that form a casing that houses amplification electronics for amplifying an ion signal from the ion detector, the casing having an aperture therethrough; and an electrical feed-through extending through the apertures in the main housing and electronics module that electrically connects the amplification electronics to the ion detector.

The (pre-) amplification electronics module of the embodiments provides easy access to the amplification electronics therein, and easy mounting and demounting of the amplification electronics. The structure of the module provides the required electromagnetic screening and also a relatively robust structure, whilst being easy to fabricate.

The amplification electronics may be configured to amplify the ion signal from the ion detector before the ion signal is processed by an analogue-to-digital converter. Conventionally, such electronics have been mounted in a bespoke casing having a lid formed from a conductive grid that prevents electric fields from entering or leaving the casing. However, such housings are relatively fragile, complex and difficult to access.

The spectrometer may further comprise an analogue-to-digital converter arranged and configured to receive and process an amplified ion signal from the amplification electronics module.

The base plate and/or box-cover may be formed from conductive sheet metal for preventing electric fields from entering or leaving the module.

The box-cover may be releasably connected to the base plate such that it is separable from the base plate in order to access the amplification electronics therein.

The amplification electronics may be mounted to the interior surface of the box-cover. This mounting may be performed with removable fixtures so that the electronics may be removed from the box-cover for maintenance.

A gasket seal may be provided in the aperture in the main housing and/or electronics module, around the electrical feed-through. The gasket seal may be configured to prevent electric fields passing therethrough and/or may be a vacuum seal around the electrical feed-through.

The electronics module may be configured to be detachable from the main housing.

The spectrometer may be configured so that the electronics module is repeatedly detachable from, and attachable to, the main housing.

The main housing may be a vacuum housing.

Although an amplification electronics module has been described, the module may alternatively house electronics other than those for amplifying an ion signal and that may communicate with the mass analyser or alternatively electronics inside the main housing other than a mass analyser.

According to various embodiments a relatively small footprint or compact Time of Flight ("TOF") mass spectrometer ("MS") or analytical instrument is provided which has a relatively high resolution. The mass spectrometer may have particular application in the biopharmaceutical industry and in the field of general analytical Electrospray Ionisation ("ESI") and subsequent mass analysis. The mass spectrometer according to various embodiments is a high performance instrument wherein manufacturing costs have been reduced without compromising performance.

The instrument according to various embodiments is particularly user friendly compared with the majority of other conventional instruments. The instrument may have single button which can be activated by a user in order to turn the instrument ON and at the same time initiate an instrument self-setup routine. The instrument may, in particular, have a health diagnostics system which is both helpful for users whilst providing improved diagnosis and fault resolution.

According to various embodiments the instrument may have a health diagnostics or health check which is arranged to bring the overall instrument, and in particular the mass spectrometer and mass analyser, into a state of readiness after a period of inactivity or power saving. The same health diagnostic system may also be utilised to bring the instrument into a state of readiness after maintenance or after the instrument switches from a maintenance mode of operation into an operational state. Furthermore, the health diagnostics system may also be used to monitor the instrument, mass spectrometer or mass analyser on a periodic basis in order to ensure that the instrument in operating within defined operational parameters and hence the integrity of mass spectral or other data obtained is not compromised.

The health check system may determine various actions which either should automatically be performed or which are presented to a user to decide whether or not to proceed with. For example, the health check system may determine that no corrective action or other measure is required i.e. that the instrument is operating as expected within defined operational limits. The health check system may also determine that an automatic operation should be performed in order, for example, to correct or adjust the instrument in response to a detected error warning, error status or anomaly. The health check system may also inform the user that the user should either take a certain course of action or to give approval for the control system to take a certain course of action. Various embodiments are also contemplated wherein the health check system make seek negative approval i.e. the health check system may inform a user that a certain course of action will be taken, optionally after a defined time delay, unless the user instructs otherwise or cancels the proposed action suggested by the control system.

Embodiments are also contemplated wherein the level of detail provided to a user may vary dependent upon the level of experience of the user. For example, the health check system may provide either very detailed instructions or simplified instructions to a relatively unskilled user.

The health check system may provide a different level of detail to a highly skilled user such as a service engineer. In particular, additional data and/or instructions may be provided to a service engineer which may not be provided to a regular user. It is also contemplated that instructions given to a regular user may include icons and/or moving graphical images. For example, a user may be guided by the health check system in order to correct a fault and once it is determined that a user has completed a step then the control system may change the icon and/or moving graphical images which are displayed to the user in order to continue to guide the user through the process.

The instrument according to various embodiments has been designed to be as small as possible whilst also being generally compatible with existing UPLC systems. The instrument is easy to operate and has been designed to have a high level of reliability. Furthermore, the instrument has been designed so as to simplify diagnostic and servicing thereby minimising instrument downtime and operational costs.

According to various embodiments the instrument has particular utility in the health services market and may be integrated with Desorption Electrospray Ionisation ("DESI") and Rapid Evaporative Ionisation Mass Spectrometry ("REIMS") ion sources in order to deliver commercially available In Vitro Diagnostic Medical Device ("IVD")/Medical Device ("MD") solutions for targeted applications.

The mass spectrometer may, for example, be used for microbe identification purposes, histopathology, tissue imaging and surgical (theatre) applications.

The mass spectrometer has a significantly enhanced user experience compared with conventional mass spectrometers and has a high degree of robustness. The instrument is particularly easy to use (especially for non-expert users) and has a high level of accessibility.

The mass spectrometer has been designed to integrate easily with liquid chromatography ("LC") separation systems so that a LC-TOF MS instrument may be provided. The instrument is particularly suited for routine characterisation and monitoring applications in the biopharmaceutical industry. The instrument enables non-expert users to collect high resolution accurate mass data and to derive meaningful information from the data quickly and easily. This results in improved understanding of products and processes with the potential to shorten time to market and reduce costs.

The instrument may be used in biopharmaceutical last stage development and quality control ("QC") applications. The instrument also has particular application in small molecule pharmaceutical, food and environmental ("F&E") and chemical materials analyses.

The instrument has enhanced mass detection capabilities i.e. high mass resolution, accurate mass and an extended mass range. The instrument also has the ability to fragment parent ions into daughter or fragment ions so that MS/MS type experiments may be performed.

BRIEF DESCRIPTION OF THE DRAWINGS

Various embodiments together with other arrangements given for illustrative purposes only will now be described, by way of example only, and with reference to the accompanying drawings in which:

FIG. 16F illustrates the relative voltages and absolute voltage ranges at which the various ion optical components such as the Electrospray capillary probe, differential pumping apertures, transfer lens electrodes, pusher electrodes, reflectron electrodes and the detector are maintained according to various embodiments.

DETAILED DESCRIPTION

Various aspects of a newly developed mass spectrometer are disclosed. The mass spectrometer comprises a modified and improved ion inlet assembly, a modified first ion guide, a modified quadrupole rod set ion guide, improved transfer optics, a novel cantilevered time of flight arrangement, a modified reflectron arrangement together with advanced electronics and an improved user interface.

The mass spectrometer has been designed to have a high level of performance, to be highly reliable, to offer a significantly improved user experience compared with the majority of conventional mass spectrometers, to have a very high level of EMC compliance and to have advanced safety features.

The instrument comprises a highly accurate mass analyser and overall the instrument is small and compact with a high degree of robustness. The instrument has been designed to reduce manufacturing cost without compromising performance at the same time making the instrument more reliable and easier to service. The instrument is particularly easy to use, easy to maintain and easy to service. The instrument constitutes a next-generation bench-top Time of Flight mass spectrometer.

Figure 1:
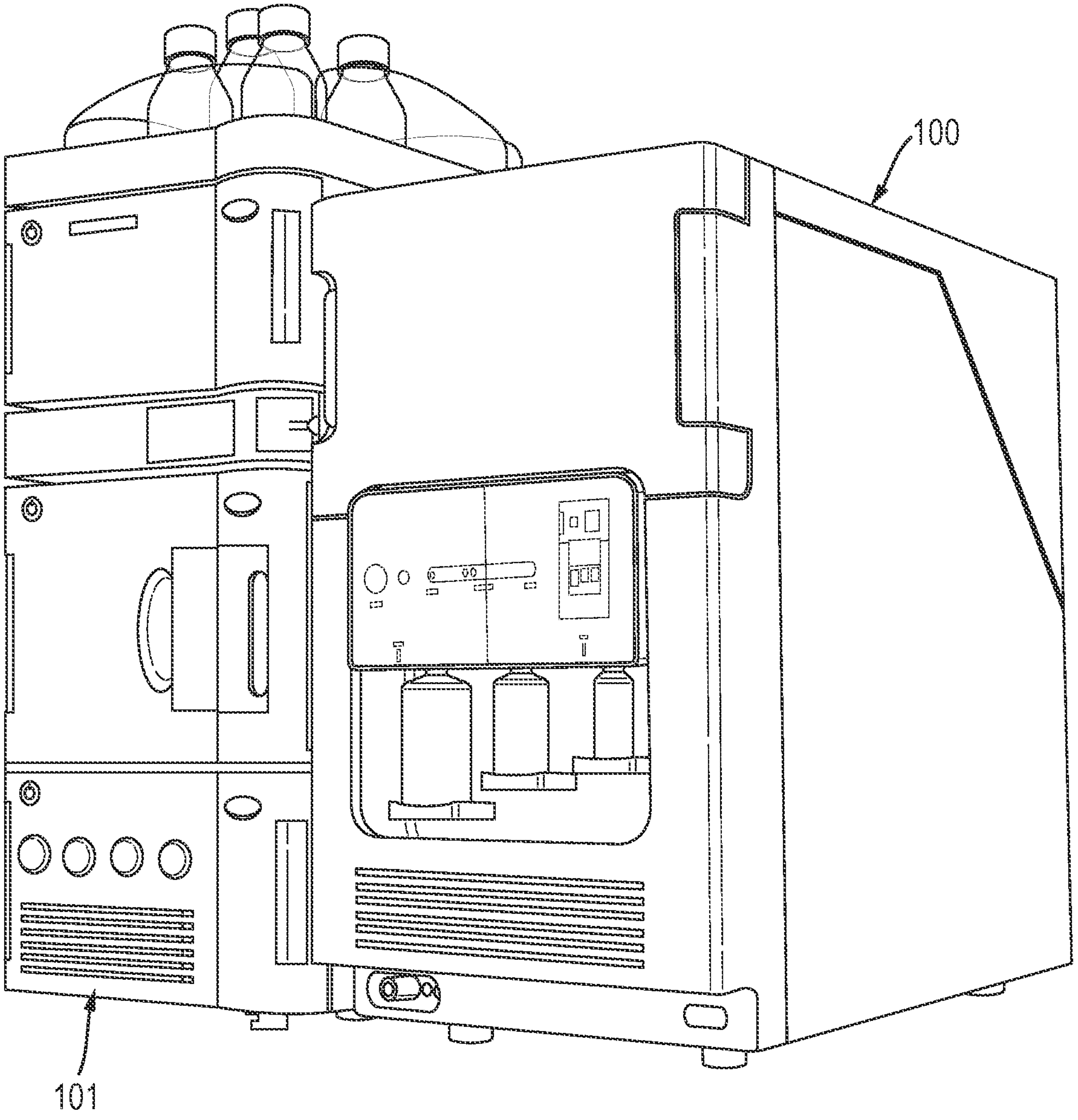
FIG. 1 shows a perspective view of a bench-top Time of Flight mass spectrometer according to various embodiments coupled to a conventional bench-top liquid chromatography ("LC") separation system.

FIG. 1 shows a bench-top mass spectrometer 100 according to various embodiments which is shown coupled to a conventional bench-top liquid chromatography separation device 101. The mass spectrometer 100 has been designed with ease of use in mind. In particular, a simplified user interface and front display is provided and instrument serviceability has been significantly improved and optimised relative to conventional instruments. The mass spectrometer 100 has an improved mechanical design with a reduced part count and benefits from a simplified manufacturing process thereby leading to a reduced cost design, improved reliability and simplified service procedures. The mass spectrometer has been designed to be highly electromagnetic compatible ("EMC") and exhibits very low electromagnetic interference ("EMI").

Figure 2A:
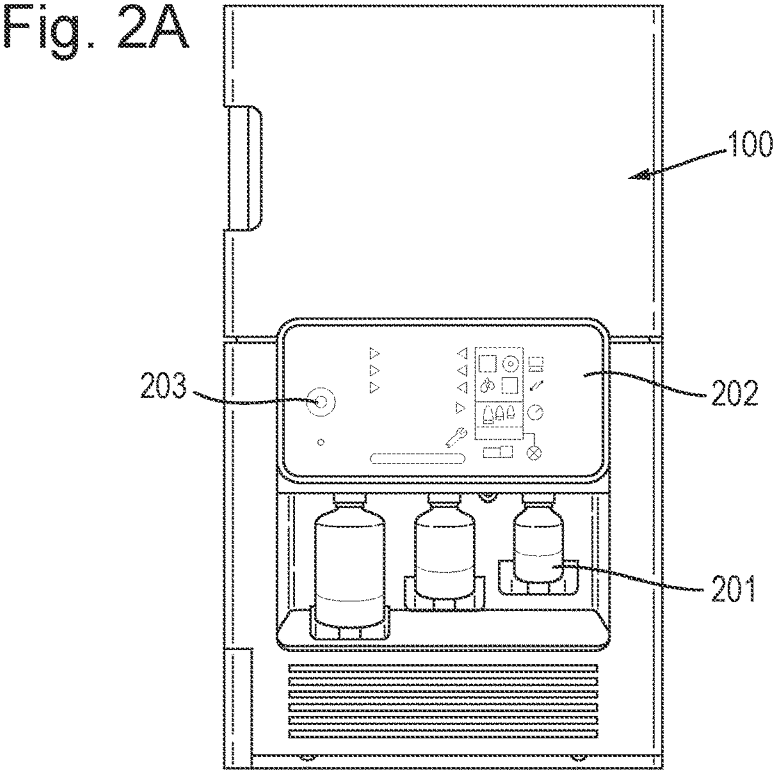
FIG. 2A shows a front view of a bench-top mass spectrometer according to various embodiments showing three solvent bottles loaded into the instrument and a front display panel.
Figure 2B:
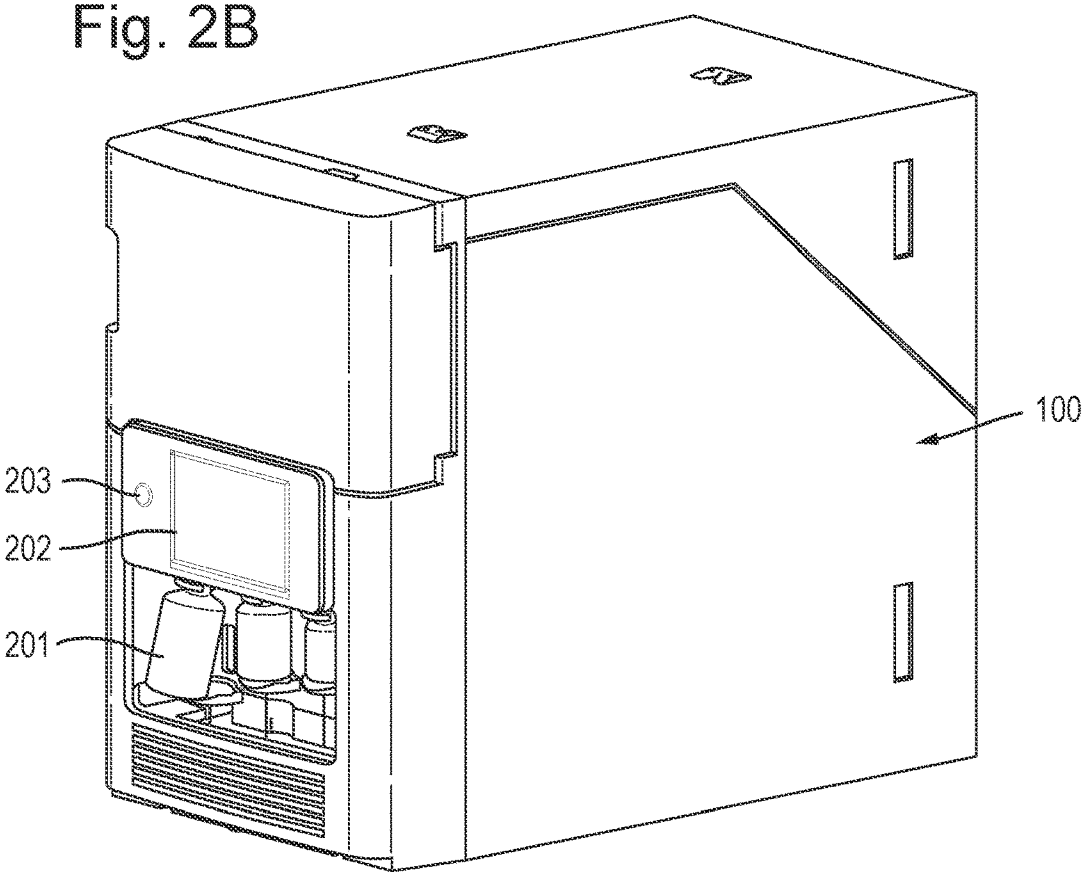
FIG. 2B shows a perspective view of a mass spectrometer according to various embodiments and FIG. 2C illustrates in more detail various icons which may be displayed on the front display panel in order to highlight the status of the instrument to a user and to indicate if a potential fault has been detected.

FIG. 2A shows a front view of the mass spectrometer 100 according to various embodiments and FIG. 2B shows a perspective view of the mass spectrometer according to various embodiments. Three solvent bottles 201 may be coupled, plugged in or otherwise connected or inserted into the mass spectrometer 100. The solvent bottles 201 may be back lit in order to highlight the fill status of the solvent bottles 201 to a user.

One problem with a known mass spectrometer having a plurality of solvent bottles is that a user may connect a solvent bottle in a wrong location or position. Furthermore, a user may mount a solvent bottle but conventional mounting mechanisms will not ensure that a label on the front of the solvent bottle will be positioned so that it can be viewed by a user i.e. conventional instruments may allow a solvent bottle to be connected where a front facing label ends up facing away from the user. Accordingly, one problem with conventional instruments is that a user may not be able to read a label on a solvent bottle due to the fact that the solvent bottle ends up being positioned with the label of the solvent bottle facing away from the user. According to various embodiments conventional screw mounts which are conventionally used to mount solvent bottles have been replaced with a resilient spring mounting mechanism which allows the solvent bottles 201 to be connected without rotation.

According to various embodiments the solvent bottles 201 may be illuminated by a LED light tile in order to indicate the fill level of the solvent bottles 201 to a user. It will be understood that a single LED illuminating a bottle will be insufficient since the fluid in a solvent bottle 201 can attenuate the light from the LED. Furthermore, there is no good single position for locating a single LED.

The mass spectrometer 100 may have a display panel 202 upon which various icons may be displayed when illuminated by the instrument control system.

A start button 203 may be positioned on or adjacent the front display panel 202. A user may press the start button 203 which will then initiate a power-up sequence of routine. The power-up sequence or routine may comprise powering-up all instrument modules and initiating instrument pump-down i.e. generating a low pressure in each of the vacuum chambers within the body of the mass spectrometer 100.

According to various embodiments the power-up sequence or routine may or may not include running a source pressure test and switching the instrument into an Operate mode of operation.

According to various embodiments a user may hold the start button 203 for a period of time, e.g. 5 seconds, in order to initiate a power-down sequence.

If the instrument is in a maintenance mode of operation then pressing the start button 203 on the front panel of the instrument may initiate a power-up sequence. Furthermore, when the instrument is in a maintenance mode of operation then holding the start button 203 on the front panel of the instrument for a period of time, e.g. 5 seconds, may initiate a power-down sequence.

Figure 2C:
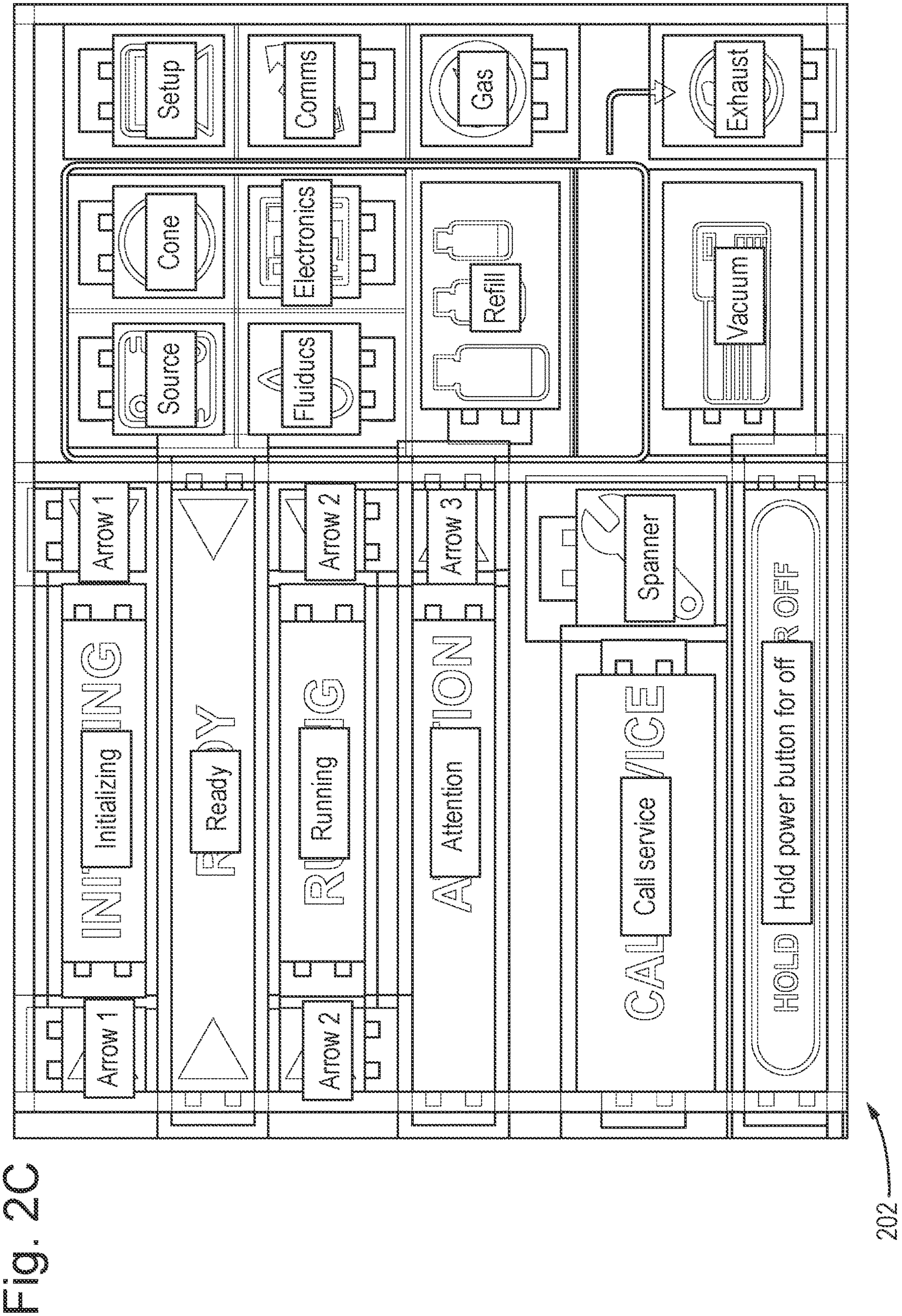

FIG. 2C illustrates in greater detail various icons which may be displayed on the display panel 202 and which may illuminated under the control of instrument hardware and/or software. According to various embodiments one side of the display panel 202 (e.g. the left-hand side) may have various icons which generally relate to the status of the instrument or mass spectrometer 100. For example, icons may be displayed in the colour green to indicate that the instrument is in an initialisation mode of operation, a ready mode of operation or a running mode of operation.

In the event of a detected error which may require user interaction or user input a yellow or amber warning message may be displayed. A yellow or amber warning message or icon may be displayed on the display panel 202 and may convey only relatively general information to a user e.g. indicating that there is a potential fault and a general indication of what component or aspect of the instrument may be at fault.

According to various embodiments it may be necessary for a user to refer to an associated computer display or monitor in order to get fuller details or gain a fuller appreciation of the nature of the fault and to receive details of potential corrective action which is recommended to perform in order to correct the fault or to place the instrument in a desired operational state.

A user may be invited to confirm that a corrective action should be performed and/or a user may be informed that a certain corrective action is being performed.

In the event of a detected error which cannot be readily corrected by a user and which instead requires the services of a skilled service engineer then a warning message may be displayed indicating that a service engineer needs to be called. A warning message indicating the need for a service engineer may be displayed in the colour red and a spanner or other icon may also be displayed or illuminated to indicate to a user that an engineer is required.

The display panel 202 may also display a message that the power button 203 should be pressed in order to turn the instrument OFF.

According to an embodiment one side of the display panel 202 (e.g. the right-hand side) may have various icons which indicate different components or modules of the instrument where an error or fault has been detected. For example, a yellow or amber icon may be displayed or illuminated in order to indicate an error or fault with the ion source, a fault in the inlet cone region, a fault with the fluidic systems, an electronics fault, a fault with one or more of the solvent or other bottles 201 (i.e. indicating that one or more solvent bottles 201 needing to be refilled or emptied), a vacuum pressure fault associated with one or more of the vacuum chambers, an instrument setup error, a communication error, a problem with a gas supply or a problem with an exhaust.

It will be understood that the display panel 202 may merely indicate the general status of the instrument and/or the general nature of a fault. In order to be able to resolve the fault or to understand the exact nature of an error or fault a user may need to refer to the display screen of an associated computer or other device. For example, as will be understood by those skilled in the art an associated computer or other device may be arranged to receive and process mass spectral and other data output from the instrument or mass spectrometer 100 and may display mass spectral data or images on a computer display screen for the benefit of a user.

According to various embodiments the status display may indicate whether the instrument is in one of the following states namely Running, Ready, Getting Ready, Ready Blocked or Error.

The status display may display health check indicators such as Service Required, Cone, Source, Set-up, Vacuum, Communications, Fluidics, Gas, Exhaust, Electronics, Lock-mass, Calibrant and Wash.

A "Hold power button for OFF" LED tile is shown in FIG. 2C and may remain illuminated when the power button 203 is pressed and may remain illuminated until the power button 203 is released or until a period of time (e.g. 5 seconds) has elapsed whichever is sooner. If the power button 203 is released before the set period of time (e.g. less than 5 seconds after it is pressed) then the "Hold power button for OFF" LED tile may fade out over a time period of e.g. 2 s.

The initialising LED tile may be illuminated when the instrument is started via the power button 203 and may remain ON until software assumes control of the status panel or until a power-up sequence or routine times out.

According to various embodiments an instrument health check may be performed and printer style error correction instructions may be provided to a user via a display screen of a computer monitor (which may be separate to the front display panel 202) in order to help guide a user through any steps that the user may need to perform.

The instrument may attempt to self-diagnose any error messages or warning status alert(s) and may attempt to rectify any problem(s) either with or without notifying the user.

Depending upon the severity of any problem the instrument control system may either attempt to correct the problem(s) itself, request the user to carry out some form of intervention in order to attempt to correct the issue or problem(s) or may inform the user that the instrument requires a service engineer.

In the event where corrective action may be taken by a user then the instrument may display instructions for the user to follow and may provide details of methods or steps that should be performed which may allow the user to fix or otherwise resolve the problem or error. A resolve button may be provided on a display screen which may be pressed by a user having followed the suggested resolution instructions. The instrument may then run a test again and/or may check if the issue has indeed been corrected. For example, if a user were to trigger an interlock then once the interlock is closed a pressure test routine may be initialised as detailed below.

Figure 3:
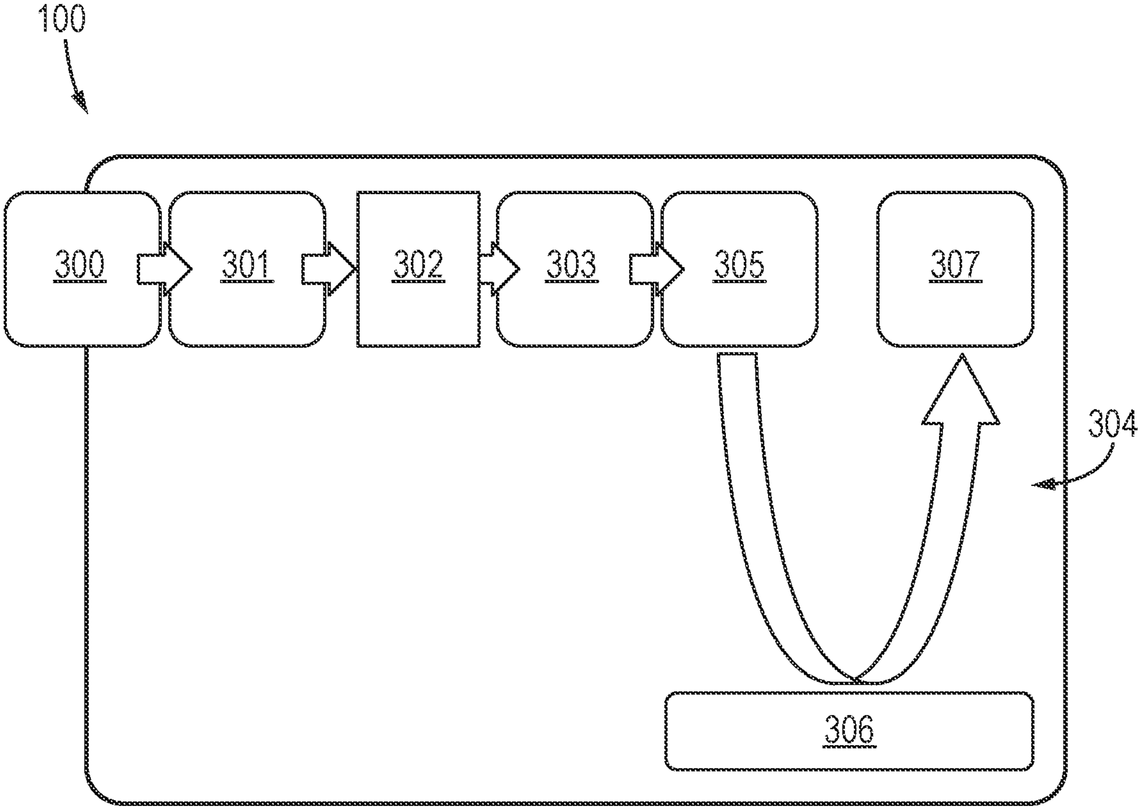
FIG. 3 shows a schematic representation of mass spectrometer according to various embodiments, wherein the instrument comprises an Electrospray Ionisation ("ESI") or other ion source, a conjoined ring ion guide, a segmented quadrupole rod set ion guide, one or more transfer lenses and a Time of Flight mass analyser comprising a pusher electrode, a reflectron and an ion detector.

FIG. 3 shows a high level schematic of the mass spectrometer 100 according to various embodiments wherein the instrument may comprise an ion source 300, such as an Electrospray Ionisation ("ESI") ion source. However, it should be understood that the use of an Electrospray Ionisation ion source 300 is not essential and that according to other embodiments a different type of ion source may be used. For example, according to various embodiments a Desorption Electrospray Ionisation ("DESI") ion source may be used. According to yet further embodiments a Rapid Evaporative Ionisation Mass Spectrometry ("REIMS") ion source may be used.

If an Electrospray ion source 300 is provided then the ion source 300 may comprise an Electrospray probe and associated power supply.

Figure 6A:
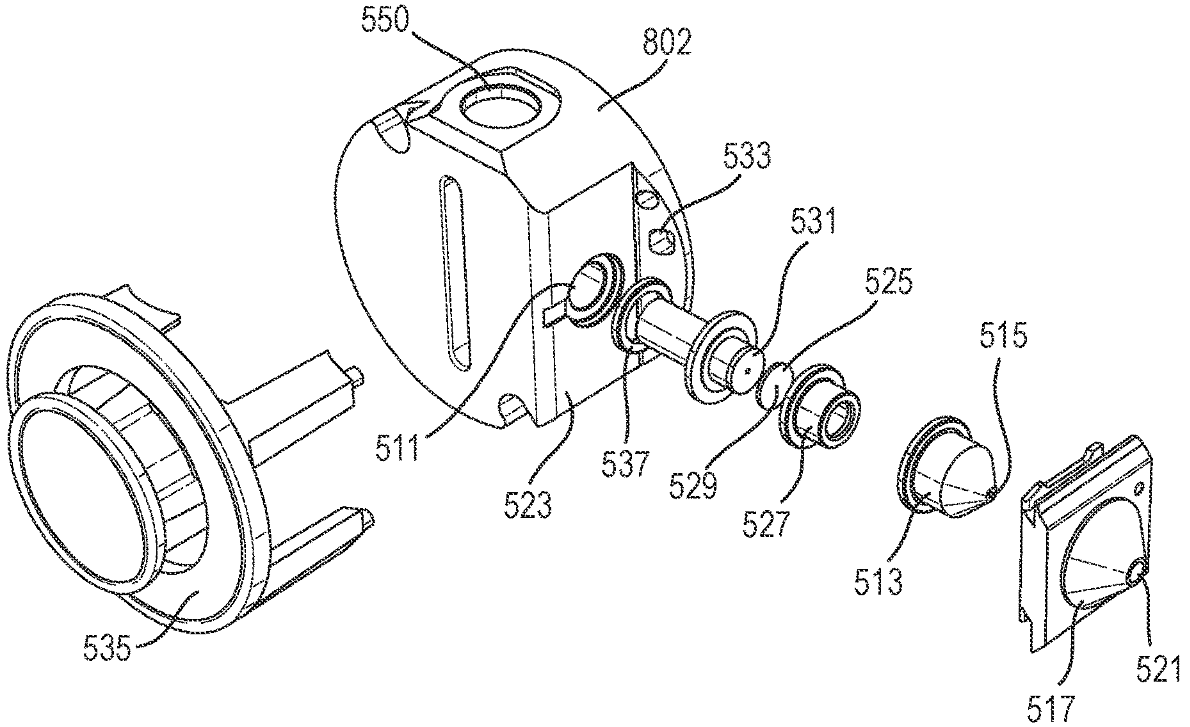
Fig. 6A Prior art
FIG. 6A shows an exploded view of the first known ion inlet assembly.
Figure 6B:
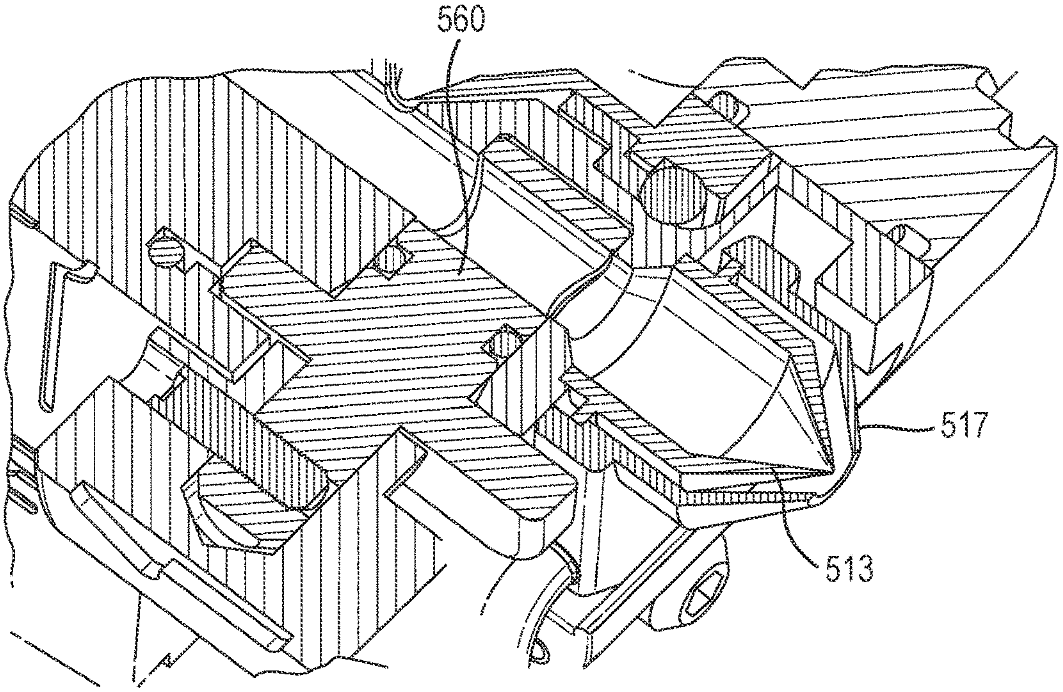
Fig. 6B Prior art
FIG. 6B shows a second different known ion inlet assembly having an isolation valve.
Figure 6C:
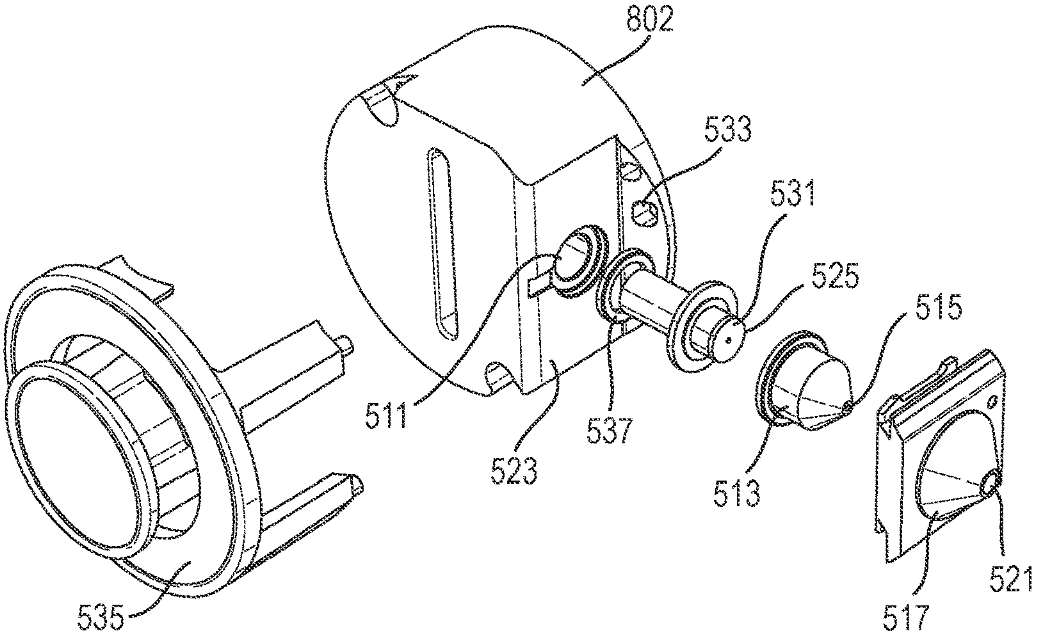
FIG. 6C shows an exploded view of an ion inlet assembly according to various embodiments.

The initial stage of the associated mass spectrometer 100 comprises an ion block 802 (as shown in FIG. 6C) and a source enclosure may be provided if an Electrospray Ionisation ion source 300 is provided.

If a Desorption Electrospray Ionisation ("DESI") ion source is provided then the ion source may comprise a DESI source, a DESI sprayer and an associated DESI power supply. The initial stage of the associated mass spectrometer may comprise an ion block 802 as shown in more detail in FIG. 6C. However, according to various embodiments if a DESI source is provided then the ion block 802 may not enclosed by a source enclosure.

It will be understood that a REIMS source involves the transfer of analyte, smoke, fumes, liquid, gas, surgical smoke, aerosol or vapour produced from a sample which may comprise a tissue sample. In some embodiments, the REIMS source may be arranged and adapted to aspirate the analyte, smoke, fumes, liquid, gas, surgical smoke, aerosol or vapour in a substantially pulsed manner. The REIMS source may be arranged and adapted to aspirate the analyte, smoke, fumes, liquid, gas, surgical smoke, aerosol or vapour substantially only when an electrosurgical cutting applied voltage or potential is supplied to one or more electrodes, one or more electrosurgical tips or one or more laser or other cutting devices.

The mass spectrometer 100 may be arranged so as to be capable of obtaining ion images of a sample. For example, according to various embodiments mass spectral and/or other physico-chemical data may be obtained as a function of position across a portion of a sample. Accordingly, a determination can be made as to how the nature of the sample may vary as a function of position along, across or within the sample.

The mass spectrometer 100 may comprise a first ion guide 301 such as a StepWave® ion guide 301 having a plurality of ring and conjoined ring electrodes. The mass spectrometer 100 may further comprise a segmented quadrupole rod set ion guide 302, one or more transfer lenses 303 and a Time of Flight mass analyser 304. The quadrupole rod set ion guide 302 may be operated in an ion guiding mode of operation and/or in a mass filtering mode of operation. The Time of Flight mass analyser 304 may comprise a linear acceleration Time of Flight region or an orthogonal acceleration Time of Flight mass analyser.

If the Time of Flight mass analyser comprises an orthogonal acceleration Time of Flight mass analyser 304 then the mass analyser 304 may comprise a pusher electrode 305, a reflectron 306 and an ion detector 307. The ion detector 307 may be arranged to detect ions which have been reflected by the reflectron 306. It should be understood, however, that the provision of a reflectron 306 though desirable is not essential.

According to various embodiments the first ion guide 301 may be provided downstream of an atmospheric pressure interface. The atmospheric pressure interface may comprises an ion inlet assembly.

The first ion guide 301 may be located in a first vacuum chamber or first differential pumping region.

The first ion guide 301 may comprise a part ring, part conjoined ring ion guide assembly wherein ions may be transferred in a generally radial direction from a first ion path formed within a first plurality of ring or conjoined ring electrodes into a second ion path formed by a second plurality of ring or conjoined ring electrodes. The first and second plurality of ring electrodes may be conjoined along at least a portion of their length. Ions may be radially confined within the first and second plurality of ring electrodes.

The second ion path may be aligned with a differential pumping aperture which may lead into a second vacuum chamber or second differential pumping region.

The first ion guide 301 may be utilised to separate charged analyte ions from unwanted neutral particles. The unwanted neutral particles may be arranged to flow towards an exhaust port whereas analyte ions are directed on to a different flow path and are arranged to be optimally transmitted through a differential pumping aperture into an adjacent downstream vacuum chamber.

It is also contemplated that according to various embodiments ions may in a mode of operation be fragmented within the first ion guide 301. In particular, the mass spectrometer 100 may be operated in a mode of operation wherein the gas pressure in the vacuum chamber housing the first ion guide 301 is maintained such that when a voltage supply causes ions to be accelerated into or along the first ion guide 301 then the ions may be arranged to collide with background gas in the vacuum chamber and to fragment to form fragment, daughter or product ions. According to various embodiments a static DC voltage gradient may be maintained along at least a portion of the first ion guide 301 in order to urge ions along and through the first ion guide 301 and optionally to cause ions in a mode of operation to fragment.

However, it should be understood that it is not essential that the mass spectrometer 100 is arranged so as to be capable of performing ion fragmentation in the first ion guide 301 in a mode of operation.

The mass spectrometer 100 may comprise a second ion guide 302 downstream of the first ion guide 302 and the second ion guide 302 may be located in the second vacuum chamber or second differential pumping region.

The second ion guide 302 may comprise a segmented quadrupole rod set ion guide or mass filter 302. However, other embodiments are contemplated wherein the second ion guide 302 may comprise a quadrupole ion guide, a hexapole ion guide, an octopole ion guide, a multipole ion guide, a segmented multipole ion guide, an ion funnel ion guide, an ion tunnel ion guide (e.g. comprising a plurality of ring electrodes each having an aperture through which ions may pass or otherwise forming an ion guiding region) or a conjoined ring ion guide.

The mass spectrometer 100 may comprise one or more transfer lenses 303 located downstream of the second ion guide 302. One of more of the transfer lenses 303 may be located in a third vacuum chamber or third differential pumping region. Ions may be passed through a further differential pumping aperture into a fourth vacuum chamber or fourth differential pumping region. One or more transfer lenses 303 may also be located in the fourth vacuum chamber or fourth differential pumping region.

The mass spectrometer 100 may comprise a mass analyser 304 located downstream of the one or more transfer lenses 303 and may be located, for example, in the fourth or further vacuum chamber or fourth or further differential pumping region. The mass analyser 304 may comprise a Time of Flight ("TOF") mass analyser. The Time of Flight mass analyser 304 may comprise a linear or an orthogonal acceleration Time of Flight mass analyser.

According to various embodiments an orthogonal acceleration Time of Flight mass analyser 304 may be provided comprising one or more orthogonal acceleration pusher electrode(s) 305 (or alternatively and/or additionally one or more puller electrode(s)) and an ion detector 307 separated by a field free drift region. The Time of Flight mass analyser 304 may optionally comprise one or more reflectrons 306 intermediate the pusher electrode 305 and the ion detector 307.

Although highly desirable, it should be recognised that the mass analyser does not have to comprise a Time of Flight mass analyser 304. More generally, the mass analyser 304 may comprise either: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; or (xiv) a linear acceleration Time of Flight mass analyser.

Although not shown in FIG. 3, the mass spectrometer 100 may also comprise one or more optional further devices or stages. For example, according to various embodiments the mass spectrometer 100 may additionally comprise one or more ion mobility separation devices and/or one or more Field Asymmetric Ion Mobility Spectrometer ("FAIMS") devices and/or one or more devices for separating ions temporally and/or spatially according to one or more physico-chemical properties. For example, the mass spectrometer 100 according to various embodiments may comprise one or more separation stages for temporally or otherwise separating ions according to their mass, collision cross section, conformation, ion mobility, differential ion mobility or another physico-chemical parameter.

The mass spectrometer 100 may comprise one or more discrete ion traps or one or more ion trapping regions. However, as will be described in more detail below, an axial trapping voltage may be applied to one or more sections or one or more electrodes of either the first ion guide 301 and/or the second ion guide 302 in order to confine ions axially for a short period of time. For example, ions may be trapped or confined axially for a period of time and then released. The ions may be released in a synchronised manner with a downstream ion optical component. For example, in order to enhance the duty cycle of analyte ions of interest, an axial trapping voltage may be applied to the last electrode or stage of the second ion guide 302. The axial trapping voltage may then be removed and the application of a voltage pulse to the pusher electrode 305 of the Time of Flight mass analyser 304 may be synchronised with the pulsed release of ions so as to increase the duty cycle of analyte ions of interest which are then subsequently mass analysed by the mass analyser 304. This approach may be referred to as an Enhanced Duty Cycle ("EDC") mode of operation.

Furthermore, the mass spectrometer 100 may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The mass spectrometer 100 may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The fourth or further vacuum chamber or fourth or further differential pumping region may be maintained at a lower pressure than the third vacuum chamber or third differential pumping region. The third vacuum chamber or third differential pumping region may be maintained at a lower pressure than the second vacuum chamber or second differential pumping region and the second vacuum chamber or second differential pumping region may be maintained at a lower pressure than the first vacuum chamber or first differential pumping region. The first vacuum chamber or first differential pumping region may be maintained at lower pressure than ambient. Ambient pressure may be considered to be approx. 1013 mbar at sea level.

The mass spectrometer 100 may comprise an ion source configured to generate analyte ions. In various particular embodiments, the ion source may comprise an Atmospheric Pressure Ionisation ("API") ion source such as an Electrospray Ionisation ("ESI") ion source or an Atmospheric Pressure Chemical Ionisation ("APCI") ion source.

Figure 4:
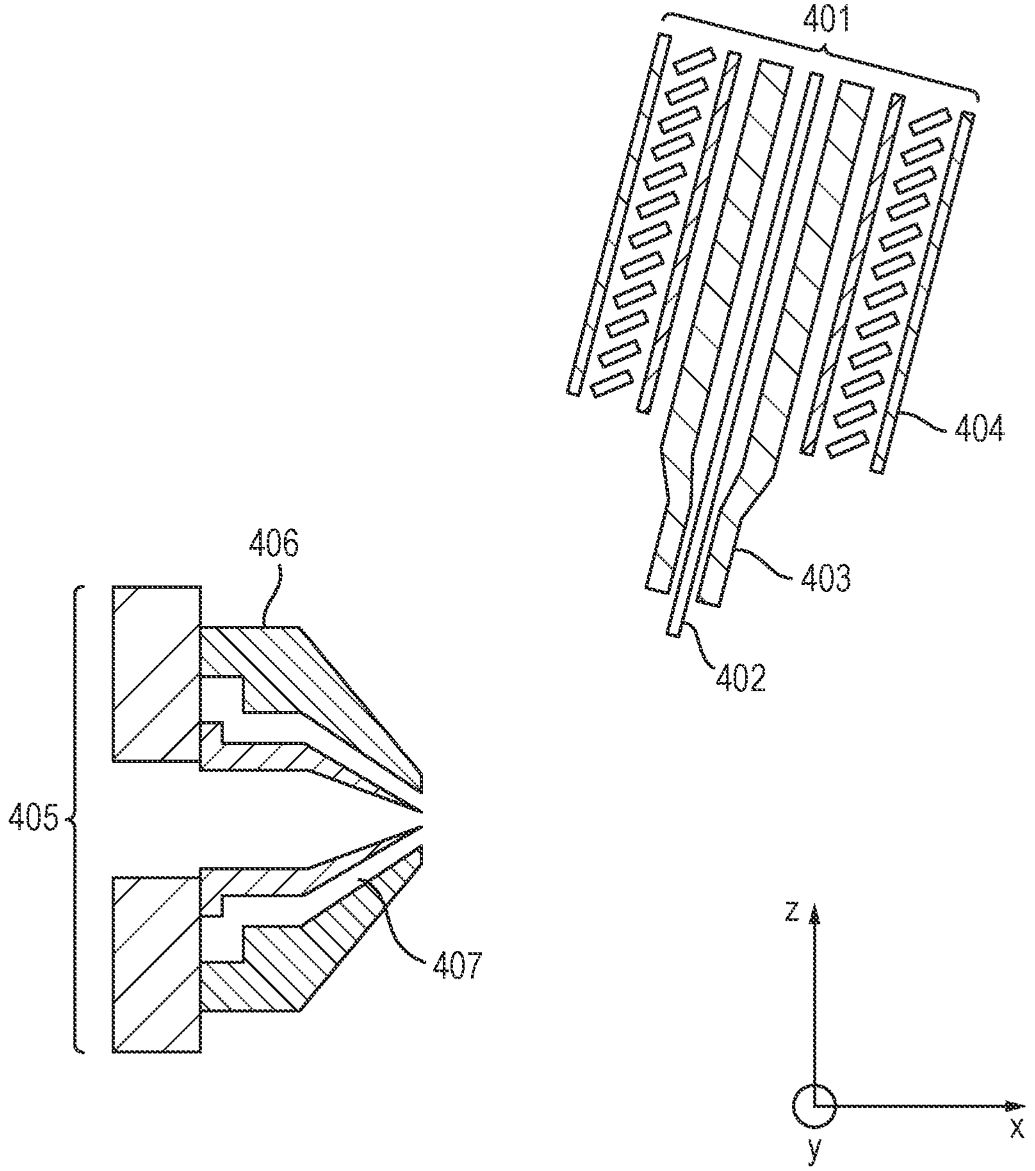
Fig. 4 Prior art
FIG. 4 shows a known Atmospheric Pressure Ionisation ("API") ion source which may be used with the mass spectrometer according to various embodiments.

FIG. 4 shows in general form a known Atmospheric Pressure Ionisation ("API") ion source such as an Electrospray Ionisation ("ESI") ion source or an Atmospheric Pressure Chemical Ionisation ("APCI") ion source. The ion source may comprise, for example, an Electrospray Ionisation probe 401 which may comprise an inner capillary tube 402 through which an analyte liquid may be supplied. The analyte liquid may comprise mobile phase from a LC column or an infusion pump. The analyte liquid enters via the inner capillary tube 402 or probe and is pneumatically converted to an electrostatically charged aerosol spray. Solvent is evaporated from the spray by means of heated desolvation gas. Desolvation gas may be provided through an annulus which surrounds both the inner capillary tube 402 and an intermediate surrounding nebuliser tube 403 through which a nebuliser gas emerges. The desolvation gas may be heated by an annular electrical desolvation heater 404. The resulting analyte and solvent ions are then directed towards a sample or sampling cone aperture mounted into an ion block 405 forming an initial stage of the mass spectrometer 100.

The inner capillary tube 402 is preferably surrounded by a nebuliser tube 403. The emitting end of the inner capillary tube 402 may protrude beyond the nebuliser tube 403. The inner capillary tube 402 and the nebuliser tube 403 may be surrounded by a desolvation heater arrangement 404 as shown in FIG. 4 wherein the desolvation heater 404 may be arranged to heat a desolvation gas. The desolvation heater 404 may be arranged to heat a desolvation gas from ambient temperature up to a temperature of around 600° C. According to various embodiments the desolvation heater 404 is always OFF when the API gas is OFF.

The desolvation gas and the nebuliser gas may comprise nitrogen, air or another gas or mixture of gases. The same gas (e.g. nitrogen, air or another gas or mixture of gases) may be used as both a desolvation gas, nebuliser gas and cone gas. The function of the cone gas will be described in more detail below.

The inner probe capillary 402 may be readily replaced by an unskilled user without needing to use any tools. The Electrospray probe 402 may support LC flow rates in the range of 0.3 to 1.0 mL/min.

According to various embodiments an optical detector may be used in series with the mass spectrometer 100. It will be understood that an optical detector may have a maximum pressure capability of approx. 1000 psi. Accordingly, the Electrospray Ionisation probe 401 may be arranged so as not to cause a back pressure of greater than around 500 psi, allowing for back pressure caused by other system components. The instrument may be arranged so that a flow of 50:50 methanol/water at 1.0 mL/min does not create a backpressure greater than 500 psi.

According to various embodiments a nebuliser flow rate of between 106 to 159 L/hour may be utilised.

The ESI probe 401 may be powered by a power supply which may have an operating range of 0.3 to 1.5 kV.

It should, however, be understood that various other different types of ion source may instead be coupled to the mass spectrometer 100. For example, according to various embodiments, the ion source may more generally comprise either: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; (xxviii) a Laser Ablation Electrospray Ionisation ("LAESI") ion source; (xxix) a Surface Assisted Laser Desorption Ionisation ("SALDI") ion source; or (xxx) a Low Temperature Plasma ("LTP") ion source.

A chromatography or other separation device may be provided upstream of the ion source 300 and may be coupled so as to provide an effluent to the ion source 300. The chromatography separation device may comprise a liquid chromatography or gas chromatography device. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The mass spectrometer 100 may comprise an atmospheric pressure interface or ion inlet assembly downstream of the ion source 300. According to various embodiments the atmospheric pressure interface may comprise a sample or sampling cone 406,407 which is located downstream of the ion source 401. Analyte ions generated by the ion source 401 may pass via the sample or sampling cone 406,407 into or onwards towards a first vacuum chamber or first differential pumping region of the mass spectrometer 100. However, according to other embodiments the atmospheric pressure interface may comprise a capillary interface.

As shown in FIG. 4, ions generated by the ion source 401 may be directed towards an atmospheric pressure interface which may comprise an outer gas cone 406 and an inner sample cone 407. A cone gas may be supplied to an annular region between the inner sample cone 407 and the outer gas cone 406. The cone gas may emerge from the annulus in a direction which is generally opposed to the direction of ion travel into the mass spectrometer 100. The cone gas may act as a declustering gas which effectively pushes away large contaminants thereby preventing large contaminants from impacting upon the outer cone 406 and/or inner cone 407 and also preventing the large contaminants from entering into the initial vacuum stage of the mass spectrometer 100.

Figure 5:
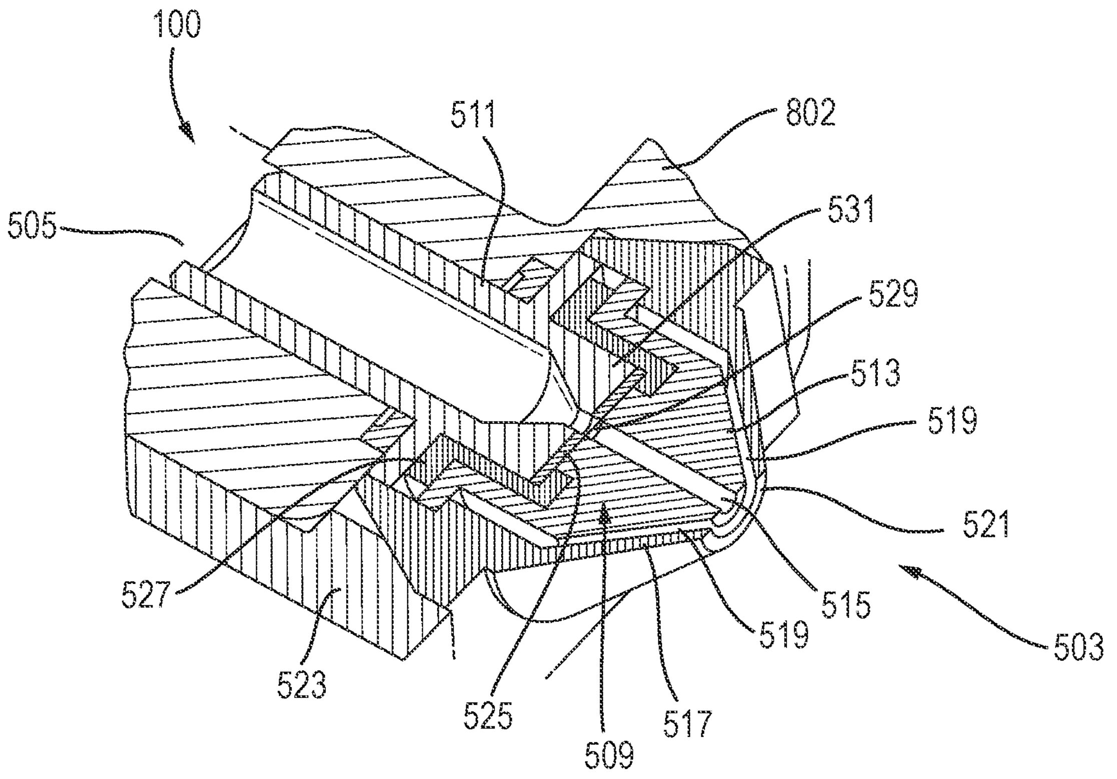
Fig. 5 Prior art
FIG. 5 shows a first known ion inlet assembly which shares features with an ion inlet assembly according to various embodiments.

FIG. 5 shows in more detail a first known ion inlet assembly which is similar to an ion inlet assembly according to various embodiments. The known ion inlet assembly as shown and described below with reference to FIGS. 5 and 6A is presented in order to highlight various aspects of an ion inlet assembly according to various embodiments and also so that differences between an ion inlet assembly according to various embodiments as shown and discussed below with reference to FIG. 6C can be fully appreciated.

With reference to FIG. 5, it will be understood that the ion source (not shown) generates analyte ions which are directed towards a vacuum chamber 505 of the mass spectrometer 100.

A gas cone assembly is provided comprising an inner gas cone or sampling cone 513 having an aperture 515 and an outer gas cone 517 having an aperture 521. A disposable disc 525 is arranged beneath or downstream of the inner gas cone or sampling 513 and is held in position by a mounting element 527. The disc 525 covers an aperture 511 of the vacuum chamber 505. The disc 525 is removably held in position by the inner gas cone 513 resting upon the mounting element 527.

As will be discussed in more detail below with reference to FIG. 6C, according to various embodiments the mounting element 527 is not provided in the preferred ion inlet assembly.

The disc 525 has an aperture or sampling orifice 529 through which ions can pass.

A carrier 531 is arranged underneath or below the disc 525. The carrier 531 is arranged to cover the aperture 511 of the vacuum chamber 505. Upon removal of the disc 525, the carrier 531 may remain in place due to suction pressure.

FIG. 6A shows an exploded view of the first known ion inlet assembly. The outer gas cone 517 has a cone aperture 521 and is slidably mounted within a clamp 535. The clamp 535 allows a user to remove the outer gas cone 517 without physically having to touch the outer gas cone 517 which will get hot during use.

An inner gas cone or sampling cone 513 is shown mounted behind or below the outer gas cone 517.

The known arrangement utilises a carrier 531 which has a 1 mm diameter aperture. The ion block 802 is also shown having a calibration port 550. However, the calibration port 550 is not provided in an ion inlet assembly according to various embodiments.

FIG. 6B shows an second different known ion inlet assembly as used on a different instrument which has an isolation valve 560 which is required to hold vacuum pressure when the outer cone gas nozzle 517 and the inner nozzle 513 are removed for servicing. The inner cone 513 has a gas limiting orifice into the subsequent stages of the mass spectrometer. The inner gas cone 513 comprises a high cost, highly precisioned part which requires routine removal and cleaning. The inner gas cone 513 is not a disposable or consumable item. Prior to removing the inner sampling cone 513 the isolation valve 560 must be rotated into a closed position in order to isolate the downstream vacuum stages of the mass spectrometer from atmospheric pressure. The isolation valve 560 is therefore required in order to hold vacuum pressure whilst the inner gas sampling cone 513 is removed for cleaning.

FIG. 6C shows an exploded view of an ion inlet assembly according to various embodiments. The ion inlet assembly according to various embodiments is generally similar to the first known ion inlet assembly as shown and described above with reference to FIGS. 5 and 6A except for a few differences. One difference is that a calibration port 550 is not provided in the ion block 802 and a mounting member or mounting element 527 is not provided.

Accordingly, the ion block 802 and ion inlet assembly have been simplified. Furthermore, importantly the disc 525 may comprise a 0.25 or 0.30 mm diameter aperture disc 525 which is substantially smaller diameter than conventional arrangements.

According to various embodiments both the disc 525 and the vacuum holding member or carrier 531 may have a substantially smaller diameter aperture than conventional arrangements such as the first known arrangement as shown and described above with reference to FIGS. 5 and 6A.

For example, the first known instrument utilises a vacuum holding member or carrier 531 which has a 1 mm diameter aperture. In contrast, according to various embodiments the vacuum holding member or carrier 531 according to various embodiments may have a much smaller diameter aperture e.g. a 0.3 mm or 0.40 mm diameter aperture.

Figure 6D:
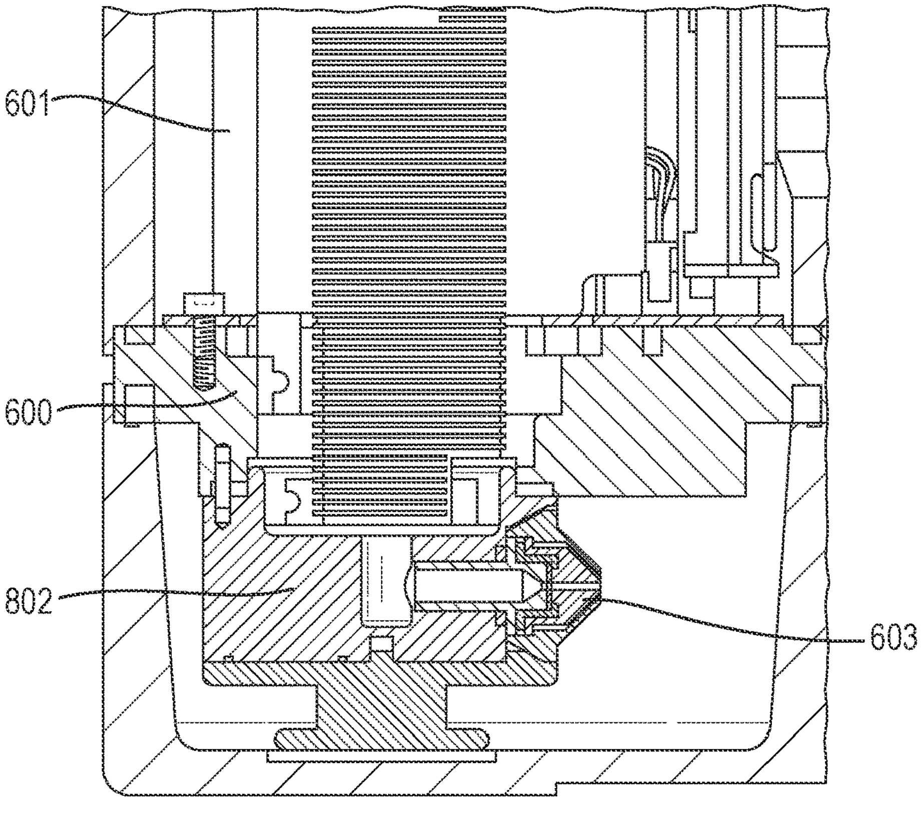
FIG. 6D shows the arrangement of an ion block attached to a pumping block upstream of a vacuum chamber housing a first ion guide according to various embodiments.

FIG. 6D shows in more detail how the ion block assembly 802 according to various embodiments may be enclosed in an atmospheric pressure source or housing. The ion block assembly 802 may be mounted to a pumping block or thermal interface 600. Ions pass through the ion block assembly 802 and then through the pumping block or thermal interface 600 into a first vacuum chamber 601 of the mass spectrometer 100. The first vacuum chamber 601 preferably houses the first ion guide 301 which as shown in FIG. 6D and which may comprise a conjoined ring ion guide 301. FIG. 6D also indicates how ion entry 603 into the mass spectrometer 100 also represents a potential leak path. A correct pressure balance is required between the diameters of the various gas flow restriction apertures in the ion inlet assembly with the configuration of the vacuum pumping system.

Figure 6E:
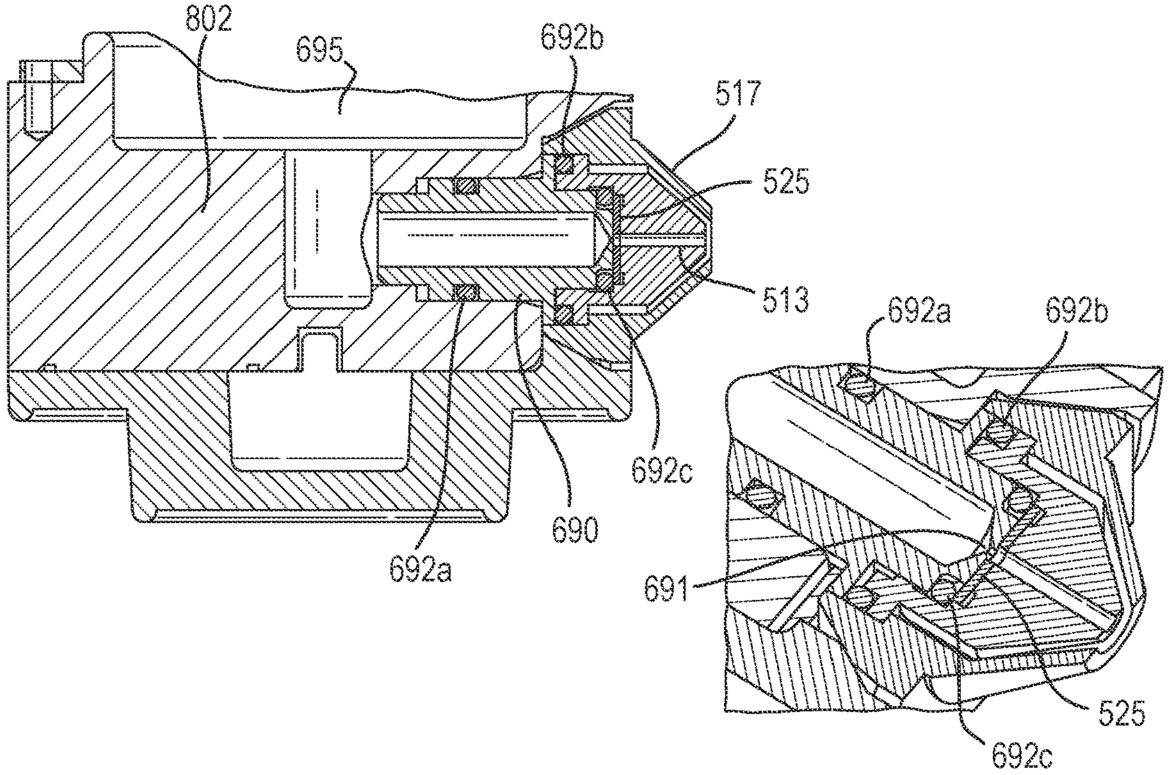
FIG. 6E shows in more detail a fixed valve assembly which is retained within an ion block according to various embodiments.

FIG. 6E shows the ion inlet assembly according to various embodiments and illustrates how ions pass through an outer gas cone 517 and an inner gas cone or sampling cone 513 before passing through an apertured disc 525. No mounting member or mounting element is provided unlike the first known ion inlet assembly as described above.

The ions then pass through an aperture in a fixed valve 690. The fixed valve 690 is held in place by suction pressure and is not removable by a user in normal operation. Three O-ring vacuum seals 692*a*,692*b*,692*c* are shown. The fixed valve 690 may be formed from stainless steel. A vacuum region 695 of the mass spectrometer 100 is generally indicated.

Figure 6F:
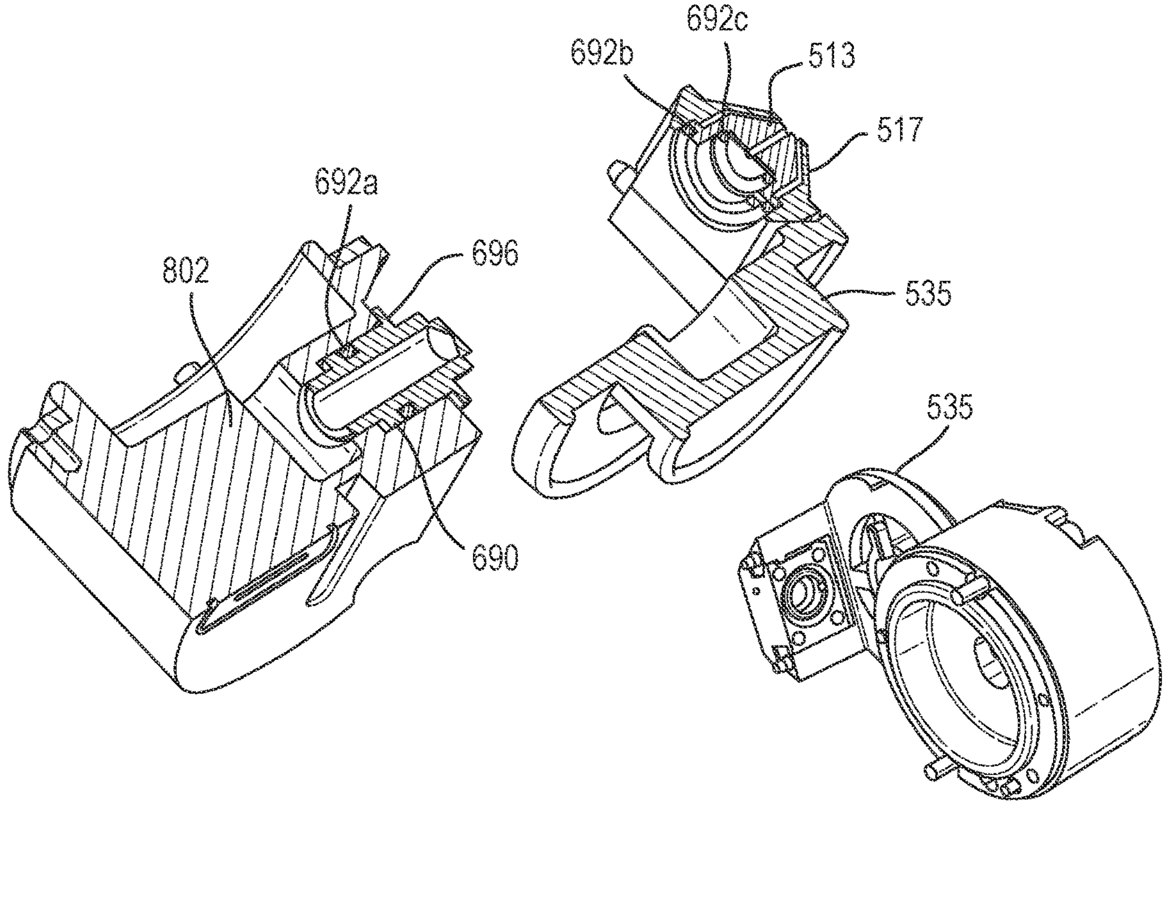
FIG. 6F shows the removal by a user of a cone assembly attached to a clamp to expose a fixed valve having a gas flow restriction aperture which is sufficient to maintain the low pressure within a downstream vacuum chamber when the cone is removed and FIG. 6G illustrates how the fixed valve may be retained in position by suction pressure according to various embodiments.

FIG. 6F shows the outer cone 517, inner sampling cone 513 and apertured disc 525 having been removed by a user by withdrawing or removing a clamp 535 to which at least the outer cone 517 is slidably inserted. According to various embodiments the inner sampling cone 513 may also be attached or secured to the outer cone 517 so that both are removed at the same time.

Instead of utilising a conventional rotatable isolation valve, a fixed non-rotatable valve 690 is provided or otherwise retained in the ion block 802. An O-ring seal 692*a* is shown which ensures that a vacuum seal is provided between the exterior body of the fixed valve 690 and the ion block 802. An ion block voltage contact 696 is also shown. O-rings seals 692*b*, 692*c* for the inner and outer cones 513,517 are also shown.

Figure 6G:
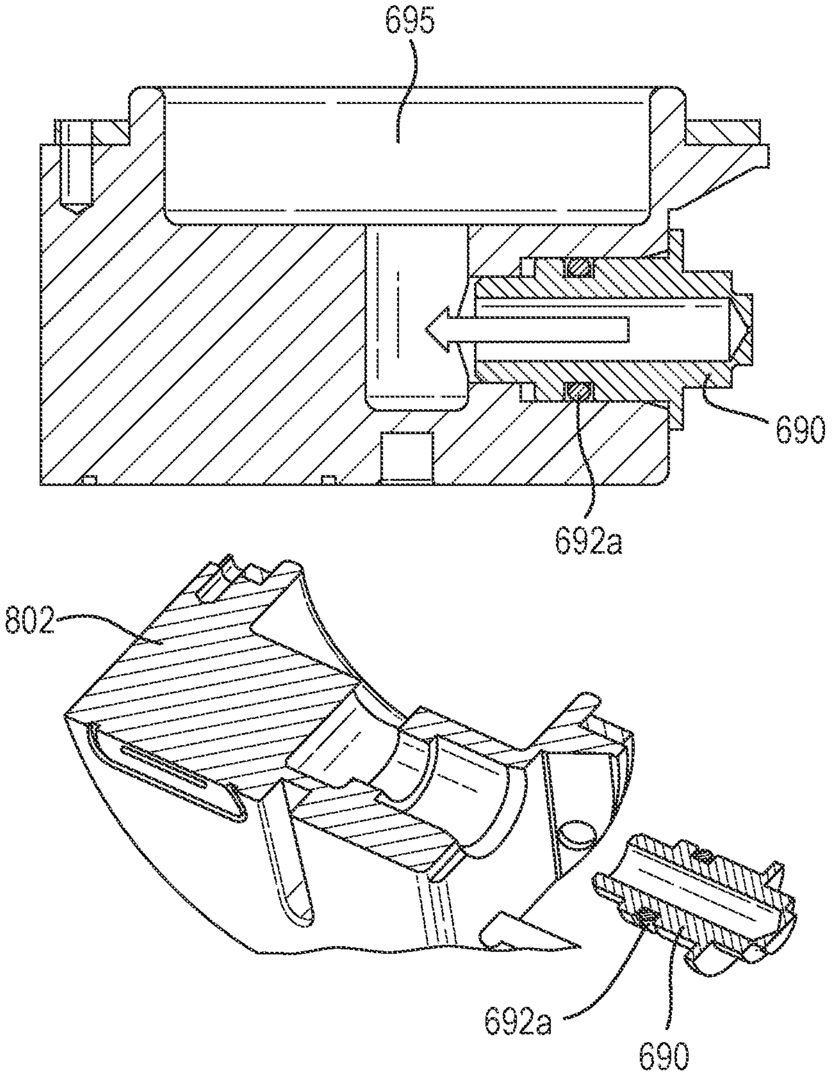

FIG. 6G illustrates how according to various embodiments a fixed valve 690 may be retained within an ion block 802 and may form a gas tight sealing therewith by virtue of an O-ring seal 692*a*. A user is unable to remove the fixed valve 690 from the ion block 802 when the instrument is operated due to the vacuum pressure within the vacuum chamber 695 of the instrument. The direction of suction force which holds the fixed valve 690 in a fixed position against the ion block 802 during normal operation is shown.

The size of the entrance aperture into the fixed valve 690 is designed for optimum operation conditions and component reliability. Various embodiments are contemplated wherein the shape of the entrance aperture may be cylindrical. However, other embodiments are contemplated wherein there may be more than one entrance aperture and/or wherein the one or more entrance apertures to the fixed valve 690 may have a non-circular aperture. Embodiments are also contemplated wherein the one or more entrance apertures may be angled at a non-zero angle to the longitudinal axis of the fixed valve 690.

It will be understood that total removal of the fixed valve 690 from the ion block 802 will rapidly result in total loss of vacuum pressure within the mass spectrometer 100.

According to various embodiments the ion inlet assembly may be temporarily sealed in order to allow a vacuum housing within the mass spectrometer 100 to be filled with dry nitrogen for shipping. It will be appreciated that filling a vacuum chamber with dry nitrogen allows faster initial pump-down during user initial instrument installation.

It will be appreciated that since according to various embodiments the internal aperture in the vacuum holding member or carrier 531 is substantially smaller in diameter than conventional arrangements, then the vacuum within the first and subsequent vacuum chambers of the instrument can be maintained for substantially longer periods of time than is possible conventionally when the disc 525 is removed and/or replaced.

Accordingly, the mass spectrometer 100 according to various embodiments does not require an isolation valve in contrast with other known mass spectrometers in order to maintain the vacuum within the instrument when a component such as the outer gas cone 517, the inner gas cone 513 or the disc 525 are removed.

A mass spectrometer 100 according to various embodiments therefore enables a reduced cost instrument to be provided which is also simpler for a user to operate since no isolation valve is needed. Furthermore, a user does not need to be understand or learn how to operate such an isolation valve.

The ion block assembly 802 may comprise a heater in order to keep the ion block 802 above ambient temperature in order to prevent droplets of analyte, solvent, neutral particles or condensation from forming within the ion block 802.

According to an embodiment when a user wishes to replace and/or remove either the outer cone 517 and/or the inner sampling cone 513 and/or the disc 525 then both the source or ion block heater and the desolvation heater 404 may be turned OFF. The temperature of the ion block 802 may be monitored by a thermocouple which may be provided within the ion block heater or which may be otherwise provided in or adjacent to the ion block 802.

When the temperature of the ion block is determined to have dropped below a certain temperature such as e.g. 55°

C. then the user may be informed that the clamp 535, outer gas cone 517, inner gas sampling cone 513 and disc 525 are sufficiently cooled down such that a user can touch them without serious risk of injury.

According to various embodiment a user can simply remove and/or replace the outer gas cone 517 and/or inner gas sampling cone 513 and/or disc 525 in less than two minutes without needing to vent the instrument. In particular, the low pressure within the instrument is maintained for a sufficient period of time by the aperture in the fixed valve 690.

According to various embodiments the instrument may be arranged so that the maximum leak rate into the source or ion block 802 during sample cone maintenance is approx. 7 mbar L/s. For example, assuming a backing pump speed of 9 $m^3$/hour (2.5 L/s) and a maximum acceptable pressure of 3 mbar, then the maximum leak rate during sampling cone maintenance may be approx. 2.5 L/s×3 mbar=7.5 mbar L/s.

The ion block 802 may comprise an ion block heater having a K-type thermistor. As will be described in more detail below, according to various embodiments the source (ion block) heater may be disabled to allow forced cooling of the source or ion block 802. For example, desolvation heater 404 and/or ion block heater may be switched OFF whilst API gas is supplied to the ion block 802 in order to cool it down. According to various embodiments either a desolvation gas flow and/or a nebuliser gas flow from the probe 401 may be directed towards the cone region 517,513 of the ion block 802. Additionally and/or alternatively, the cone gas supply may be used to cool the ion block 802 and the inner and outer cones 513,517. In particular, by turning the desolvation heater 404 OFF but maintaining a supply of nebuliser and/or desolvation gas from the probe 401 so as to fill the enclosure housing the ion block with ambient temperature nitrogen or other gas will have a rapid cooling effect upon the metal and plastic components forming the ion inlet assembly which may be touched by a user during servicing. Ambient temperature (e.g. in the range 18-25° C.) cone gas may also be supplied in order to assist with cooling the ion inlet assembly in a rapid manner. Conventional instruments do not have the functionality to induce rapid cooling of the ion block 802 and gas cones 521,513.

Liquid and gaseous exhaust from the source enclosure may be fed into a trap bottle. The drain tubing may be routed so as to avoid electronic components and wiring. The instrument may be arranged so that liquid in the source enclosure always drains out even when the instrument is switched OFF. For example, it will be understood that an LC flow into the source enclosure could be present at any time.

An exhaust check valve may be provided so that when the API gas is turned OFF the exhaust check valve prevents a vacuum from forming in the source enclosure and trap bottle. The exhaust trap bottle may have a capacity ≥5 L.

The fluidics system may comprise a piston pump which allows the automated introduction of a set-up solution into the ion source. The piston pump may have a flow rate range of 0.4 to 50 mL/min. A divert/select valve may be provided which allows rapid automated changeover between LC flow and the flow of one or two internal set-up solutions into the source.

According to various embodiments three solvent bottles 201 may be provided. Solvent A bottle may have a capacity within the range 250-300 mL, solvent B bottle may have a capacity within the range 50-60 mL and solvent C bottle may have a capacity within the range 100-125 mL. The solvent bottles 201 may be readily observable by a user who may easily refill the solvent bottles.

According to an embodiment solvent A may comprise a lock-mass, solvent B may comprise a calibrant and solvent C may comprise a wash. Solvent C (wash) may be connected to a rinse port.

A driver PCB may be provided in order to control the piston pump and the divert/select valve. On power-up the piston pump may be homed and various purge parameters may be set.

Fluidics may be controlled by software and may be enabled as a function of the instrument state and the API gas valve state in a manner as detailed below:

| Instrument state | API gas valve | Software control of fluidics |
|---|---|---|
| Operate | Open | Enabled |
| Operate | Closed | Disabled |
| Over-pressure | Open | Enabled |
| Over-pressure | Closed | Disabled |
| Power Save | Open | Disabled |
| Power Save | Closed | Disabled |

When software control of the fluidics is disabled then the valve is set to a divert position and the pump is stopped.

Figure 7A:
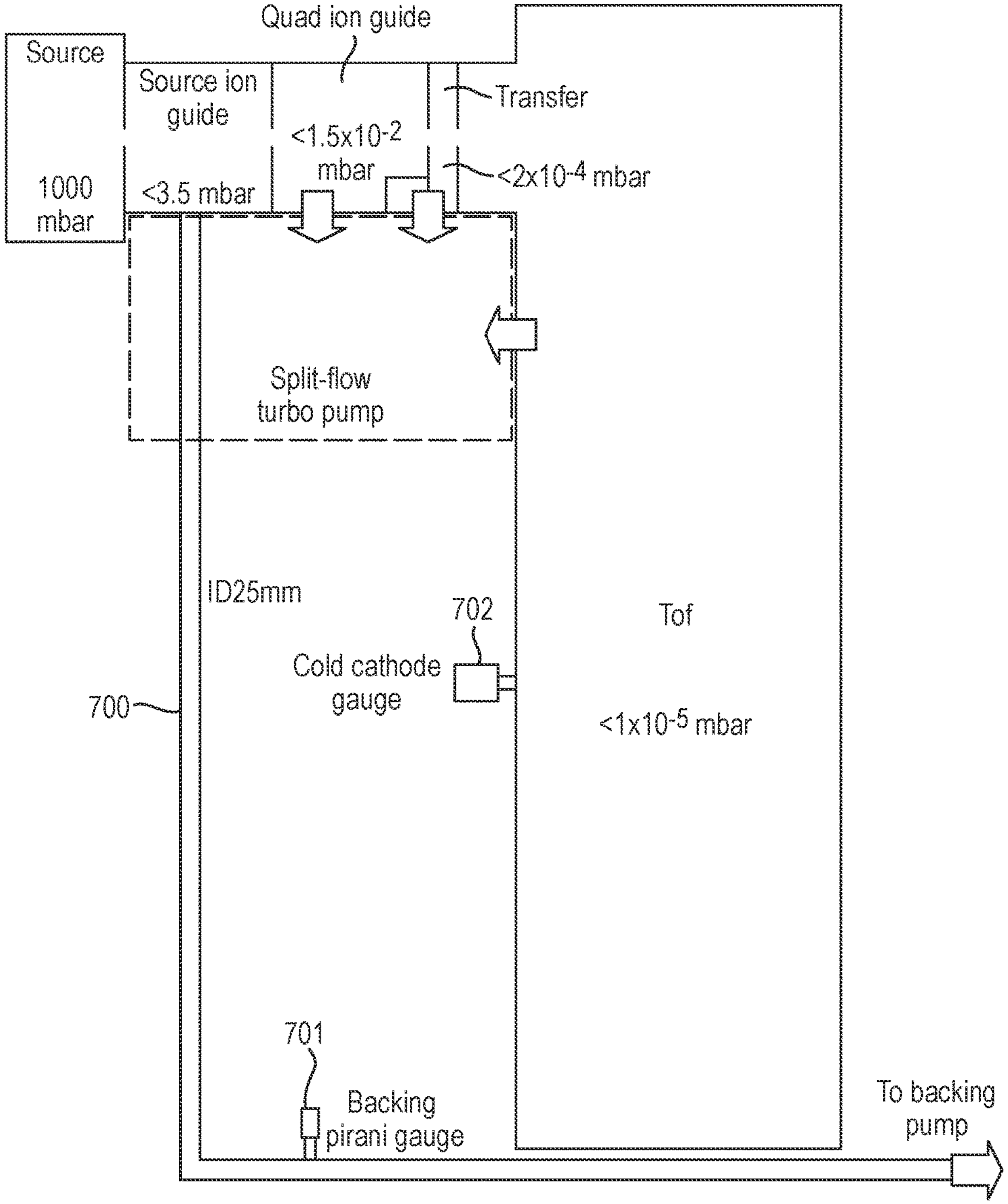
FIG. 7A shows a pumping arrangement according to various embodiments.

FIG. 7A illustrates a vacuum pumping arrangement according to various embodiments.

A split-flow turbo molecular vacuum pump (commonly referred to as a "turbo" pump) may be used to pump the fourth or further vacuum chamber or fourth or further differential pumping region, the third vacuum chamber or third differential pumping region, and the second vacuum chamber or second differential pumping region. According to an embodiment the turbo pump may comprise either a Pfeiffer® Splitflow 310 fitted with a TC110 controller or an Edwards® nEXT300/100/100D turbo pump. The turbo pump may be air cooled by a cooling fan.

The turbo molecular vacuum pump may be backed by a rough, roughing or backing pump such as a rotary vane vacuum pump or a diaphragm vacuum pump. The rough, roughing or backing pump may also be used to pump the first vacuum chamber housing the first ion guide 301. The rough, roughing or backing pump may comprise an Edwards® nRV14i backing pump. The backing pump may be provided external to the instrument and may be connected to the first vacuum chamber which houses the first ion guide 301 via a backing line 700 as shown in FIG. 7A.

A first pressure gauge such as a cold cathode gauge 702 may be arranged and adapted to monitor the pressure of the fourth or further vacuum chamber or fourth or further differential pumping region. According to an embodiment the Time of Flight housing pressure may be monitored by an Inficon® MAG500 cold cathode gauge 702.

A second pressure gauge such as a Pirani gauge 701 may be arranged and adapted to monitor the pressure of the backing pump line 700 and hence the first vacuum chamber which is in fluid communication with the upstream pumping block 600 and ion block 802. According to an embodiment the instrument backing pressure may be monitored by an Inficon® PSG500 Pirani gauge 701.

According to various embodiments the observed leak plus outgassing rate of the Time of Flight chamber may be arranged to be less than $4\times10^{-5}$ mbar L/s. Assuming a 200 L/s effective turbo pumping speed then the allowable leak plus outgassing rate is $5\times10^{-7}$ mbar×200 L/s=$1\times10^{-4}$ mbar L/s.

A turbo pump such as an Edwards® nEXT300/100/100D turbo pump may be used which has a main port pumping speed of 400 L/s. As will be detailed in more detail below, EMC shielding measures may reduce the pumping speed by approx. 20% so that the effective pumping speed is 320 L/s. Accordingly, the ultimate vacuum according to various embodiments may be $4\times10^{-5}$ mbar L/s/320 L/s=$1.25\times10^{-7}$ mbar.

Figure 7B:
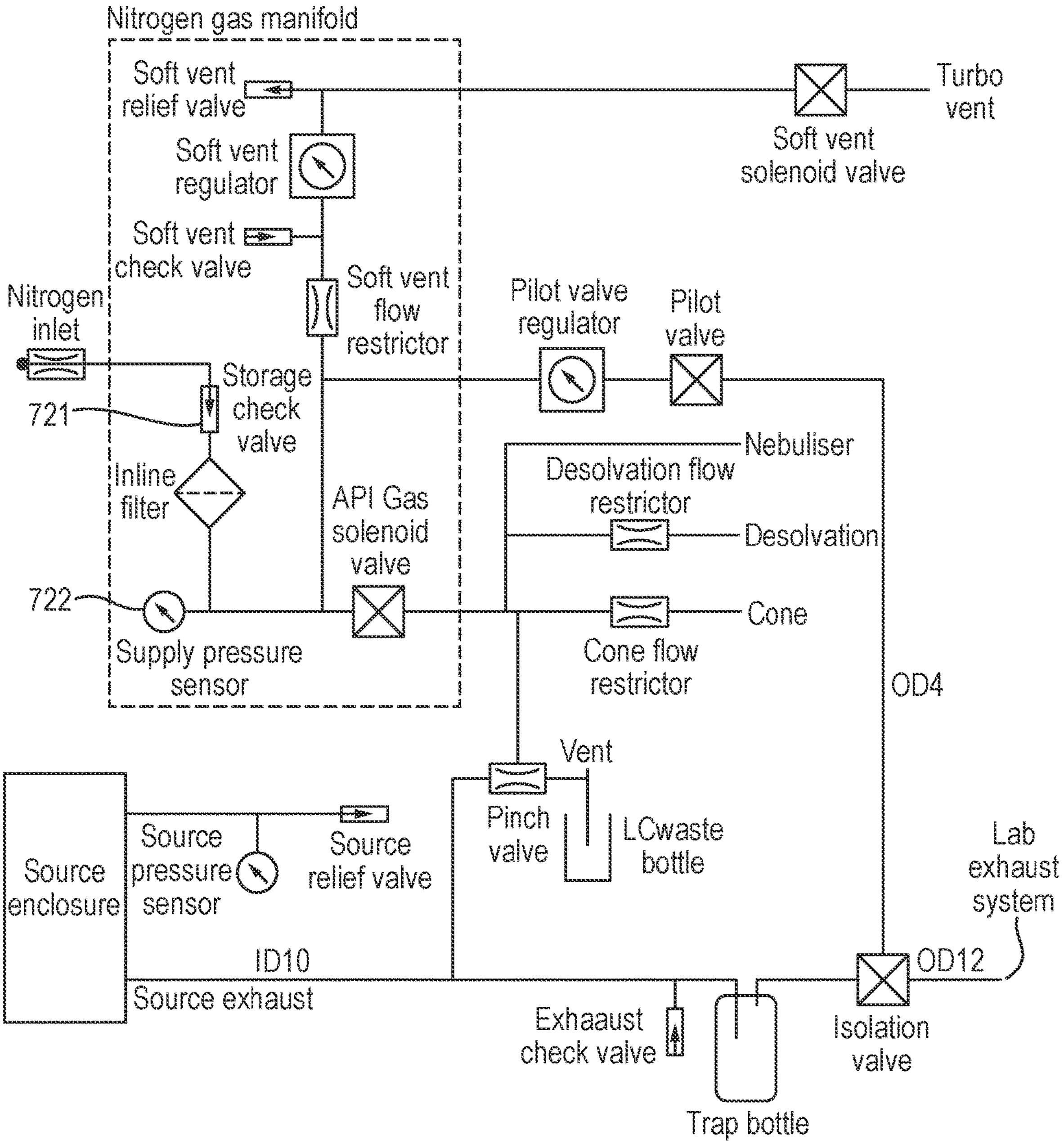
FIG. 7B shows further details of a gas handling system which may be implemented.

According to an embodiment a pump-down sequence may comprise closing a soft vent solenoid as shown in FIG. 7B, starting the backing pump and waiting until the backing pressure drops to 32 mbar. If 32 mbar is not reached within 3 minutes of starting the backing pump then a vent sequence may be performed. Assuming that a pressure of 32 mbar is reached within 3 minutes then the turbo pump is then started. When the turbo speed exceeds 80% of maximum speed then the Time of Flight vacuum gauge 702 may then be switched ON. It will be understood that the vacuum gauge 702 is a sensitive detector and hence is only switched ON when the vacuum pressure is such that the vacuum gauge 702 which not be damaged.

If the turbo speed does not reach 80% of maximum speed within 8 minutes then a vent sequence may be performed.

A pump-down sequence may be deemed completed once the Time of Flight vacuum chamber pressure is determined to be $<1\times10^{-5}$ mbar.

If a vent sequence is to be performed then the instrument may be switched to a Standby mode of operation. The Time of Flight vacuum gauge 702 may be switched OFF and the turbo pump may also be switched OFF. When the turbo pump speed falls to less than 80% of maximum then a soft vent solenoid valve as shown in FIG. 7B may be opened. The system may then wait for 10 seconds before then switching OFF the backing pump.

It will be understood by those skilled in the art that the purpose of the turbo soft vent solenoid valve as shown in FIG. 7B and the soft vent line is to enable the turbo pump to be vented at a controlled rate. It will be understood that if the turbo pump is vented at too fast a rate then the turbo pump may be damaged.

The instrument may switch into a maintenance mode of operation which allows an engineer to perform service work on all instrument sub-systems except for the vacuum system or a subsystem incorporating the vacuum system without having to vent the instrument. The instrument may be pumped down in maintenance mode and conversely the instrument may also be vented in maintenance mode.

A vacuum system protection mechanism may be provided wherein if the turbo speed falls to less than 80% of maximum speed then a vent sequence is initiated. Similarly, if the backing pressure increases to greater than 10 mbar then a vent sequence may also be initiated. According to an embodiment if the turbo power exceeds 120 W for more than 15 minutes then a vent sequence may also be initiated. If on instrument power-up the turbo pump speed is >80% of maximum then the instrument may be set to a pumped state, otherwise the instrument may be set to a venting state.

FIG. 7B shows a schematic of a gas handling system which may be utilised according to various embodiments. A storage check valve 721 may be provided which allows the instrument to be filled with nitrogen for storage and transport. The storage check valve 721 is in fluid communication with an inline filter.

A soft vent flow restrictor may be provided which may limit the maximum gas flow to less than the capacity of a soft vent relief valve in order to prevent the analyser pressure from exceeding 0.5 bar in a single fault condition. The soft vent flow restrictor may comprise an orifice having a diameter in the range 0.70 to 0.75 mm.

A supply pressure sensor 722 may be provided which may indicate if the nitrogen pressure has fallen below 4 bar.

An API gas solenoid valve may be provided which is normally closed and which has an aperture diameter of not less than 1.4 mm.

An API gas inlet is shown which preferably comprises a Nitrogen gas inlet. According to various embodiments the nebuliser gas, desolvation gas and cone gas are all supplied from a common source of nitrogen gas.

A soft vent regulator may be provided which may function to prevent the analyser pressure exceeding 0.5 bar in normal condition.

A soft vent check valve may be provided which may allow the instrument to vent to atmosphere in the event that the nitrogen supply is OFF.

A soft vent relief valve may be provided which may have a cracking pressure of 345 mbar. The soft vent relief valve may function to prevent the pressure in the analyser from exceeding 0.5 bar in a single fault condition. The gas flow rate through the soft vent relief valve may be arranged so as not to be less than 2000 L/h at a differential pressure of 0.5 bar.

The soft vent solenoid valve may normally be in an open position. The soft vent solenoid valve may be arranged to restrict the gas flow rate in order to allow venting of the turbo pump at 100% rotational speed without causing damage to the pump. The maximum orifice diameter may be 1.0 mm.

The maximum nitrogen flow may be restricted such that in the event of a catastrophic failure of the gas handling the maximum leak rate of nitrogen into the lab should be less than 20% of the maximum safe flow rate. According to various embodiments an orifice having a diameter of 1.4 to 1.45 mm may be used.

A source pressure sensor may be provided.

A source relief valve having a cracking pressure of 345 mbar may be provided. The source relief valve may be arranged to prevent the pressure in the source from exceeding 0.5 bar in a single fault condition. The gas flow rate through the source relief valve may be arranged so as not to be less than 2000 L/h at a differential pumping pressure of 0.5 bar. A suitable valve is a Ham-Let® H-480-S-G-1/4-5 psi valve.

A cone restrictor may be provided to restrict the cone flow rate to 36 L/hour for an input pressure of 7 bar. The cone restrictor may comprise a 0.114 mm orifice.

The desolvation flow may be restricted by a desolvation flow restrictor to a flow rate of 940 L/hour for an input pressure of 7 bar. The desolvation flow restrictor may comprise a 0.58 mm orifice.

A pinch valve may be provided which has a pilot operating pressure range of at least 4 to 7 bar gauge. The pinch valve may normally be open and may have a maximum inlet operating pressure of at least 0.5 bar gauge.

When the instrument is requested to turn the API gas OFF, then control software may close the API gas valve, wait 2 seconds and then close the source exhaust valve.

In the event of an API gas failure wherein the pressure switch opens (pressure <4 bar) then software control of the API gas may be disabled and the API gas valve may be closed. The system may then wait 2 seconds before closing the exhaust valve.

In order to turn the API gas ON a source pressure monitor may be turned ON except while a source pressure test is performed. An API gas ON or OFF request from software may be stored as an API Gas Request state which can either be ON or OFF. Further details are presented below:

| API Gas Request state | API Gas Control state | API gas valve |
|---|---|---|
| ON | Enabled | Open |
| ON | Disabled | Closed |
| OFF | Enabled | Closed |
| OFF | Disabled | Closed |

Figure 7C:
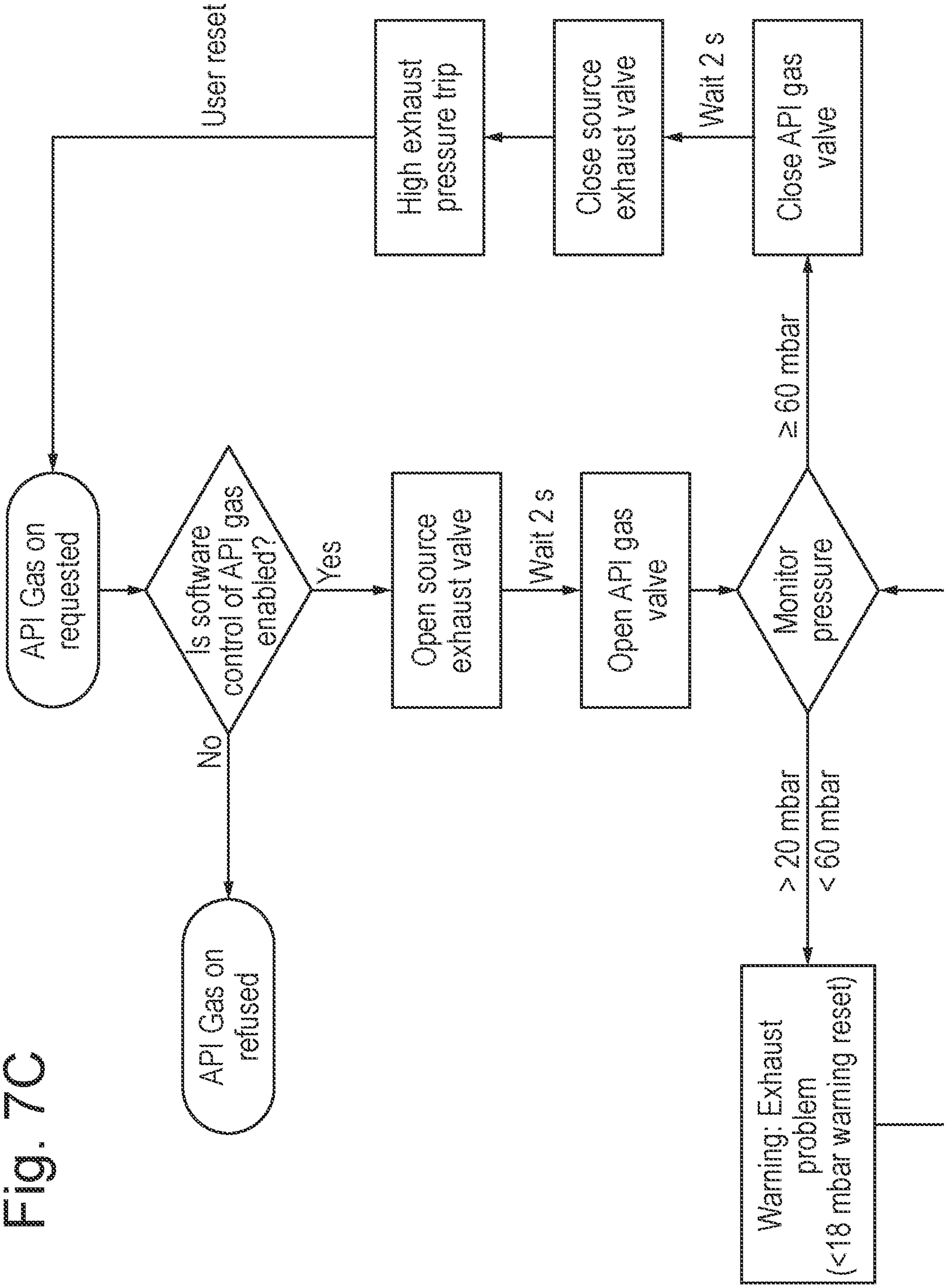
FIG. 7C shows a flow diagram illustrating the steps which may be performed following a user request to the turn the Atmospheric Pressure Ionisation ("API") gas ON and FIG. 7D shows a flow chart illustrating a source pressure test which may be performed according to various embodiments.

FIG. 7C shows a flow diagram showing an instrument response to a user request to turn the API gas ON. A determination may be made as to whether or not software control of API gas is enabled. If software control is not enabled then the request may be refused. If software control of API gas is enabled then the open source exhaust valve may be opened. Then after a delay of 2 seconds the API gas valve may be opened. The pressure is then monitored. If the pressure is determined to be between 20-60 mbar then a warning message may be communicated or issued. If the pressure is greater than 60 mbar then then the API gas valve may be closed. Then after a delay of 2 seconds the source exhaust valve may be closed and a high exhaust pressure trip may occur.

A high exhaust pressure trip may be reset by running a source pressure test.

According to various embodiments the API gas valve may be closed within 100 ms of an excess pressure being sensed by the source pressure sensor.

Figure 7D:
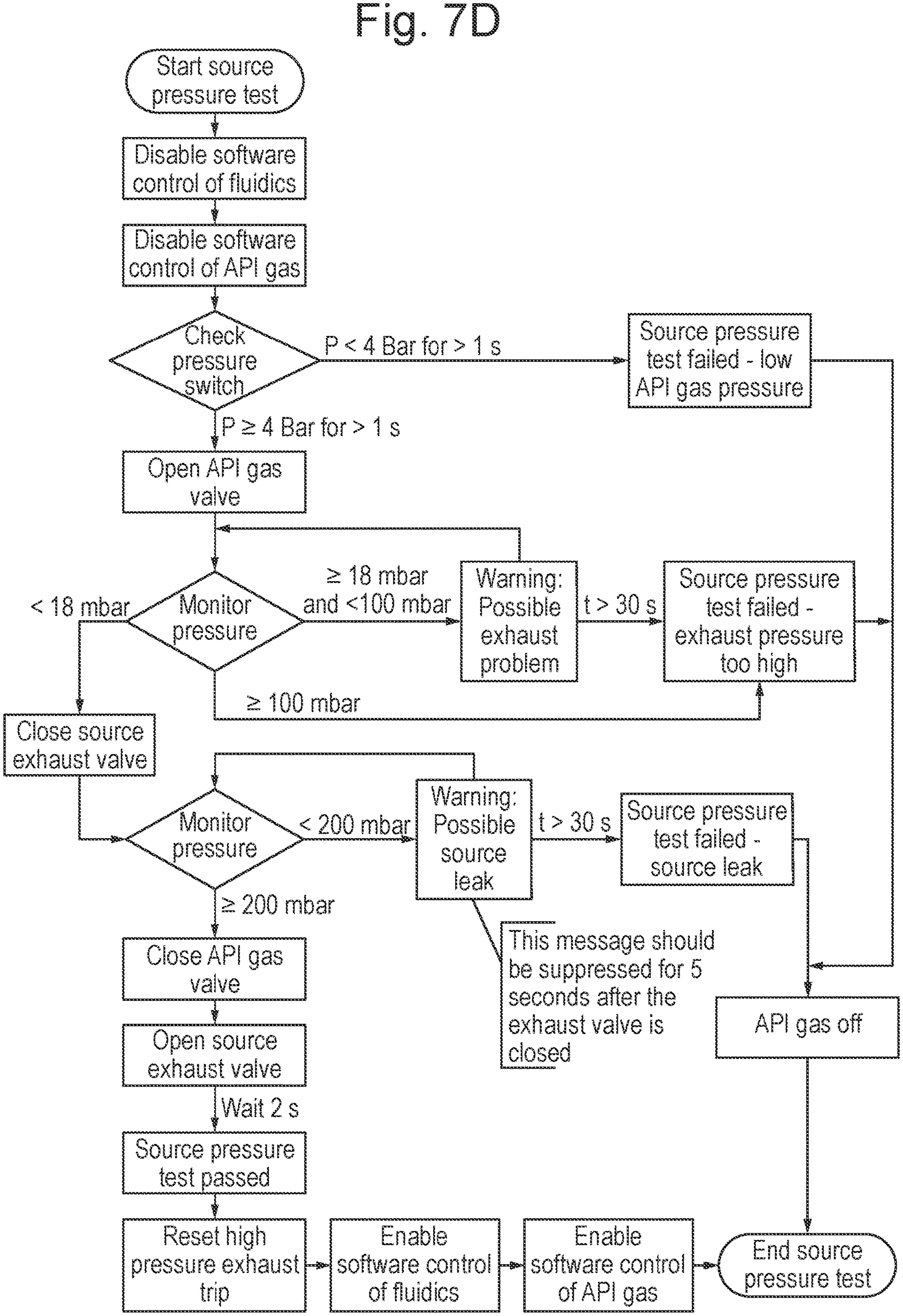

FIG. 7D shows a flow diagram illustrating a source pressure test which may be performed according to various embodiments. The source pressure test may be commenced and software control of fluidics may be disabled so that no fluid flows into the Electrospray probe 401. Software control of the API gas may also be disabled i.e. the API is turned OFF. The pressure switch may then be checked. If the pressure is above 4 bar for more than 1 second then the API gas valve may be opened. However, if the pressure is less than 4 bar for more than 1 second then the source pressure test may move to a failed state due to low API gas pressure.

Assuming that the API gas valve is opened then the pressure may then be monitored. If the pressure is in the range 18-100 mbar then a warning message may be output indicating a possible exhaust problem. If the warning status continues for more than 30 seconds then the system may conclude that the source pressure test has failed due to the exhaust pressure being too high.

If the monitored pressure is determined to be less than 18 mbar then the source exhaust valve is closed.

The pressure may then again be monitored. If the pressure is less than 200 mbar then a warning message indicating a possible source leak may be issued.

If the pressure is determined to be greater than 200 mbar then the API gas valve may be closed and the source exhaust valve may be opened i.e. the system looks to build pressure and to test for leaks. The system may then wait 2 seconds before determining that the source pressure test is passed.

If the source pressure test has been determined to have been passed then the high pressure exhaust trip may be reset and software control of fluidics may be enabled. Software control of the API gas may then be enabled and the source pressure test may then be concluded.

According to various embodiments the API gas valve may be closed within 100 ms of an excess pressure being sensed by the source pressure sensor.

In the event of a source pressure test failure, the divert valve position may be set to divert and the valve may be kept in this position until the source pressure test is either passed or the test is over-ridden.

It is contemplated that the source pressure test may be over-ridden in certain circumstances. Accordingly, a user may be permitted to continue to use an instrument where they have assessed any potential risk as being acceptable. If the user is permitted to continue using the instrument then the source pressure test status message may still be displayed in order to show the original failure. As a result, a user may be reminded of the continuing failed status so that the user may continually re-evaluate any potential risk.

In the event that a user requests a source pressure test over-ride then the system may reset a high pressure exhaust trip and then enable software control of the divert valve. The system may then enable software control of the API gas before determining that the source pressure test over-ride is complete.

The pressure reading used in the source pressure test and source pressure monitoring may include a zero offset correction.

The gas and fluidics control responsibility may be summarised as detailed below:

| Mode of operation | Software | Electronics |
|---|---|---|
| Operate | Gas and fluidics | None |
| Power save | Gas | Fluidics |
| Standby | Gas | Fluidics |
| SPT/Failure | None | Gas and fluidics |
| Vacuum loss | None | Gas and fluidics |
| Gas fail state | None | Gas and fluidics |
| Operate gas OFF | Gas | Fluidics |

A pressure test may be initiated if a user triggers an interlock.

The instrument may operate in various different modes of operation. If the turbo pump speed falls to less than 80% of maximum speed whilst in Operate, Over-pressure or Power save mode then the instrument may enter a Standby state or mode of operation.

If the pressure in the Time of Flight vacuum chamber is greater than $1\times10^{-5}$ mbar and/or the turbo speed is less than 80% of maximum speed then the instrument may be prevented from operating in an Operate mode of operation.

According to various embodiments the instrument may be operated in a Power save mode. In a Power save mode of operation the piston pump may be stopped. If the instrument is switched into a Power save mode while the divert valve is in the LC position, then the divert valve may change to a divert position. A Power save mode of operation may be considered as being a default mode of operation wherein all back voltages are kept ON, front voltages are turned OFF and gas is OFF.

If the instrument switches from a Power save mode of operation to an Operate mode of operation then the piston pump divert valves may be returned to their previous states i.e. their states immediately before a Power save mode of operation was entered. If the Time of Flight region pressure rises above $1.5\times10^{-5}$ mbar while the instrument is in an Operate mode of operation then the instrument may enter an Over-pressure mode of operation or state.

If the Time of Flight pressure enters the range $1\times10^{-8}$ to $1\times10^{-5}$ mbar while the instrument is in an Over-pressure mode of operation then the instrument may enter an Operate mode of operation.

If the API gas pressure falls below its trip level while the instrument is in an Operate mode of operation then the instrument may enter a Gas Fail state or mode of operation. The instrument may remain in a Gas Fail state until both: (i)

the API gas pressure is above its trip level; and (ii) the instrument is operated in either Standby or Power save mode.

According to an embodiment the instrument may transition from an Operate mode of operation to an Operate with Source Interlock Open mode of operation when the source cover is opened. Similarly, the instrument may transition from an Operate with Source Interlock Open mode of operation to an Operate mode of operation when the source cover is closed.

According to an embodiment the instrument may transition from an Over-pressure mode of operation to an Over-pressure with Source Interlock Open mode of operation when the source cover is opened. Similarly, the instrument may transition from an Over-pressure with Source Interlock Open mode of operation to an Over-pressure mode of operation when the source cover is closed.

The instrument may operate in a number of different modes of operation which may be summarised as follows:

| Mode of operation | Analyser voltages | Front end voltages | Desolvation heater | Source heater | API gas control state |
|---|---|---|---|---|---|
| Standby | OFF | OFF | OFF | ON | Enabled |
| Operate | ON | ON | ON | ON | Enabled |
| Power Save | ON | OFF | OFF | ON | Enabled |
| Over-pressure | OFF | ON | ON | ON | Enabled |
| Gas Fail | ON | OFF | OFF | ON | Disabled |
| Operate with Source Interlock | ON | OFF | OFF | OFF | Disabled |
| Over-pressure with Source interlock | OFF | OFF | OFF | OFF | Disabled |
| Not Pumped | OFF | OFF | OFF | OFF | Enabled |

Reference to front end voltages relates to voltages which are applied to the Electrospray capillary electrode 402, the source offset, the source or first ion guide 301, aperture #1 (see FIG. 15A) and the quadrupole ion guide 302.

Reference to analyser voltages relates to all high voltages except the front end voltages.

Reference to API gas refers to desolvation, cone and nebuliser gases.

Reference to Not Pumped refers to all vacuum states except pumped.

If any high voltage power supply loses communication with the overall system or a global circuitry control module then the high voltage power supply may be arranged to switch OFF its high voltages. The global circuitry control module may be arranged to detect the loss of communication of any subsystem such as a power supply unit ("PSU"), a pump or gauge etc.

According to various embodiments the system will not indicate its state or mode of operation as being Standby if the system is unable to verify that all subsystems are in a Standby state.

As is apparent from the above table, when the instrument is operated in an Operate mode of operation then all voltages are switched ON. When the instrument transitions to operate in an Operate mode of operation then the following voltages are ON namely transfer lens voltages, ion guide voltages, voltages applied to the first ion guide 301 and the capillary electrode 402. In addition, the desolvation gas and desolvation heater are all ON.

If a serious fault were to develop then the instrument may switch to a Standby mode of operation wherein all voltages apart from the source heater provided in the ion block 802 are turned OFF and only a service engineer can resolve the fault. It will be understood that the instrument may only be put into a Standby mode of operation wherein voltages apart from the source heater in the ion block 802 are turned OFF only if a serious fault occurs or if a service engineer specifies that the instrument should be put into a Standby mode operation. A user or customer may (or may not) be able to place an instrument into a Standby mode of operation. Accordingly, in a Standby mode of operation all voltages are OFF and the desolvation gas flow and desolvation heater 404 are all OFF. Only the source heater in the ion block 802 may be left ON.

The instrument may be kept in a Power Save mode by default and may be switched so as to operate in an Operate mode of operation wherein all the relevant voltages and gas flows are turned ON. This approach significantly reduces the time taken for the instrument to be put into a useable state. When the instrument transitions to a Power Save mode of operation then the following voltages are ON—pusher electrode 305, reflectron 306, ion detector 307 and more generally the various Time of Flight mass analyser 304 voltages.

The stability of the power supplies for the Time of Flight mass analyser 304, ion detector 307 and reflectron 306 can affect the mass accuracy of the instrument. The settling time when turning ON or switching polarity on a known conventional instrument is around 20 minutes.

It has been established that if the power supplies are cold or have been left OFF for a prolonged period of time then they may require up to 10 hours to warm up and stabilise. For this reason customers may be prevented from going into a Standby mode of operation which would switch OFF the voltages to the Time of Flight analyser 304 including the reflectron 306 and ion detector 307 power supplies.

On start-up the instrument may move to a Power save mode of operation as quickly as possible as this allows the power supplies the time they need to warm up whilst the instrument is pumping down. As a result, by the time the instrument has reached the required pressure to carry out instrument setup the power supplies will have stabilised thus reducing any concerns relating to mass accuracy.

According to various embodiments in the event of a vacuum failure in the vacuum chamber housing the Time of Flight mass analyser 304 then power may be shut down or turned OFF to all the peripherals or sub-modules e.g. the ion source 300, first ion guide 301, the segmented quadrupole rod set ion guide 302, the transfer optics 303, the pusher electrode 305 high voltage supply, the reflectron 306 high voltage supply and the ion detector 307 high voltage supply. The voltages are primarily all turned OFF for reasons of instrument protection and in particular protecting sensitive components of the Time of Flight mass analyser 307 from high voltage discharge damage.

It will be understood that high voltages may be applied to closely spaced electrodes in the Time of Flight mass analyser 304 on the assumption that the operating pressure will be very low and hence there will be no risk of sparking or electrical discharge effects. Accordingly, in the event of a serious vacuum failure in the vacuum chamber housing the Time of Flight mass analyser 304 then the instrument may remove power or switch power OFF to the following modules or sub-modules: (i) the ion source high voltage supply module; (ii) the first ion guide 301 voltage supply module; (iii) the quadrupole ion guide 302 voltage supply module; (iv) the high voltage pusher electrode 305 supply module;

(v) the high voltage reflectron 306 voltage supply module; and (vi) the high voltage detector 307 module. The instrument protection mode of operation is different to a Standby mode of operation wherein electrical power is still supplied to various power supplies or modules or sub-modules. In contrast, in an instrument protection mode of operation power is removed to the various power supply modules by the action of a global circuitry control module. Accordingly, if one of the power supply modules were faulty it would still be unable in a fault condition to turn voltages ON because the module would be denied power by the global circuitry control module.

Figure 8:
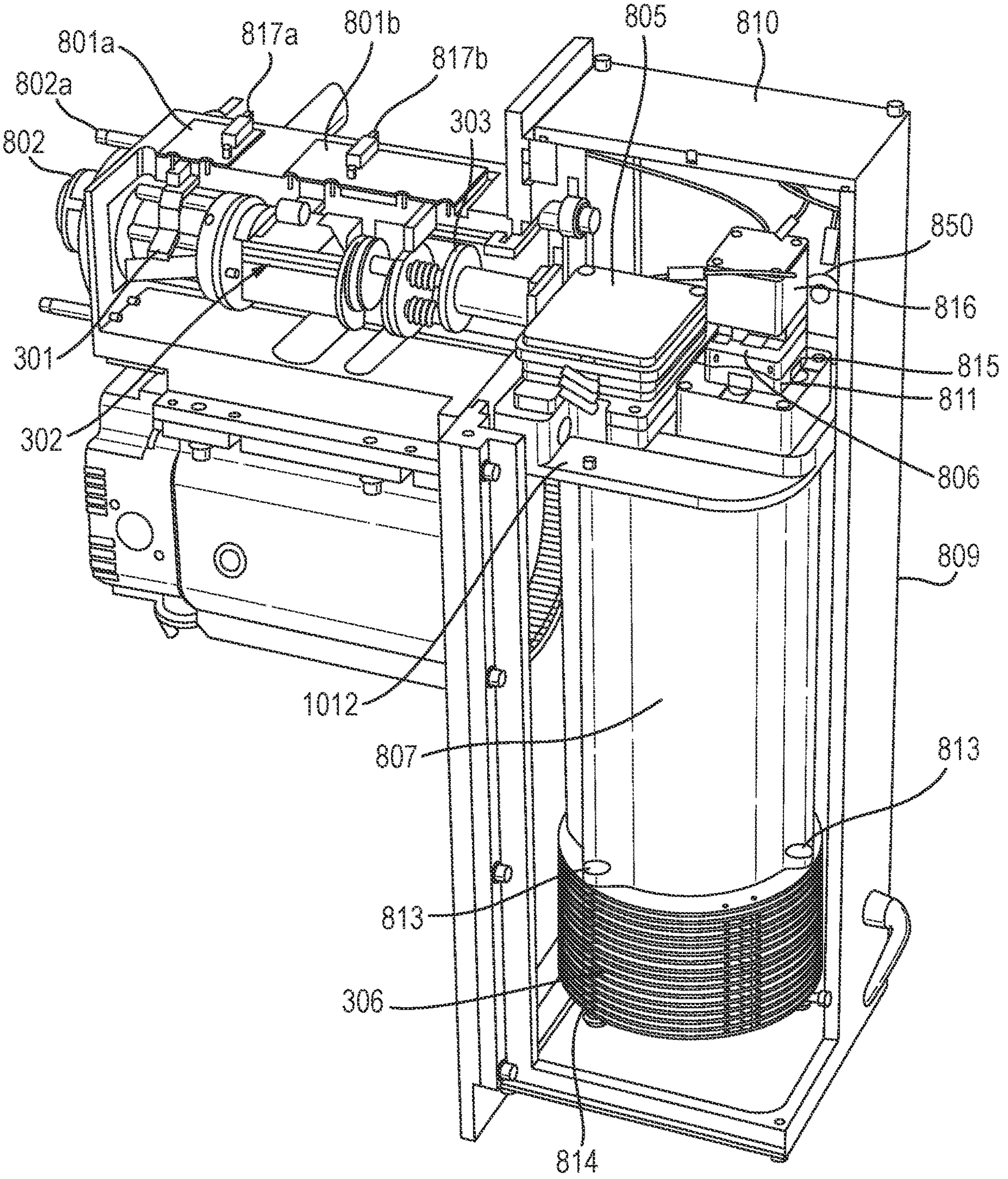
FIG. 8 shows in more detail a mass spectrometer according to various embodiments.

FIG. 8 shows a view of a mass spectrometer 100 according to various embodiments in more detail. The mass spectrometer 100 may comprise a first vacuum PCB interface 801*a* having a first connector 817*a* for directly connecting the first vacuum interface PCB 801*a* to a first local control circuitry module (not shown) and a second vacuum PCB interface 801*b* having a second connector 817*b* for directly connecting the second vacuum interface PCB 801*b* to a second local control circuitry module (not shown).

The mass spectrometer 100 may further comprise a pumping or ion block 802 which is mounted to a pumping block or thermal isolation stage (not viewable in FIG. 8). According to various embodiments one or more dowels or projections 802*a* may be provided which enable a source enclosure (not shown) to connect to and secure over and house the ion block 802. The source enclosure may serve the purpose of preventing a user from inadvertently coming into contact with any high voltages associated with the Electrospray probe 402. A micro-switch or other form of interlock may be used to detect opening of the source enclosure by a user in order to gain source access whereupon high voltages to the ion source 402 may then be turned OFF for user safety reasons.

Ions are transmitted via an initial or first ion guide 301, which may comprise a conjoined ring ion guide, and then via a segmented quadrupole rod set ion guide 302 to a transfer lens or transfer optics arrangement 303. The transfer optics 303 may be designed in order to provide a highly efficient ion guide and interface into the Time of Flight mass analyser 304 whilst also reducing manufacturing costs.

Ions may be transmitted via the transfer optics 303 so that the ions arrive in a pusher electrode assembly 305. The pusher electrode assembly 305 may also be designed so as to provide high performance whilst at the same time reducing manufacturing costs.

According to various embodiments a cantilevered Time of Flight stack 807 may be provided. The cantilevered arrangement may be used to mount a Time of Flight stack or flight tube 807 and has the advantage of both thermally and electrically isolating the Time of Flight stack or flight tube 807. The cantilevered arrangement represents a significant design departure from conventional instruments and results in substantial improvements in instrument performance.

According to an embodiment an alumina ceramic spacer and a plastic (PEEK) dowel may be used.

According to an embodiment when a lock mass is introduced and the instrument is calibrated then the Time of Flight stack or flight tube 807 will not be subjected to thermal expansion. The cantilevered arrangement according to various embodiments is in contrast to known arrangements wherein both the reflectron 306 and the pusher assembly 305 were mounted to both ends of a side flange. As a result conventional arrangements were subjected to thermal impact.

Ions may be arranged to pass into a flight tube 807 and may be reflected by a reflectron 306 towards an ion detector 811. The output from the ion detector 811 is passed to a pre-amplifier (not shown) and then to an Analogue to Digital Converter ("ADC") (also not shown). The reflectron 306 is preferably designed so as to provide high performance whilst also reducing manufacturing cost and improving reliability.

As shown in FIG. 8 the various electrode rings and spacers which collectively form the reflectron subassembly may be mounted to a plurality of PEEK support rods 814. The reflectron subassembly may then be clamped to the flight tube 807 using one or more cotter pins 813. As a result, the components of the reflectron subassembly are held under compression which enables the individual electrodes forming the reflectron to be maintained parallel to each other with a high level of precision. According to various embodiments the components may be held under spring loaded compression.

The pusher electrode assembly 305 and the detector electronics or a discrete detector module may be mounted to a common pusher plate assembly 1012. This is described in more detail below with reference to FIGS. 10A-10C.

The Time of Flight mass analyser 304 may have a full length cover 809 which may be readily removed enabling extensive service access. The full length cover 809 may be held in place by a plurality of screws e.g. 5 screws. A service engineer may undo the five screws in order to expose the full length of the time of flight tube 807 and the reflectron 306.

The mass analyser 304 may further comprise a removable lid 810 for quick service access. In particular, the removable lid 810 may provide access to a service engineer so that the service engineer can replace an entrance plate 1000 as shown in FIG. 10C. In particular, the entrance plate 1000 may become contaminated due to ions impacting upon the surface of the entrance plate 1000 resulting in surface charging effects and potentially reducing the efficiency of ion transfer from the transfer optics 303 into a pusher region adjacent the pusher electrode 305.

A SMA (SubMiniature version A) connector or housing 850 is shown but an AC coupler 851 is obscured from view.

Figure 9:
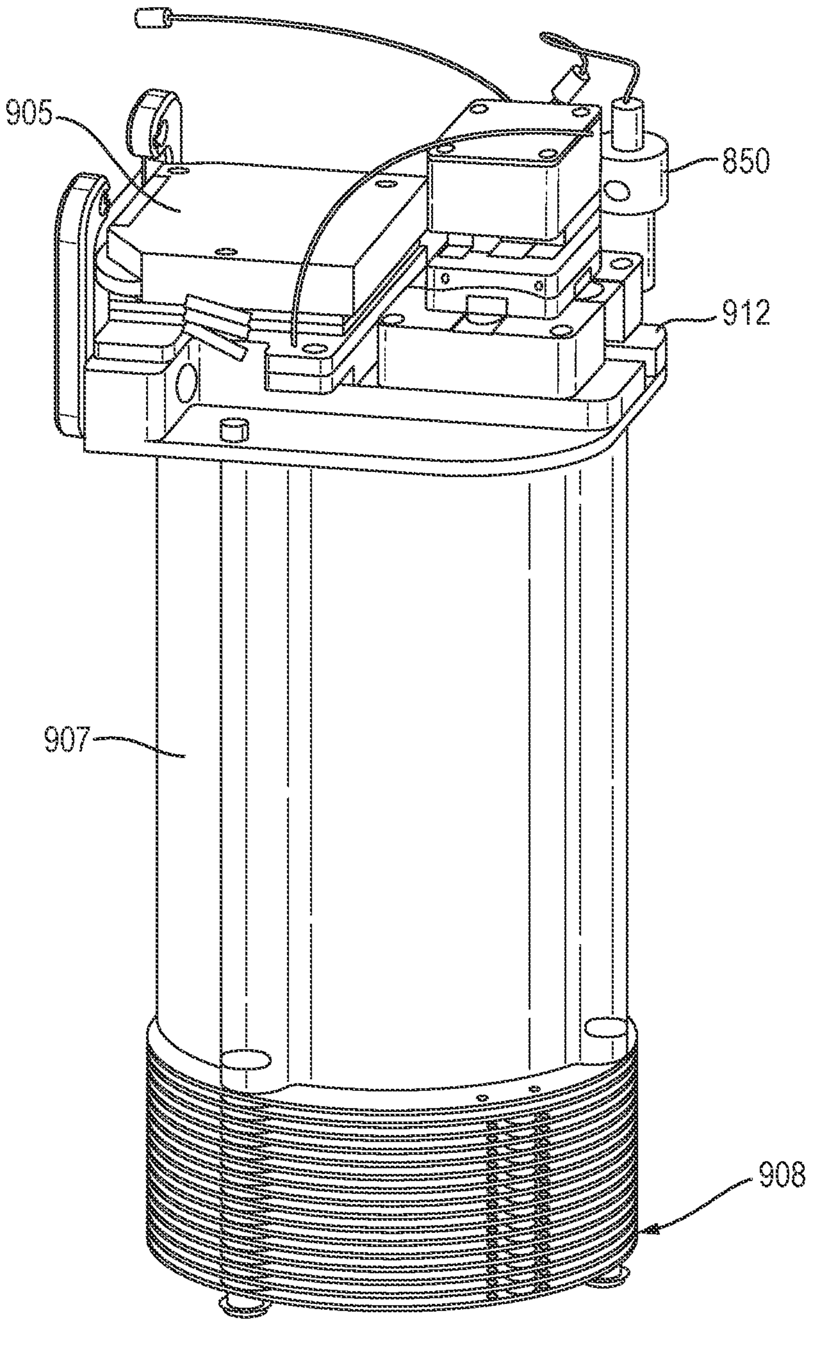
FIG. 9 shows a Time of Flight mass analyser assembly comprising a pusher plate assembly having mounted thereto a pusher electronics module and an ion detector module and wherein a reflectron assembly is suspended from an extruded flight tube which in turn is suspended from the pusher plate assembly.

FIG. 9 shows a pusher plate assembly 912, flight tube 907 and reflectron stack 908. A pusher assembly 905 having a pusher shielding cover is also shown. The flight tube 907 may comprise an extruded or plastic flight tube. The reflectron 306 may utilise fewer ceramic components than conventional reflectron assemblies thereby reducing manufacturing cost. According to various embodiments the reflectron 306 may make greater use of PEEK compared with conventional reflectron arrangements.

A SMA (SubMiniature version A) connector or housing 850 is shown but an AC coupler 851 is obscured from view.

According to other embodiments the reflectron 306 may comprise a bonded reflectron. According to another embodiment the reflectron 306 may comprise a metalised ceramic arrangement. According to another embodiment the reflectron 306 may comprise a jigged then bonded arrangement.

According to alternative embodiments instead of stacking, mounting and fixing multiple electrodes or rings, a single bulk piece of an insulating material such as a ceramic may be provided. Conductive metalised regions on the surface may then be provided with electrical connections to these regions so as to define desired electric fields. For example, the inner surface of a single piece of cylindrical shaped ceramic may have multiple parallel metalised conductive rings deposited as an alternative method of providing potential surfaces as a result of stacking multiple individual rings as is known conventionally. The bulk ceramic material provides insulation between the different potentials applied to different surface regions. The alternative arrangement reduces the number of components thereby simplifying the overall design, improving tolerance build up and reducing manufacturing cost. Furthermore, it is contemplated that multiple devices may be constructed this way and may be combined with or without grids or lenses placed in between. For example, according to one embodiment a first grid electrode may be provided, followed by a first ceramic cylindrical element, followed by a second grid electrode followed by a second ceramic cylindrical element.

Figure 10A:
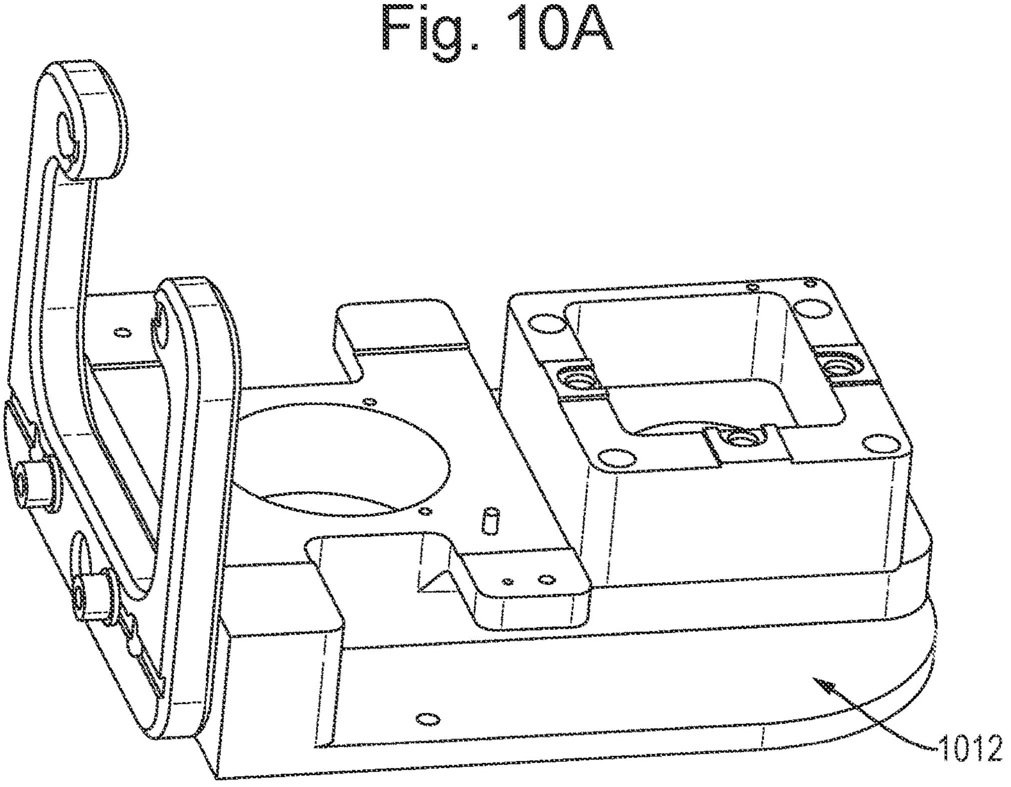
FIG. 10A shows in more detail a pusher plate assembly.
Figure 10B:
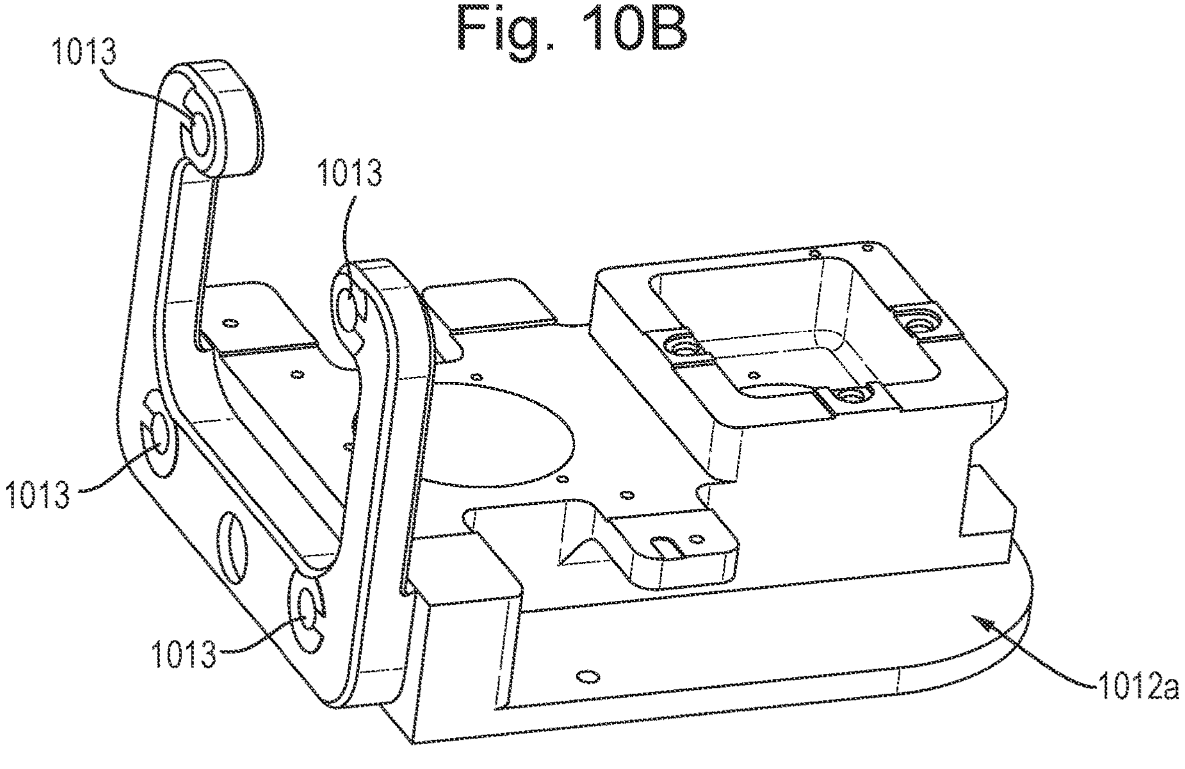
FIG. 10B shows a monolithic pusher plate assembly according to various embodiments and FIG. 10C shows a pusher plate assembly with a pusher electrode assembly or module and an ion detector assembly or module mounted thereto.
Figure 10C:
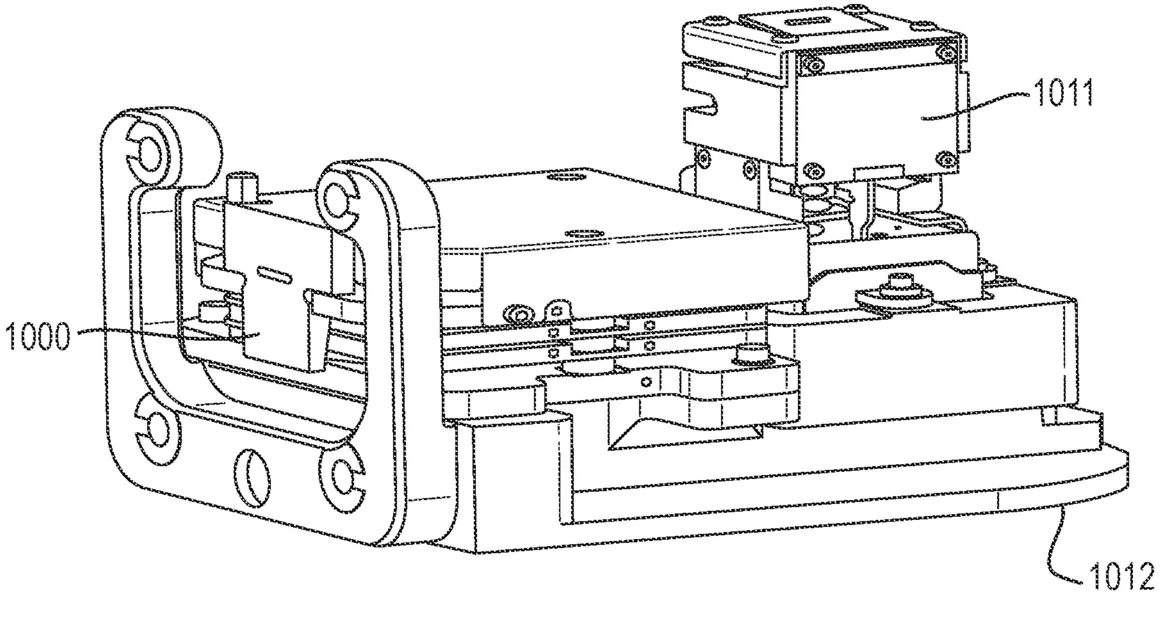

FIG. 10A shows a pusher plate assembly 1012 comprising three parts according to various embodiments. According to an alternative embodiment a monolithic support plate 1012*a* may be provided as shown in FIG. 10B. The monolithic support plate 1012*a* may be made by extrusion. The support plate 1012*a* may comprise a horse shoe shaped bracket having a plurality (e.g. four) fixing points 1013. According to an embodiment four screws may be used to connect the horse shoe shaped bracket to the housing of the mass spectrometer and enable a cantilevered arrangement to be provided. The bracket may be maintained at a voltage which may be the same as the Time of Flight voltage i.e. 4.5 kV. By way of contrast, the mass spectrometer housing may be maintained at ground voltage i.e. 0V.

FIG. 10C shows a pusher plate assembly 1012 having mounted thereon a pusher electrode assembly and an ion detector assembly 1011. An entrance plate 1000 having an ion entrance slit or aperture is shown.

Figure 16A:
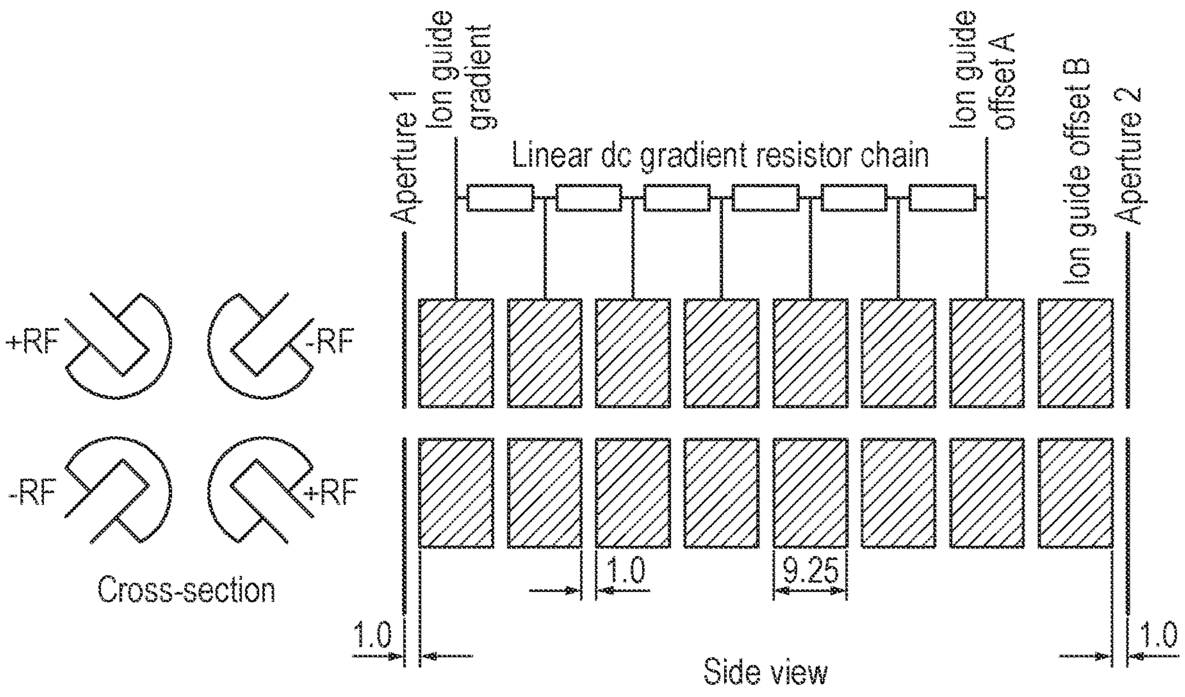
FIG. 16A shows in more detail a segmented quadrupole rod set ion guide according to various embodiments which may be provided downstream of the first ion guide and which comprises a plurality of rod electrodes.
Figure 16B:
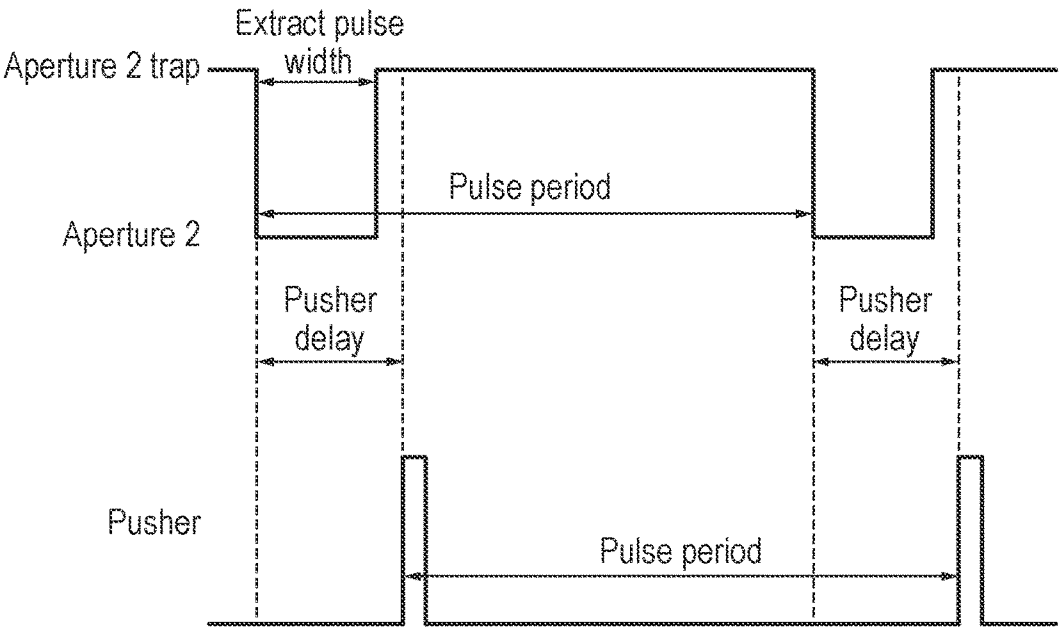
FIG. 16B illustrates how a voltage pulse applied to a pusher electrode of a Time of Flight mass analyser may be synchronised with trapping and releasing ions from the end region of the segmented quadrupole rod set ion guide.
Figure 16C:
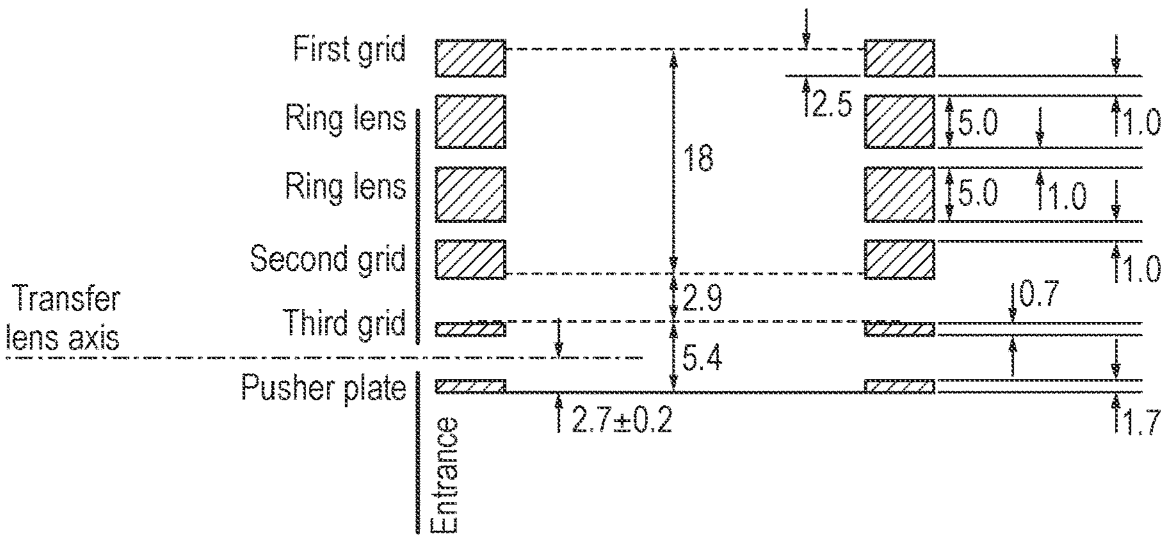
FIG. 16C illustrates in more detail the pusher electrode geometry and shows the arrangement of grid and ring lenses or electrodes and their relative spacing.

The pusher electrode may comprise a double grid electrode arrangement having a 2.9 mm field free region between a second and third grid electrode as shown in more detail in FIG. 16C.

Figure 11:
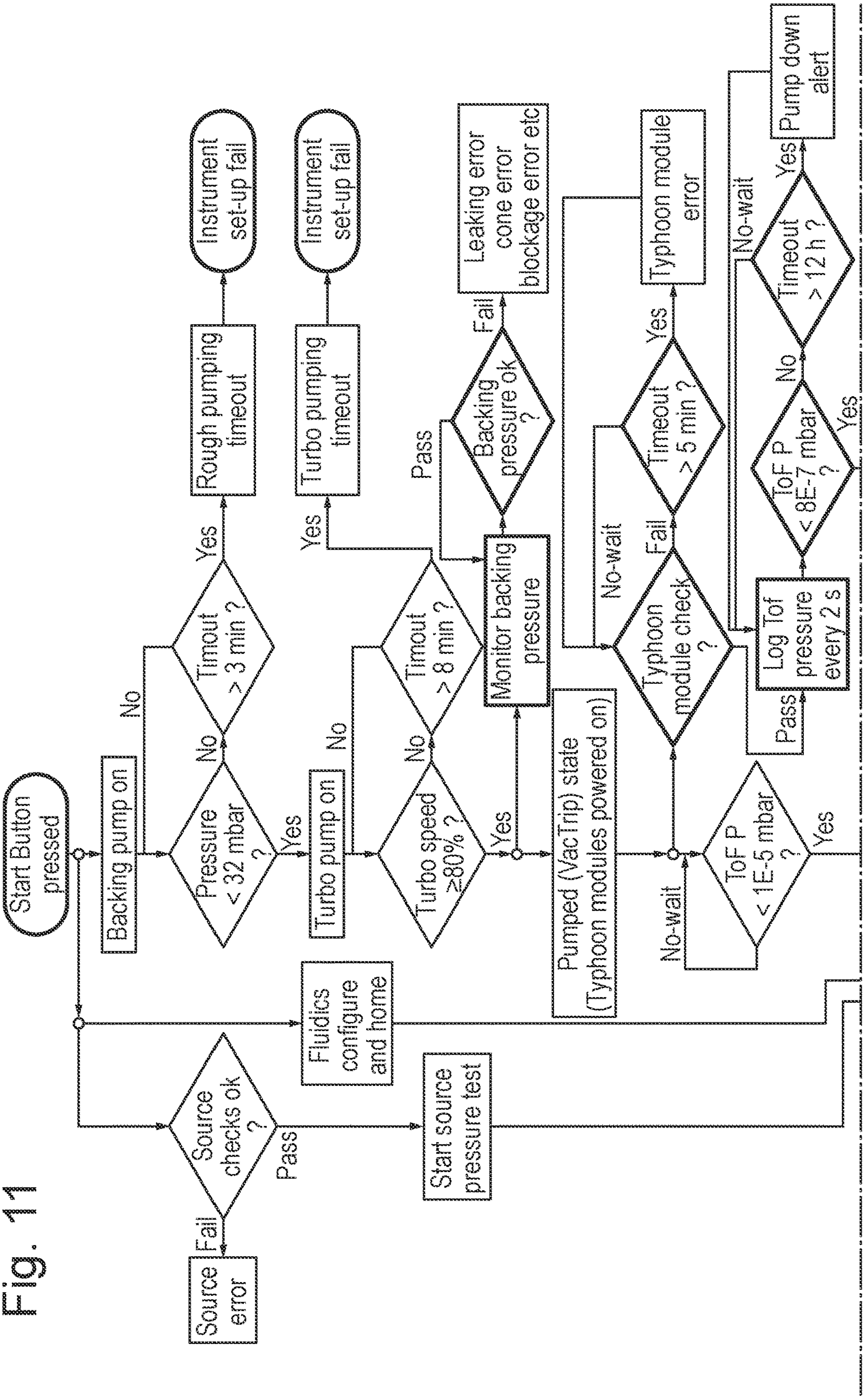
FIG. 11 shows a flow diagram illustrating various processes which occur upon a user pressing a start button on the front panel of the instrument according to various embodiments.
Figure 11:
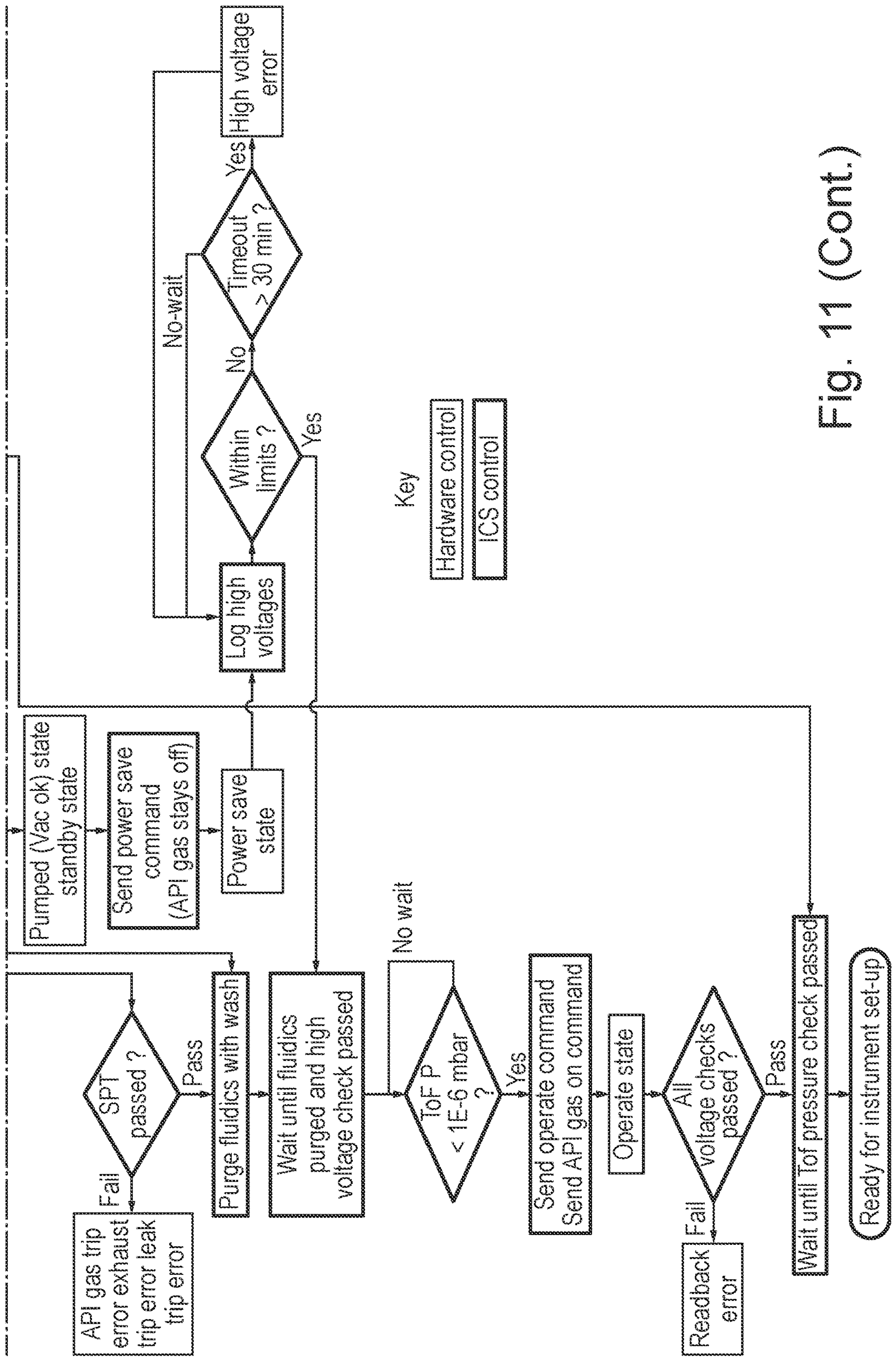

FIG. 11 shows a flow diagram illustrating various processes which may occur once a start button has been pressed.

According to an embodiment when the backing pump is turned ON a check may be made that the pressure is <32 mbar within three minutes of operation. If a pressure of <32 mbar is not achieved or established within three minutes of operation then a rough pumping timeout (amber) warning may be issued.

Figure 12A:
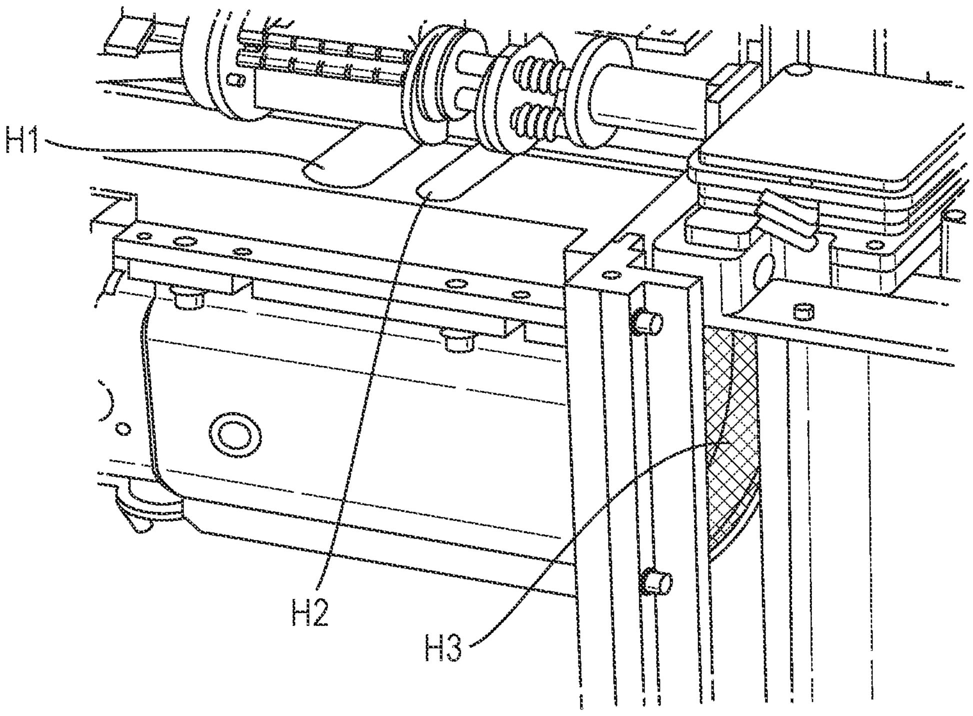
FIG. 12A shows in greater detail three separate pumping ports of a turbo molecular pump according to various embodiments and FIG. 12B shows in greater detail two of the three pumping ports which are arranged to pump separate vacuum chambers.

FIG. 12A shows the three different pumping ports of the turbo molecular pump according to various embodiments. The first pumping port H1 may be arranged adjacent the segmented quadrupole rod set 302. The second pumping port H2 may be arranged adjacent a first lens set of the transfer lens arrangement 303. The third pumping port (which may be referred to either as the H port or the H3 port) may be directly connected to Time of Flight mass analyser 304 vacuum chamber.

Figure 12B:
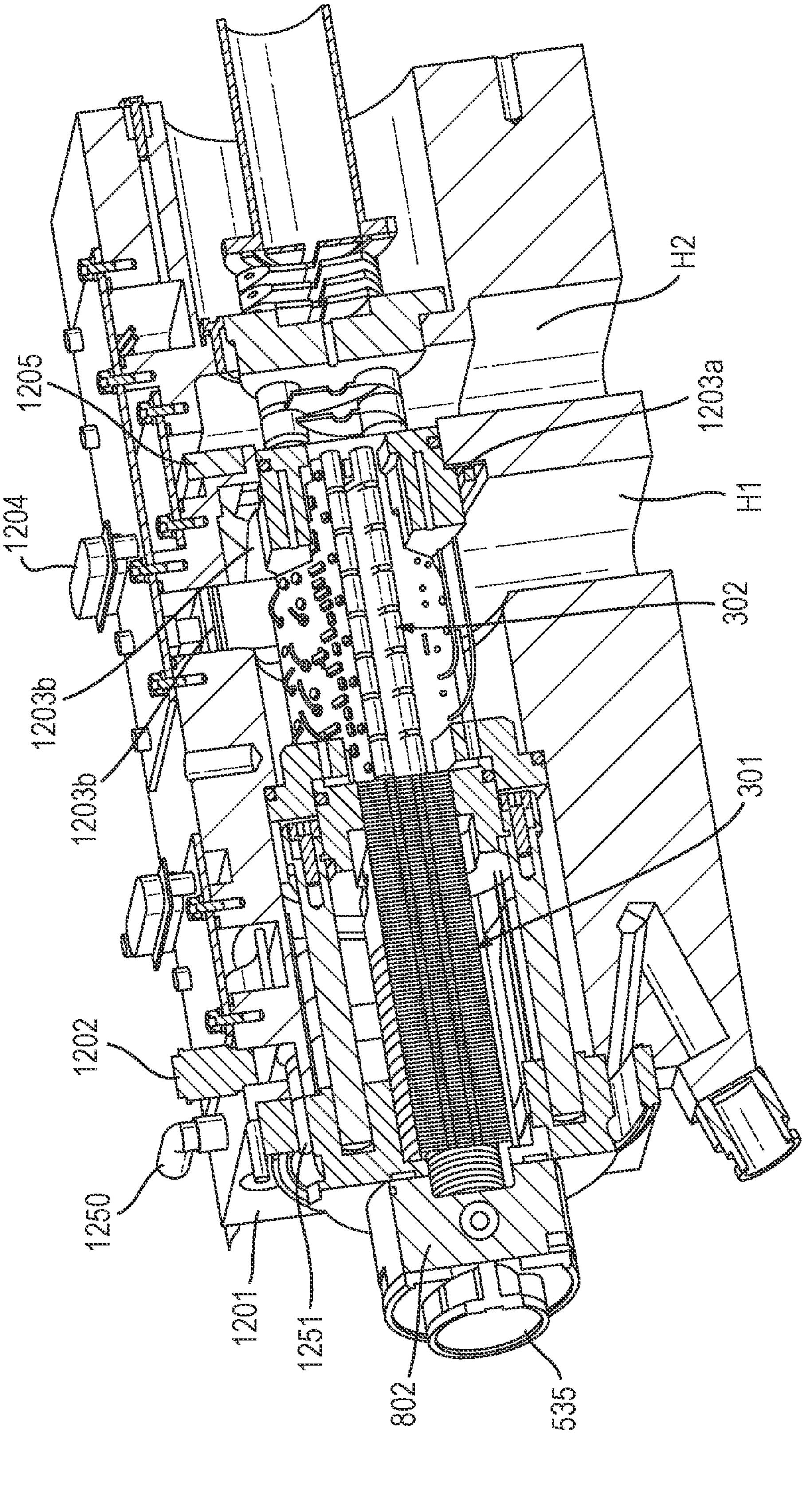

FIG. 12B shows from a different perspective the first pumping port H1 and the second pumping port H2. The user clamp 535 which is mounted in use to the ion block 802 is shown. The first ion guide 301 and the quadrupole rod set ion guide 302 are also indicated. A nebuliser or cone gas input 1201 is also shown. An access port 1251 is provided for measuring pressure in the source. A direct pressure sensor is provided (not fully shown) for measuring the pressure in the vacuum chamber housing the initial ion guide 301 and which is in fluid communication with the internal volume of the ion block 802. An elbow fitting 1250 and an over pressure relief valve 1202 are also shown.

One or more part-rigid and part-flexible printed circuit boards ("PCBs") may be provided. According to an embodiment a printed circuit board may be provided which comprises a rigid portion 1203*a* which is located at the exit of the quadrupole rod set region 302 and which is optionally at least partly arranged perpendicular to the optic axis or direction of ion travel through the quadrupole rod set 302. An upper or other portion of the printed circuit board may comprise a flexible portion 1203*b* so that the flexible portion 1203*b* of the printed circuit board has a stepped shape in side profile as shown in FIG. 12B.

According to various embodiments the H1 and H2 pumping ports may comprise EMC splinter shields.

It is also contemplated that the turbo pump may comprise dynamic EMC sealing of the H or H3 port. In particular, an EMC mesh may be provided on the H or H3 port.

Figure 13:
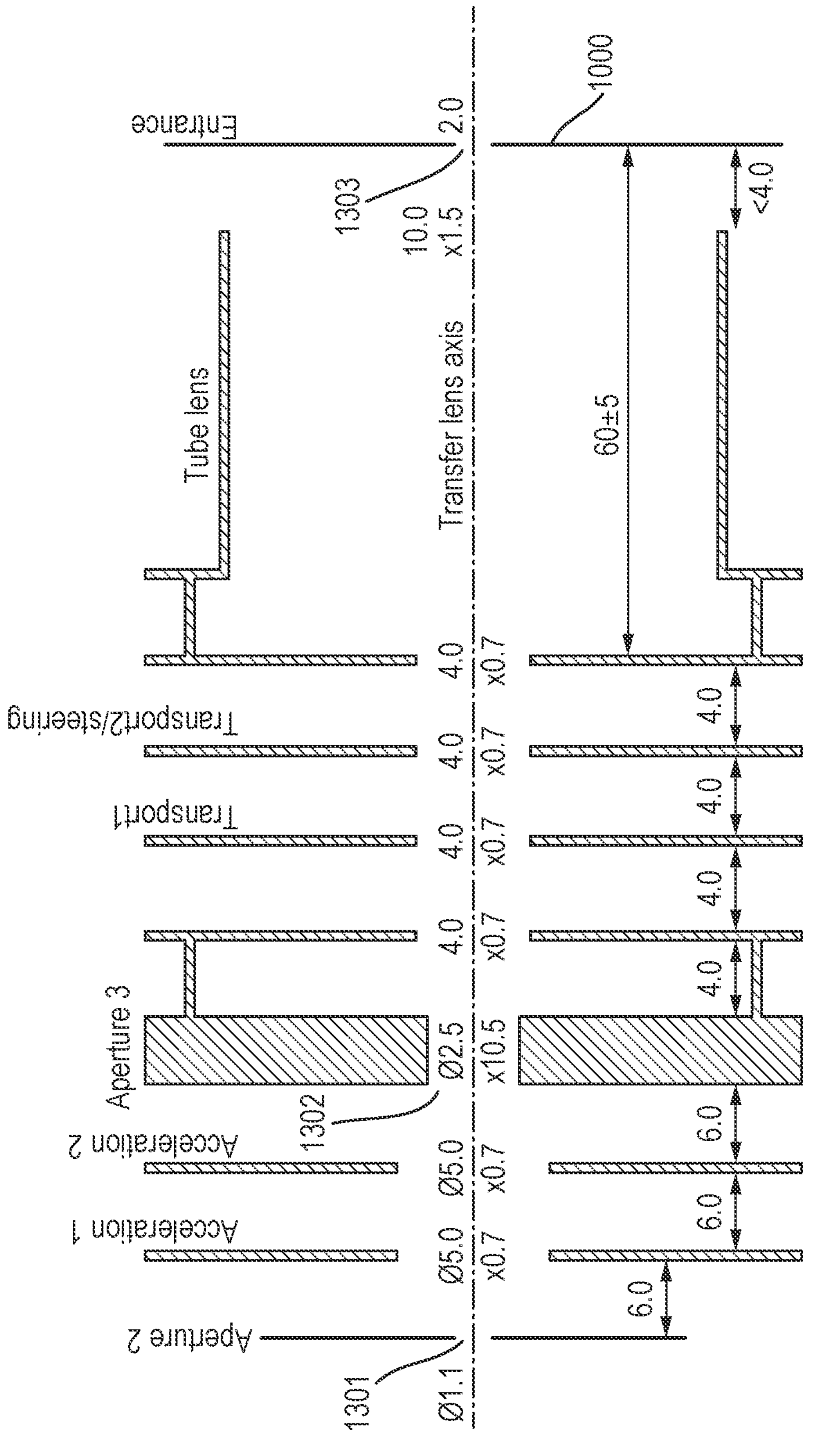
FIG. 13 shows in more detail a transfer lens arrangement.

FIG. 13 shows in more detail the transfer lens arrangement 303 and shows a second differential pumping aperture (Aperture #2) 1301 which separates the vacuum chamber housing the segmented quadrupole rod set 302 from first transfer optics which may comprise two acceleration electrodes. The relative spacing of the lens elements, their internal diameters and thicknesses according to an embodiment are shown.

However, it should be understood that the relative spacing, size of apertures and thicknesses of the electrodes or lens elements may be varied from the specific values indicated in FIG. 13.

The region upstream of the second aperture (Aperture #2) 1301 may be in fluid communication with the first pumping port H1 of the turbo pump. A third differential pumping aperture (Aperture #3) 1302 may be provided between the first transfer optics and second transfer optics.

The region between the second aperture (Aperture #2) 1301 and the third aperture (Aperture #3) 1302 may be in fluid communication with the second pumping port H2 of the turbo pump.

The second transfer optics which is arranged downstream of the third aperture 1302 may comprises a lens arrangement comprising a first electrode which is electrical connection with the third aperture (Aperture #3) 1302. The lens arrangement may further comprise a second (transport) lens and a third (transport/steering) lens. Ions passing through the second transfer optics then pass through a tube lens before passing through an entrance aperture 1303. Ions passing through the entrance aperture 1303 pass through a slit or entrance plate 1000 into a pusher electrode assembly module.

The lens apertures after Aperture #3 1302 may comprise horizontal slots or plates. Transport 2/steering lens may comprise a pair of half plates.

The entrance plate 1000 may be arranged to be relatively easily removable by a service engineer for cleaning purposes.

One or more of the lens plates or electrodes which form a part of the overall transfer optics 303 may be manufactured by introducing an overcompensation etch of 5%. An additional post etch may also be performed. Conventional lens plates or electrodes may have a relatively sharp edge as a result of the manufacturing process. The sharp edges can cause electrical breakdown with conventional arrangements. Lens plates or electrodes which may be fabricated according to various embodiments using an overcompensation etching approach and/or additional post etch may have significantly reduced sharp edges which reduces the potential for electrical breakdown as well as reducing manufacturing cost.

Figure 14A:
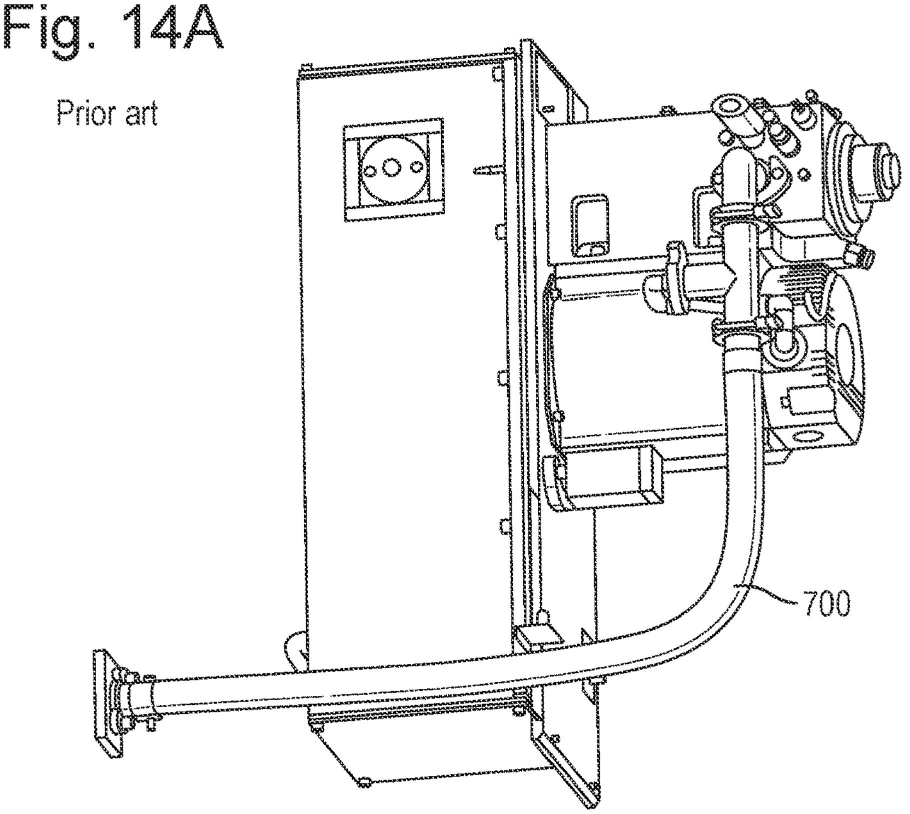
Fig. 14A Prior art
FIG. 14A shows details of a known internal vacuum configuration and FIG. 14B shows details of a new internal vacuum configuration according to various embodiments.
Figure 14B:
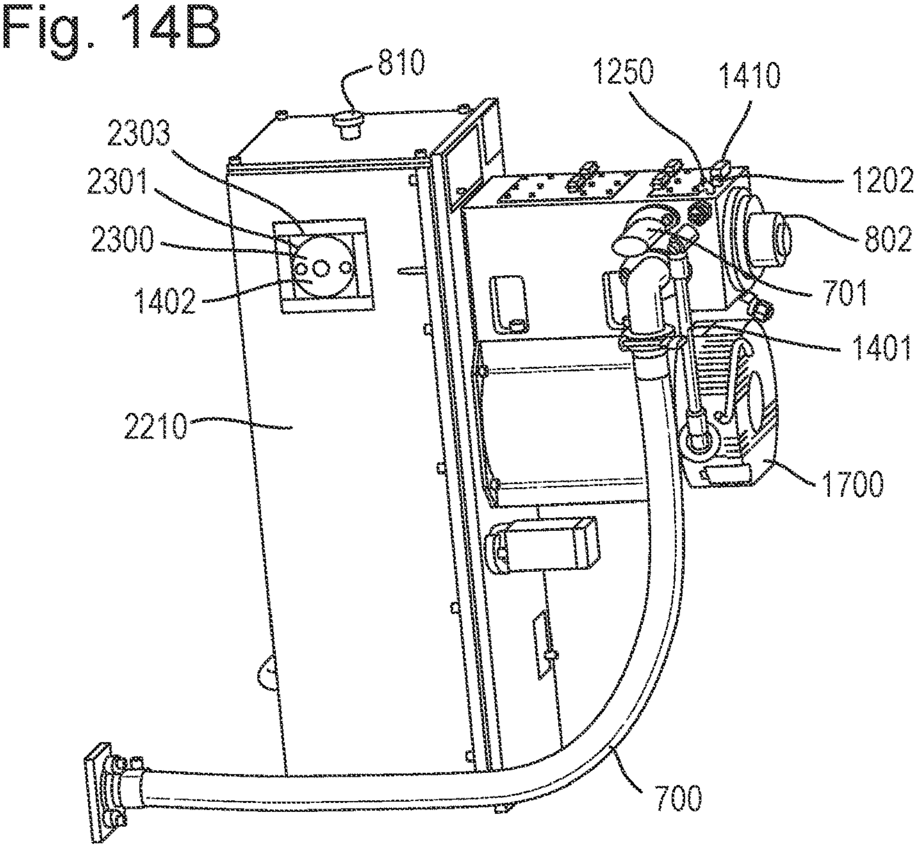

FIG. 14A shows details of a known internal vacuum configuration and FIG. 14B shows details of a new internal vacuum configuration according to various embodiments.

A conventional arrangement is shown in FIG. 14A wherein the connection 700 from the backing pump to the first vacuum chamber of a mass spectrometer makes a T-connection into the turbo pump when backing pressure is reached. However, this requires multiple components so that multiple separate potential leak points are established. Furthermore, the T-connection adds additional manufacturing and maintenance costs.

FIG. 14B shows an embodiment wherein the backing pump 700 is only directly connected to the first vacuum chamber i.e. the T-connection is removed. A separate connection 1401 is provided between the first vacuum chamber and the turbo pump.

A high voltage supply feed through 1402 is shown which provides a high voltage (e.g. 1.1 kV) to the pusher electrode module 305. An upper access panel 810 is also shown. A Pirani pressure gauge 701 is arranged to measure the vacuum pressure in the vacuum chamber housing the first ion guide 301. An elbow gas fitting 1250 is shown through which desolvation/cone gas may be supplied. With reference to FIG. 14B, behind the elbow gas fitting 1250 is shown the over pressure relief valve 1202 and behind the over pressure relief valve 1202 is shown a further elbow fitting which enables gas pressure from the source to be directly measured.

Figure 15A:
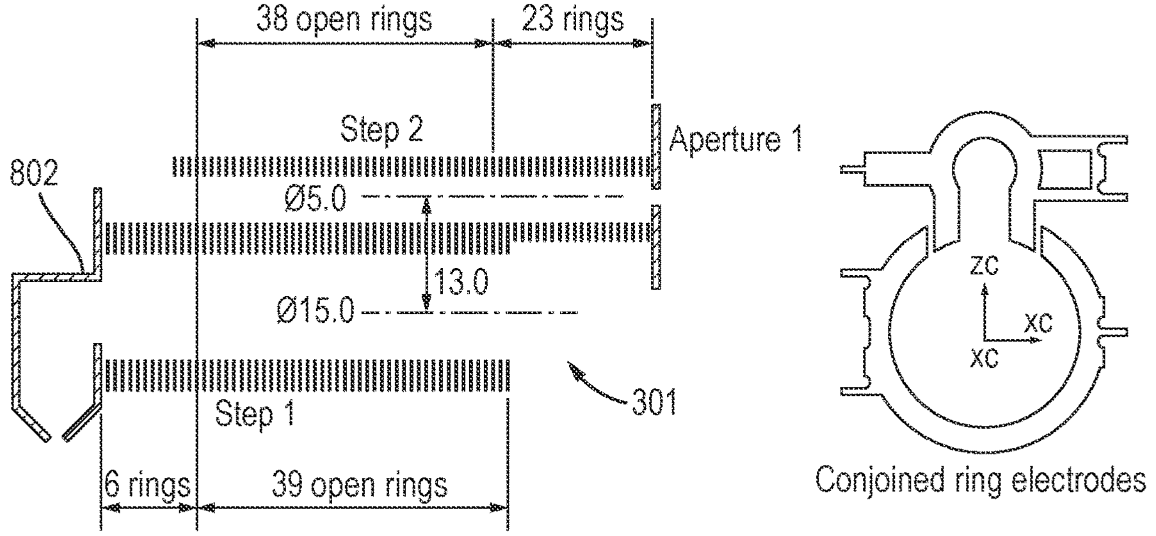
FIG. 15A shows a schematic of an arrangement of ring electrodes and conjoined ring electrodes forming a first ion guide which is arranged to separate charged ions from undesired neutral particles.

FIG. 15A shows a schematic of the ion block 802 and source or first ion guide 301. According to an embodiment the source or first ion guide 301 may comprise six initial ring electrodes followed by 38-39 open ring or conjoined electrodes. The source or first ion guide 301 may conclude with a further 23 rings. It will be appreciated, however, that the particular ion guide arrangement 301 shown in FIG. 15A may be varied in a number of different ways. In particular, the number of initial ring electrodes (e.g. 6) and/or the number of final stage (e.g. 23) ring electrodes may be varied. Similarly, the number of intermediate open ring or conjoined ring electrodes (e.g. 38-39) may also be varied.

It should be understood that the various dimensions illustrated on FIG. 15A are for illustrative purposes only and are not intended to be limiting. In particular, embodiments are contemplated wherein the sizing of ring and/or conjoined ring electrodes may be different from that shown in FIG. 15A.

A single conjoined ring electrode is also shown in FIG. 15A.

According to various embodiment the initial stage may comprise 0-5, 5-10, 10-15, 15-20, 20-25, 25-30, 30-35, 35-40, 40-45, 45-50 or >50 ring or other shaped electrodes. The intermediate stage may comprise 0-5, 5-10, 10-15, 15-20, 20-25, 25-30, 30-35, 35-40, 40-45, 45-50 or >50 open ring, conjoined ring or other shaped electrodes. The final stage may comprise 0-5, 5-10, 10-15, 15-20, 20-25, 25-30, 30-35, 35-40, 40-45, 45-50 or >50 ring or other shaped electrodes.

The ring electrodes and/or conjoined ring electrodes may have a thickness of 0.5 mm and a spacing of 1.0 mm. However, the electrodes may have other thicknesses and/or different spacings.

Aperture #1 plate may comprise a differential pumping aperture and may have a thickness of 0.5 mm and an orifice diameter of 1.50 mm. Again, these dimensions are illustrative and are not intended to be limiting.

A source or first ion guide RF voltage may be applied to all Step 1 and Step 2 electrodes in a manner as shown in FIG. 15A. The source or first ion guide RF voltage may comprise 200 V peak-to-peak at 1.0 MHz.

Embodiments are contemplated wherein a linear voltage ramp may be applied to Step 2 Offset (cone).

The Step 2 Offset (cone) voltage ramp duration may be made equal to the scan time and the ramp may start at the beginning of a scan. Initial and final values for the Step 2 Offset (cone) ramp may be specified over the complete range of Step 2 Offset (cone).

Figure 15B:
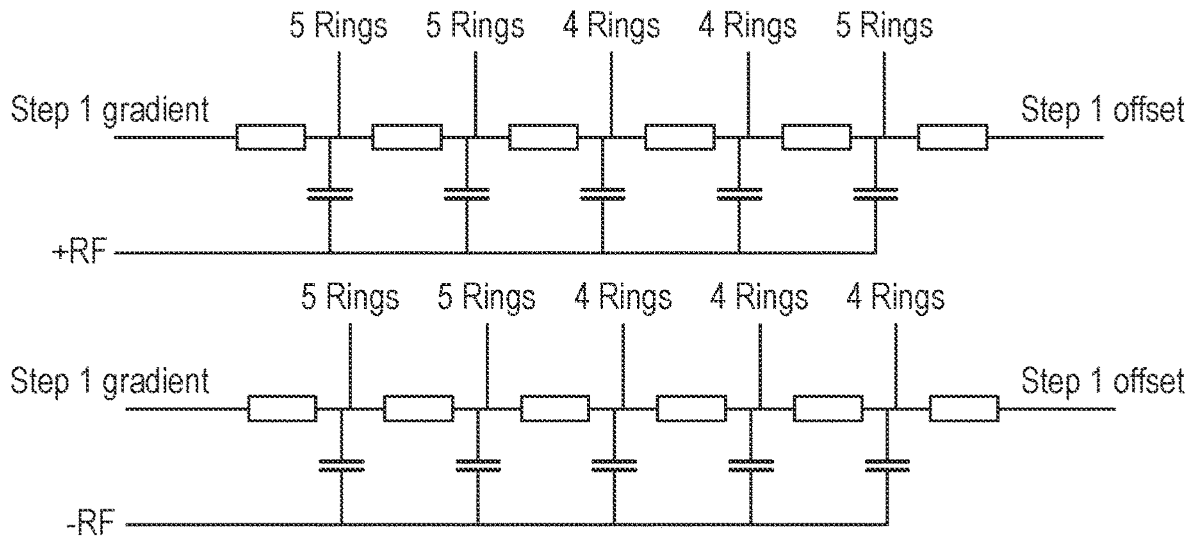
FIG. 15B shows a resistor chain which may be used to produce a linear axial DC electric field along the length of a first portion of the first ion guide and FIG. 15C shows a resistor chain which may be used to produce a linear axial DC electric field along the length of a second portion of the first ion guide.

According to various embodiments a resistor chain as shown in FIG. 15B may be used to produce a linear axial field along the length of Step 1. Adjacent ring electrodes may have opposite phases of RF voltage applied to them.

Figure 15C:
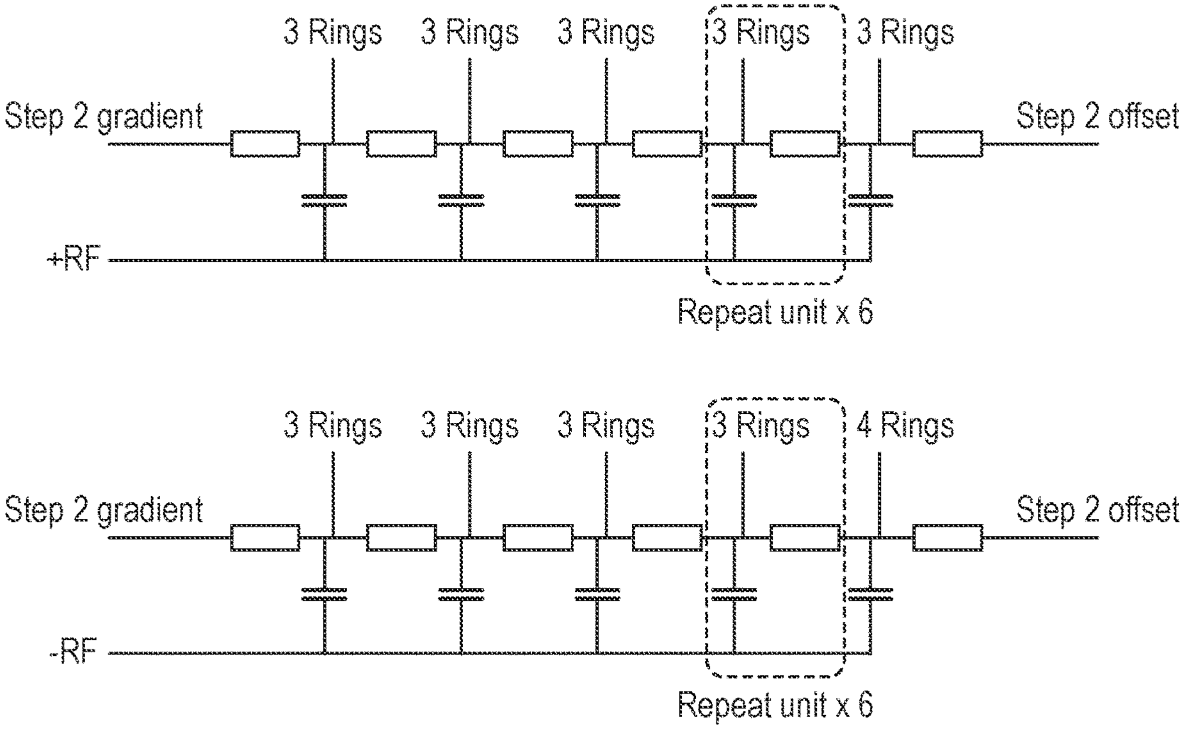

A resistor chain may also be used to produce a linear axial field along the length of Step 2 as shown in FIG. 15C. Adjacent ring electrodes may have opposite phases of RF voltage applied to them.

Embodiments are contemplated wherein the RF voltage applied to some or substantially all the ring and conjoined ring electrodes forming the first ion guide 301 may be reduced or varied in order to perform a non-mass to charge ratio specific attenuation of the ion beam. For example, as will be appreciated, with a Time of Flight mass analyser 304 the ion detector 307 may suffer from saturation effects if an intense ion beam is received at the pusher electrode 305. Accordingly, the intensity of the ion beam arriving adjacent the pusher electrode 305 can be controlled by varying the RF voltage applied to the electrodes forming the first ion guide 301. Other embodiments are also contemplated wherein the RF voltage applied to the electrodes forming the second ion guide 302 may additionally and/or alternatively be reduced or varied in order to attenuate the ion beam or otherwise control the intensity of the ion beam. In particular, it is desired to control the intensity of the ion beam as received in the pusher electrode 305 region.

FIG. 16A shows in more detail the quadrupole ion guide 302 according to various embodiments. The quadrupole rods may have a diameter of 6.0 mm and may be arranged with an inscribed radius of 2.55 mm. Aperture #2 plate which may comprise a differential pumping aperture may have a thickness of 0.5 mm and an orifice diameter of 1.50 mm. The various dimensions shown in FIG. 16A are intended to be illustrative and non-limiting.

The ion guide RF amplitude applied to the rod electrodes may be controllable over a range from 0 to 800 V peak-to-peak.

The ion guide RF voltage may have a frequency of 1.4 MHz. The RF voltage may be ramped linearly from one value to another and then held at the second value until the end of a scan.

As shown in FIG. 16B, the voltage on the Aperture #2 plate may be pulsed in an Enhanced Duty Cycle mode operation from an Aperture 2 voltage to an Aperture 2 Trap voltage. The extract pulse width may be controllable over the range 1-25 μs. The pulse period may be controllable over the range 22-85 μs. The pusher delay may be controllable over the range 0-85 μs.

FIG. 16C shows in more detail the pusher electrode arrangement. The grid electrodes may comprise Ø 60 parallel wire with 92% transmission (Ø 0.018 mm parallel wires at 0.25 mm pitch). The dimensions shown are intended to be illustrative and non-limiting.

Figure 16D:
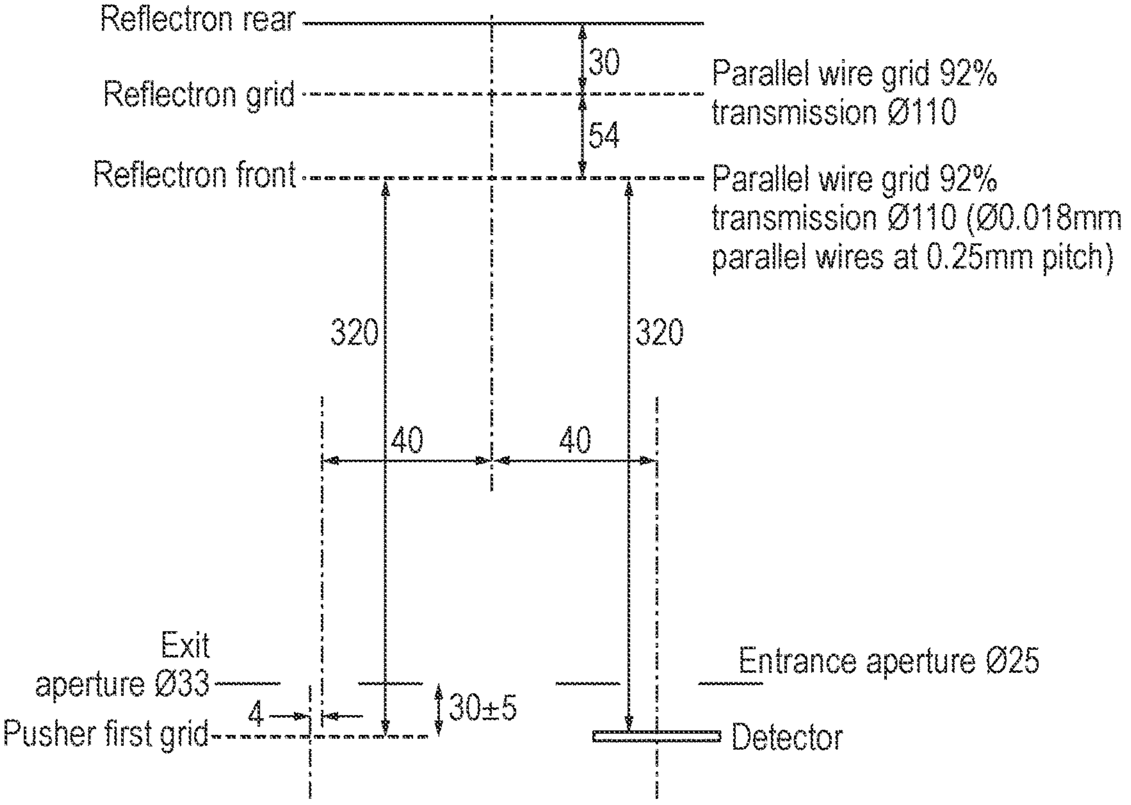
FIG. 16D illustrates in more detail the overall geometry of the Time of Flight mass analyser including the relative spacings of elements of the pusher electrode and associated electrodes, the reflectron grid electrodes and the ion detector.

FIG. 16D shows in more detail the Time of Flight geometry. The region between the pusher first grid, reflectron first grid and the detector grid preferably comprises a field free region. The position of the ion detector 307 may be defined by the ion impact surface in the case of a MagneTOF® ion detector or the surface of the front MCP in the case of a MCP detector.

The reflectron ring lenses may be 5 mm high with 1 mm spaces between them. The various dimensions shown in FIG. 16D are intended to be illustrative and non-limiting.

According to various embodiments the parallel wire grids may be aligned with their wires parallel to the instrument axis. It will be understood that the instrument axis runs through the source or first ion guide 301 through to the pusher electrode assembly 305.

A flight tube power supply may be provided which may have an operating output voltage of either +4.5 kV or −4.5 kV depending on the polarity requested.

A reflectron power supply may be provided which may have an operating output voltage ranging from 1625±100 V or −1625±100 V depending on the polarity requested.

Figure 16E:
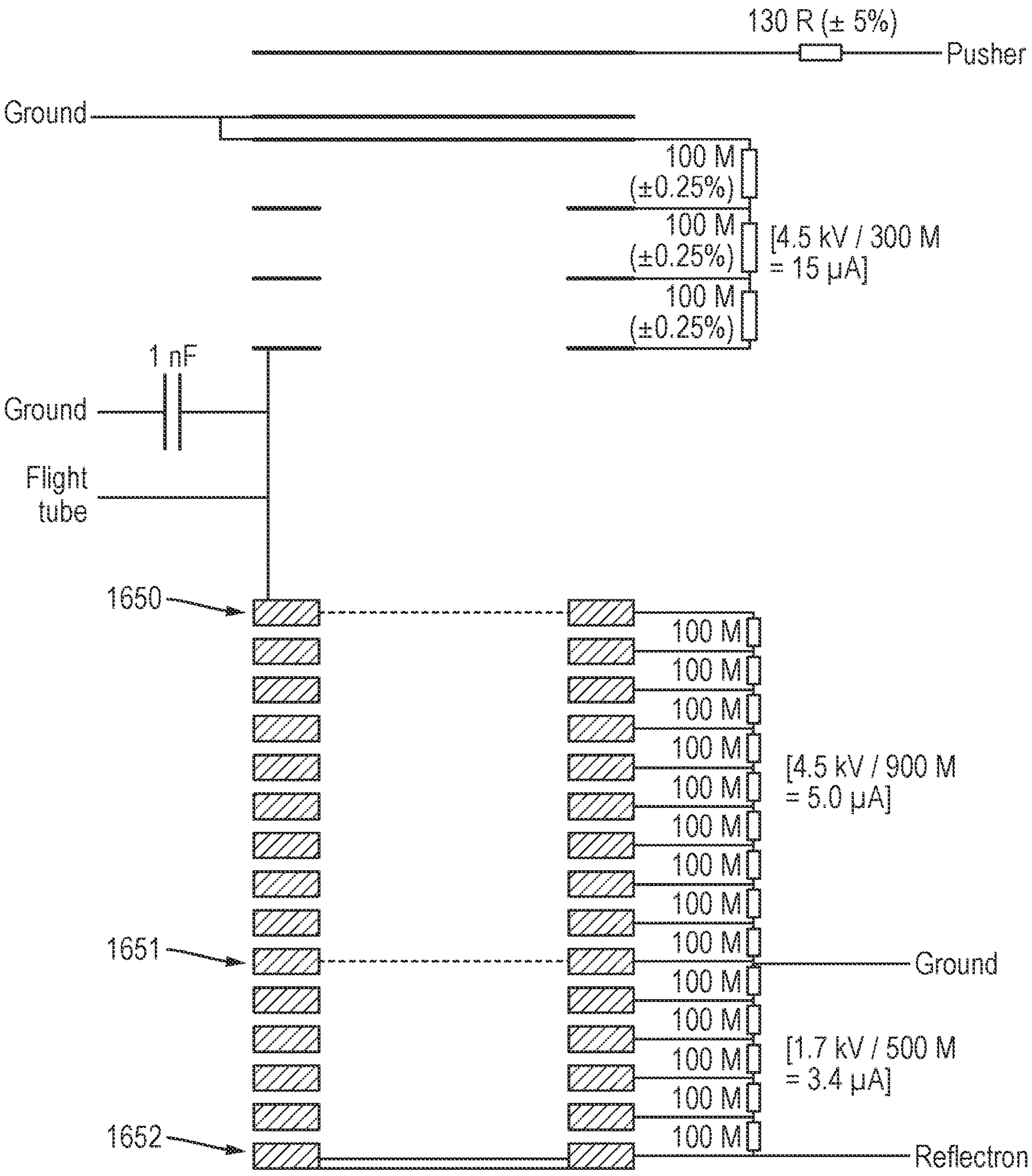
FIG. 16E is a schematic illustrating the wiring arrangement according to various embodiments of the pusher electrode and associated grid and ring electrodes and the grid and ring electrodes forming the reflectron.

FIG. 16E is a schematic of the Time of Flight wiring according to an embodiment. The various resistor values, voltages, currents and capacitances are intended to be illustrative and non-limiting.

According to various embodiments a linear voltage gradient may be maintained along the length of the reflectron 306. In a particular embodiment a reflectron clamp plate may be maintained at the reflectron voltage.

An initial electrode and associated grid 1650 of the reflectron 306 may be maintained at the same voltage or potential as the flight tube 807 and the last electrode of the pusher electrode assembly 305. According to an embodiment the initial electrode and associated grid 1650 of the reflectron 306, the flight tube 807 and the last electrode and associated grid of the pusher electrode assembly 305 may be maintained at a voltage or potential of e.g. 4.5 KV of opposite polarity to the instrument or mode of operation. For example, in positive ion mode the initial electrode and associated grid 1650 of the reflectron 306, the flight tube 807 and the last electrode and associated grid of the pusher electrode assembly 305 may be maintained at a voltage or potential of −4.5 kV.

The second grid electrode 1651 of the reflectron 306 may be maintained at ground or 0V.

The final electrode 1652 of the reflectron 306 may be maintained at a voltage or potential of 1.725 kV of the same polarity as the instrument. For example, in positive ion mode the final electrode 1652 of the reflectron 306 may be maintained at a voltage or potential of +1.725 kV.

It will be understood by those skilled in the art that the reflectron 306 acts to decelerate ions arriving from the time of flight region and to redirect the ions back out of the reflectron 306 in the direction of the ion detector 307.

The voltages and potentials applied to the reflectron 306 according to various embodiments and maintaining the second grid electrode 1651 of the reflectron at ground or 0V is different from the approach adopted in conventional reflectron arrangements.

The ion detector 307 may always be maintained at a positive voltage relative to the flight tube voltage or potential. According to an embodiment the ion detector 307 may be maintained at a +4 KV voltage relative to the flight tube.

Accordingly, in a positive ion mode of operation if the flight tube is maintained at an absolute potential or voltage of −4.5 kV then the detector may be maintained at an absolute potential or voltage of −0.5 kV.

FIG. 16F shows the DC lens supplies according to an embodiment. It will be understood that Same polarity means the same as instrument polarity and that Opposite polarity means opposite to instrument polarity. Positive means becomes more positive as the control value is increased and Negative means becomes more negative as the control value is increased. The particular values shown in FIG. 16F are intended to be illustrative and non-limiting.

Figure 16G:
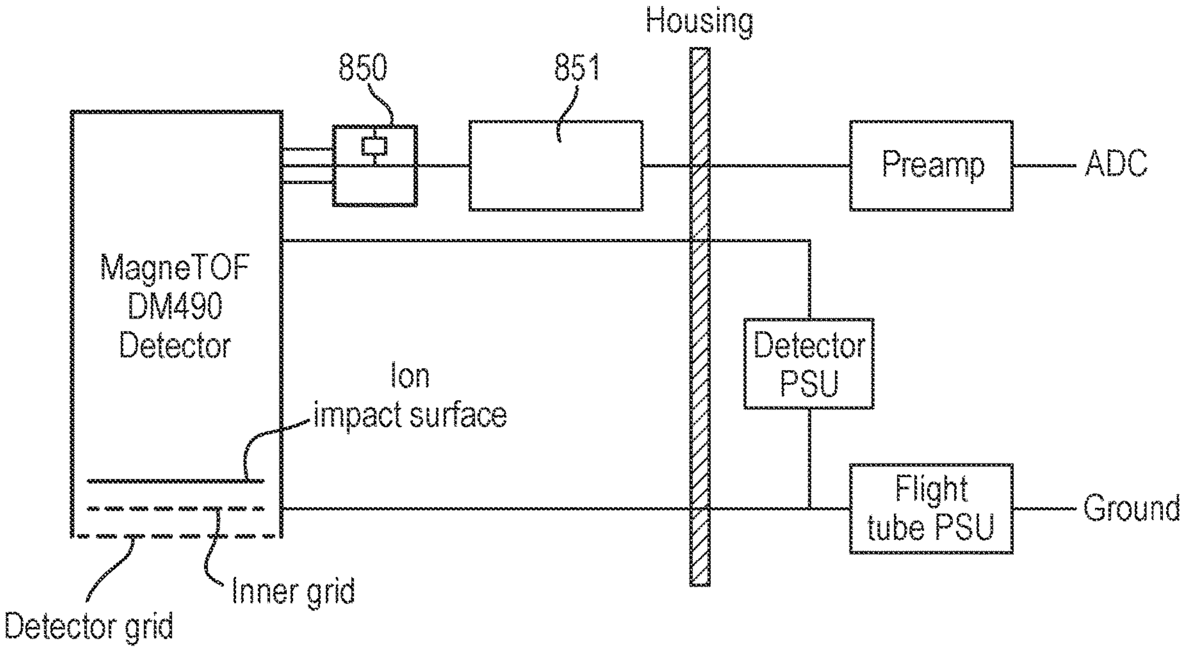
FIG. 16G is a schematic of an ion detector arrangement according to various embodiments and which shows various connections to the ion detector which are located both within and external to the Time of Flight housing and FIG. 16H shows an illustrative potential energy diagram.

FIG. 16G shows a schematic of an ion detector arrangement according to various embodiments. The detector grid may form part of the ion detector 307. The ion detector 307 may, for example, comprise a MagneTOF® DM490 ion detector. The inner grid electrode may be held at a voltage of +1320 V with respect to the detector grid and flight tube via a series of zener diodes and resistors. The ion detector 307 may be connected to a SMA 850 and an AC coupler 851 which may both be provided within or internal to the mass analyser housing or within the mass analyser vacuum chamber. The AC coupler 851 may be connected to an externally located preamp which in turn may be connected to an Analogue to Digital Converter ("ADC") module.

Figure 16H:
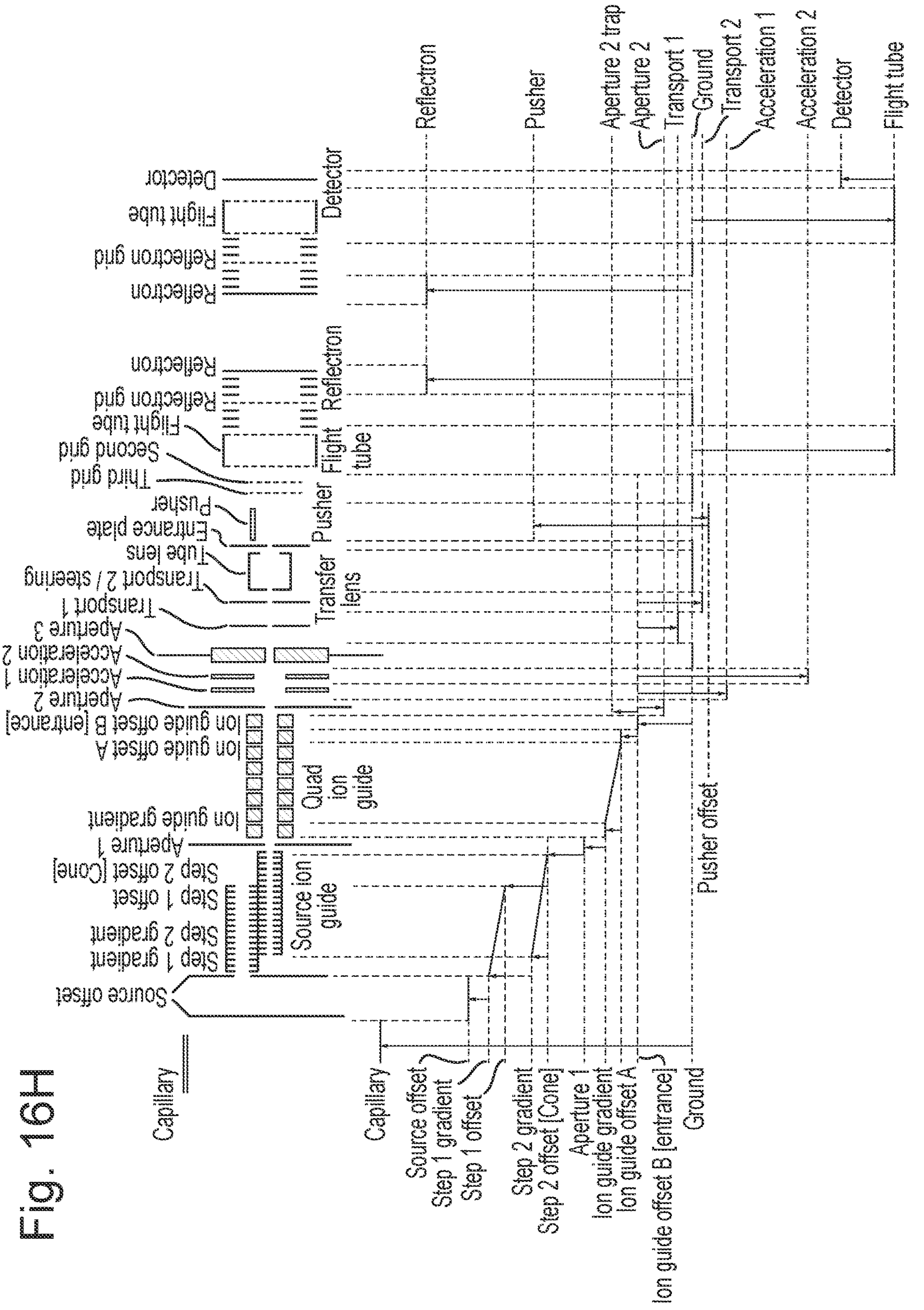

FIG. 16H shows a potential energy diagram for an instrument according to various embodiments. The potential energy diagram represents an instrument in positive ion mode. In negative ion mode all the polarities are reversed except for the detector polarity. The particular voltages/potentials shown in FIG. 16H are intended to be illustrative and non-limiting.

The instrument may include an Analogue to Digital Converter ("ADC") which may be operated in peak detecting ADC mode with fixed peak detecting filter coefficients. The ADC may also be run in a Time to Digital Converter ("TDC") mode of operation wherein all detected ions are assigned unit intensity. The acquisition system may support a scan rate of up to 20 spectra per second. A scan period may range from 40 ms to 1 s. The acquisition system may support a maximum input event rate of $7\times10^{6}$ events per second.

According to various embodiments the instrument may have a mass accuracy of 2-5 ppm may have a chromatographic dynamic range of $10^{4}$. The instrument may have a high mass resolution with a resolution in the range 10000-15000 for peptide mapping. The mass spectrometer 100 is preferably able to mass analyse intact proteins, glycoforms and lysine variants. The instrument may have a mass to charge ratio range of approx. 8000.

Instrument testing was performed with the instrument fitted with an ESI source 401. Sample was infused at a flow rate of 400 mL/min. Mass range was set to m/z 1000. The instrument was operated in positive ion mode and high resolution mass spectral data was obtained.

According to various embodiments the instrument may have a single analyser tune mode i.e. no sensitivity and resolution modes.

According to various embodiments the resolution of the instrument may be in the range 10000-15000 for high mass or mass to charge ratio ions such as peptide mapping applications. The resolution may be determined by measuring on any singly charged ion having a mass to charge ratio in the range 550-650.

The resolution of the instrument may be around 5500 for low mass ions. The resolution of instrument for low mass ions may be determined by measuring on any singly charged ion having a mass to charge ratio in the range 120-150.

According to various embodiments the instrument may have a sensitivity in MS positive ion mode of approx. 11,000 counts/second. The mass spectrometer 100 may have a mass accuracy of approx. 2-5 ppm Mass spectral data obtained according to various embodiments was observed as having reduced in-source fragmentation compared with conventional instruments. Adducts are reduced compared with conventional instruments. The mass spectral data also has cleaner valleys (<20%) for mAb glycoforms.

As disclosed in US 2015/0076338 (Micromass), the contents of which are incorporated herein by reference, the instrument according to various embodiment may comprise a plurality of discrete functional modules. The functional modules may comprise, for example, electrical, mechanical, electromechanical or software components.

The modules may be individually addressable and may be connected in a network. A scheduler may be arranged to introduce discrete packets of instructions to the network at predetermined times in order to instruct one or more modules to perform various operations. A clock may be associated with the scheduler.

The functional modules may be networked together in a hierarchy such that the highest tier comprises the most time-critical functional modules and the lowest tier comprises functional modules which are the least time time-critical. The scheduler may be connected to the network at the highest tier.

For example, the highest tier may comprise functional modules such as a vacuum control system, a lens control system, a quadrupole control system, an electrospray module, a Time of Flight module and an ion guide module. The lowest tier may comprise functional modules such as power supplies, vacuum pumps and user displays.

The mass spectrometer 100 according to various embodiments may comprise multiple electronics modules for controlling the various elements of the spectrometer. As such, the mass spectrometer may comprise a plurality of discrete functional modules, each operable to perform a predetermined function of the mass spectrometer 100, wherein the functional modules are individually addressable and connected in a network and further comprising a scheduler operable to introduce discrete packets of instructions to the network at predetermined times in order to instruct at least one functional module to perform a predetermined operation.

The mass spectrometer 100 may comprise an electronics module for controlling (and for supplying appropriate voltage to) one or more or each of: (i) the source; (ii) the first ion guide; (iii) the quadrupole ion guide; (iv) the transfer optics; (v) the pusher electrode; (vi) the reflectron; and (vii) the ion detector.

This modular arrangement may allow the mass spectrometer to be reconfigured straightforwardly. For example, one or more different functional elements of the spectrometer may be removed, introduced or changed, and the spectrometer may be configured to automatically recognised which elements are present and to configure itself appropriately.

The instrument may allow for a schedule of packets to be sent onto the network at specific times and intervals during an acquisition. This reduces or alleviates the need for a host computer system with a real time operating system to control aspects of the data acquisition. The use of packets of information sent to individual functional modules also reduces the processing requirements of a host computer.

The modular nature conveniently allows flexibility in the design and/or reconfiguring of a mass spectrometer. According to various embodiments at least some of the functional modules may be common across a range of mass spectrometers and may be integrated into a design with minimal reconfiguration of other modules. Accordingly, when designing a new mass spectrometer, wholesale redesign of all the components and a bespoke control system are not necessary. A mass spectrometer may be assembled by connecting together a plurality of discrete functional modules in a network with a scheduler.

Furthermore, the modular nature of the mass spectrometer 100 according to various embodiments allows for a defective functional module to be replaced easily. A new functional module may simply be connected to the interface. Alternatively, if the control module is physically connected to or integral with the functional module, both can be replaced.

FIG. 8 shows a schematic perspective view of an embodiment of the present invention, with some of the outer cover panels removed.

The spectrometer comprises an ion block 802 having an ion sampling cone arranged thereon, an orthogonal acceleration Time of Flight (TOF) mass analyser 807, and ion optics for transferring ions from the sampling cone to the TOF mass analyser. The ion optics for transferring ions from the sampling cone to the TOF mass analyser comprises a first ion guide 301, a second ion guide 302 and a transfer lens 303. The TOF mass analyser comprises a pusher assembly 805 for orthogonally accelerating ions, a flight tube, an ion mirror (i.e. reflectron) and an ion detector.

Figure 17:
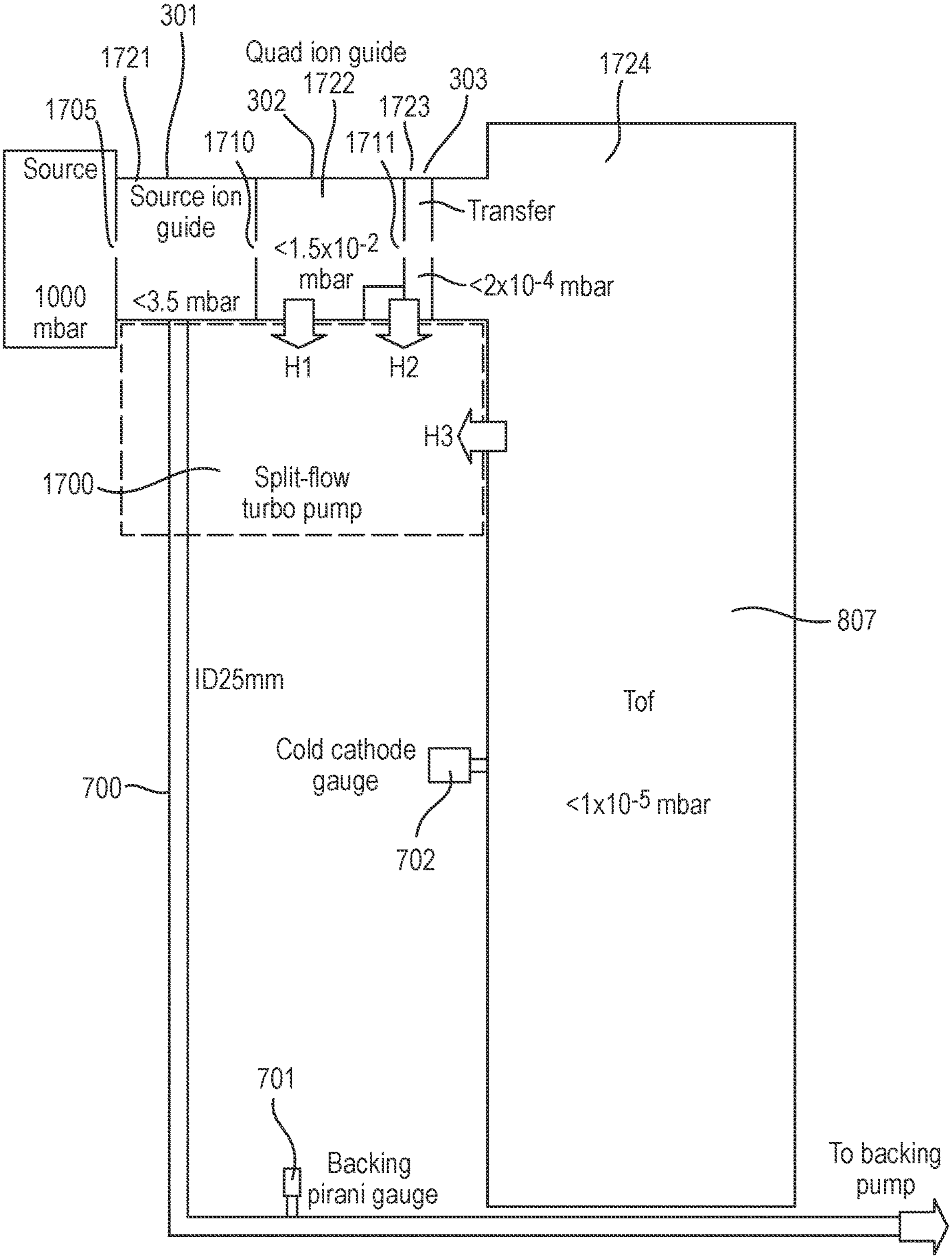
FIG. 17 schematically illustrates the vacuum chambers in the preferred embodiments.

As shown more clearly in the schematic of FIG. 17, the ion optics and TOF mass analyser are housed in vacuum chambers of a vacuum housing that, in use, are evacuated by gas pumps. More specifically, the first ion guide 301 is arranged in a first vacuum chamber 1721 that has the ion sampling cone and an apertured wall at its axial ends for allowing ions to pass therethrough. This first chamber 1721 may be evacuated, e.g. by a backing pump (or roughing pump), through gas line 700. The second ion guide 302 is arranged in a second vacuum chamber 1722 that has apertured walls 1710, 1711 at its axial ends for allowing ions to pass therethrough. This second vacuum chamber may be evacuated through gas port H1. The transfer lens 303 comprises an apertured electrode that forms a differential pumping aperture, thereby defining a third vacuum chamber 1723 and a fourth vacuum chamber 1724. The third vacuum chamber 1723 may be evacuated through gas port H2, and the fourth vacuum chamber 1724 may be evacuated through gas port H3. The transfer lens 303 may extend into both the third and fourth vacuum chambers 1723, 1724, for transferring ions into the pusher assembly 805 of the TOF mass analyser. In the depicted embodiment, the second, third and fourth vacuum chambers are evacuated by the same pump, which may be a split-flow turbopump 1700 connected to gas exhaust ports H1, H2, H3. However, it is contemplated that multiple pumps could be used to evacuate gas through the ports H1, H2, H3. FIG. 17 also schematically shows an ion source 300 located over the ion sampling orifice 1705.

FIG. 14B shows a schematic perspective view of the embodiment shown in FIG. 8, except from the opposite side. This view better illustrates the gas line 700 that is connected to the backing pump (not shown) for evacuating the first vacuum chamber 1721. The instrument also comprises a gas line 1401 between the turbopump 1700 and first vacuum chamber, such that the turbopump 1700 is in fluid communication with the backing pump via the gas line 1401 and first vacuum chamber. This allows the backing pump to pump down the pressure of the turbopump before the turbopump is activated.

As shown in FIG. 8, the vacuum housing has apertures arranged through its wall, proximate the ion optics, and printed circuit boards (PCBs) 801*a*, 801*b* are arranged in these apertures for providing electrical communications through the vacuum housing wall to the ion optics.

Figure 18:
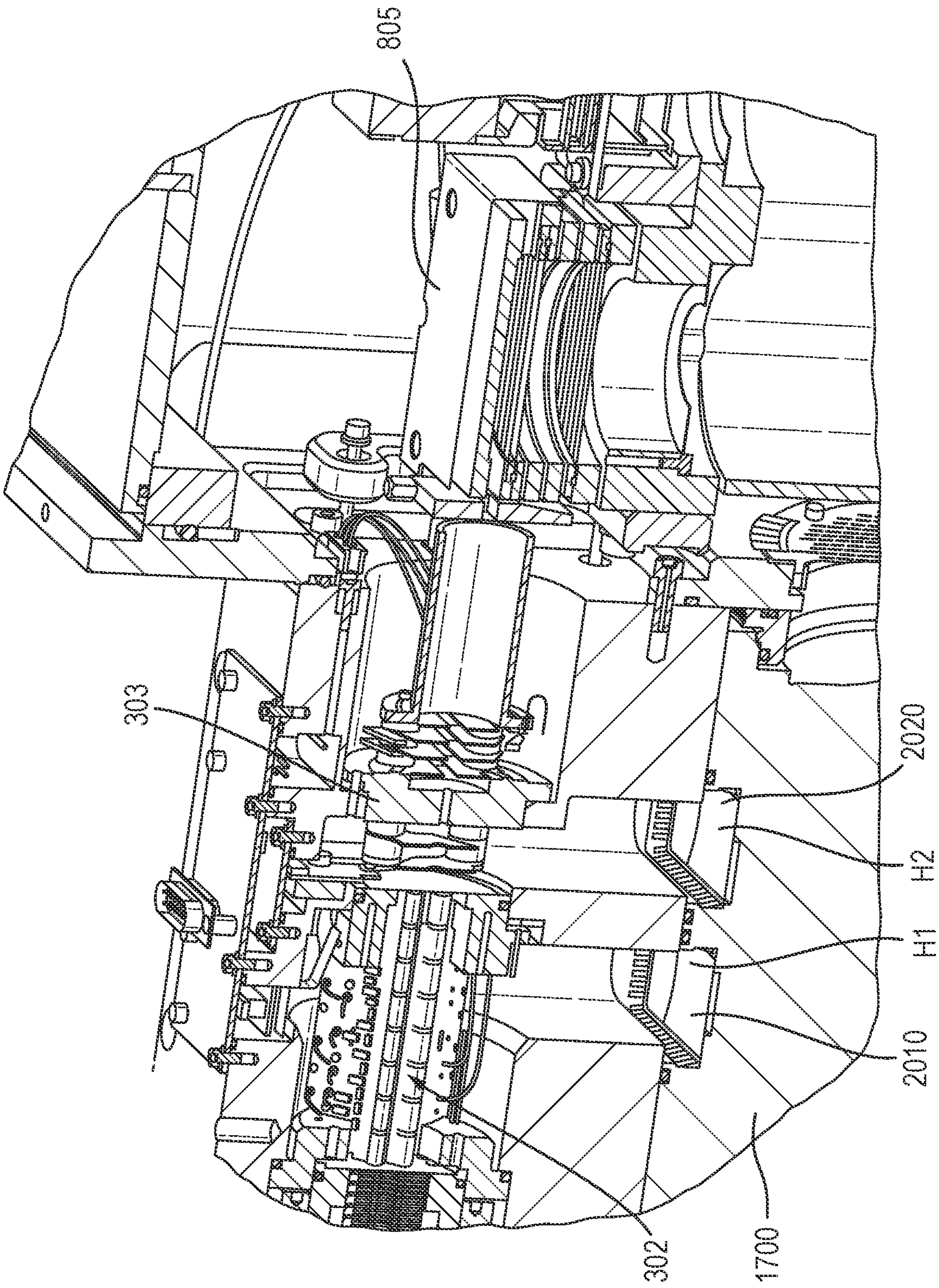
FIG. 18 shows a cross-sectional view through parts of the spectrometer shown in FIG. 8 and illustrate the ion optics in more detail.
Figure 19:
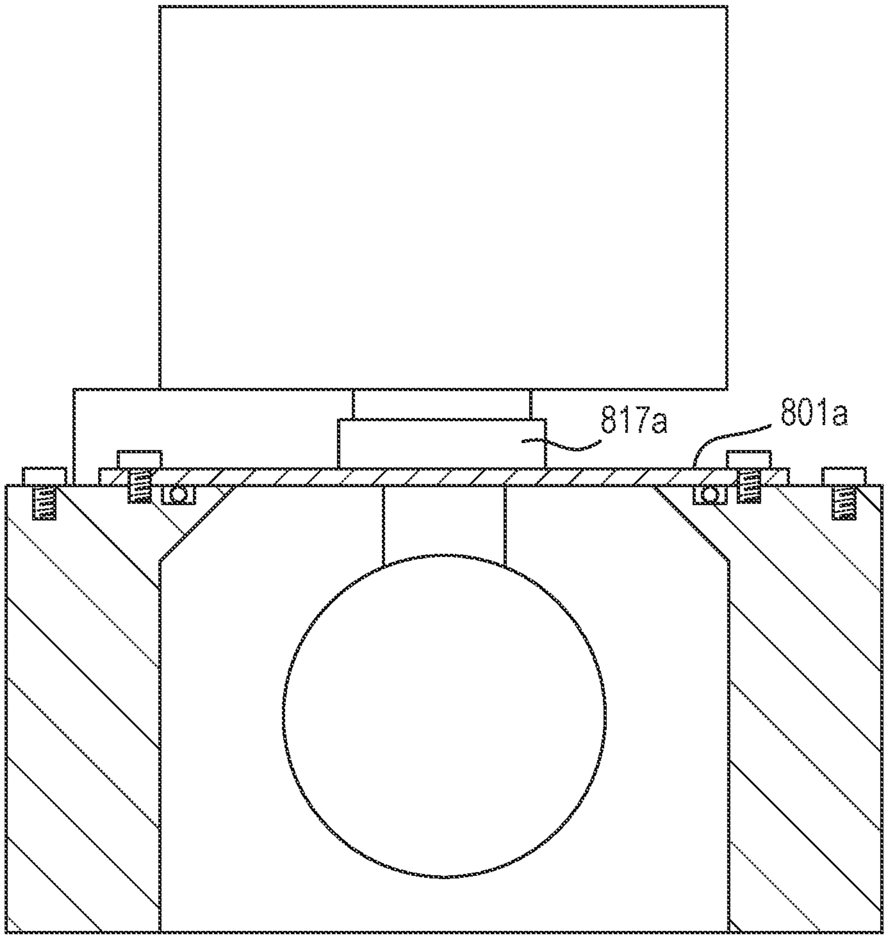
FIG. 19 shows a cross-sectional view through the embodiment at a point where a printed circuit board is located.

FIGS. 12B and 18 show schematic, cross-sectional views through parts of the spectrometer shown in FIG. 8 and illustrate the ion optics in more detail. More specifically, FIG. 12B shows the ion block 802, first ion guide 301, second ion guide 302 and transfer lens in more detail. FIG. 18 shows the second ion guide 302, transfer lens 303 and pusher assembly 805 of the TOF mass analyser in more detail. FIG. 19 shows a schematic cross-sectional view in the plane orthogonal to the longitudinal axis of the ion optics, and at a point where a PCB (such as 801*a*) is located.

The general operation of the spectrometer will now be described. In operation, the vacuum pumps are switched on, which evacuate gas from the vacuum chambers 1721, 1722, 1723, 1724 through the above described vacuum ports H1, H2, H3 until the vacuum chambers are at the desired pressure. More specifically, the backing pump may be activated so as to evacuate the first vacuum chamber 1721 and the turbopump via the gas line 700. The turbopump 1700 may then be activated so as to evacuate the second, third and fourth vacuum chambers 1722, 1723, 1724. As each vacuum chamber is pumped, the gas load decreases for successive vacuum chambers, in the downstream direction. The vacuum pumps may therefore cause the successive vacuum chambers to have successively decreasing gas pressures. This enables the TOF mass analyser to be maintained at the low pressure desired for TOF mass analysis. For example, the ion source 300 may be at around atmospheric pressure, the first vacuum chamber 1721 may be pumped down to around $1^{-10}$ mbar, the second vacuum chamber 1722 may be pumped down to around $10^{-2}$ mbar, the third vacuum 1723 chamber may be pumped down to around $10^{-4}$ mbar, and the fourth vacuum 1724 chamber may be pumped down to around $10^{-6}$ mbar. However, the chambers may be maintained at other pressures. As described above, an ion source 300 is arranged adjacent to the ion sampling cone. This may be an atmospheric pressure ion source such as an electrospray ion source, although ion sources of other types and/or that operate at other pressures may be used. The ion source outlet may be provided inside of an ion source housing (not shown), which may be secured over the ion sampling block so that the ion source is enclosed between the ion source housing and the ion block.

Ions generated from the ion source 300 pass towards and through the ion sampling orifice 1705 and into the first ion guide 301. RF voltages are applied to the electrodes of the first ion guide 301 so as to radially confine the ions therein. The first ion guide 301 guides ions along its longitudinal axis so that they pass through the aperture 1710 in the downstream wall of the first vacuum chamber 1721 and into the second ion guide 302 in the second vacuum chamber 1722. The first ion guide 301 may be configured in a manner that allows it to transmit ions through to the second ion guide 302, whilst allowing neutral or relatively large cluster species to be pumped out of the vacuum housing by the backing pump. As such, the ion sampling orifice 1705 may be made relatively large, enabling the sensitivity of the instrument to be relatively high. Modes are also contemplated in which the ions are fragmented, or are not fragmented, in the first ion guide 301. The form of the ion guide 301 will be described in more detail further below.

Ions transmitted by the first ion guide 301 pass into the second ion guide 302, which may be of any form, although a multiple rod set ion guide such as a quadrupole rod set ion guide is contemplated in the embodiments. RF voltages are applied to the electrodes of the second ion guide 302 so as to radially confine the ions therein. The second ion guide 302 may be segmented into a plurality of axial segments that are maintained at different DC voltages such that ions are urged through the second ion guide by a DC voltage gradient and towards aperture 1711 in the downstream wall of the second vacuum chamber 1722. The ions then pass through the aperture 1711 and into the transfer lens 303 arranged in the third vacuum chamber 1723. The ions are transmitted by the transfer lens 303 into the fourth vacuum chamber 1724 and into the pusher assembly 805 of the TOF mass analyser. The pusher assembly 805 is an orthogonal accelerator that receives the ions along a first dimension and which has electrodes 305 and a pulsed voltage supply that pulse the ions in a second dimension that is orthogonal to the first dimension, and into a field-free flight region inside the flight tube. The ions travel through the flight region and into the ion mirror 306 (i.e. reflectron), in which they are reflected back in the second dimension. The ions maintain a component of velocity in the first dimension and as such they are reflected back by the ion mirror 306 onto the ion detector 307 (see FIG. 3, for example). As is known to the skilled person, the ions separate according to their mass to charge ratio as they travel through the field-free region. The spectrometer is therefore able to determine the mass to charge ratio of a given ion from the duration of time that has elapsed between that ion being pulsed by the pusher assembly and the time that it has been detected at the ion detector.

Various components of the spectrometer will now be described in more detail.

Figure 20A:
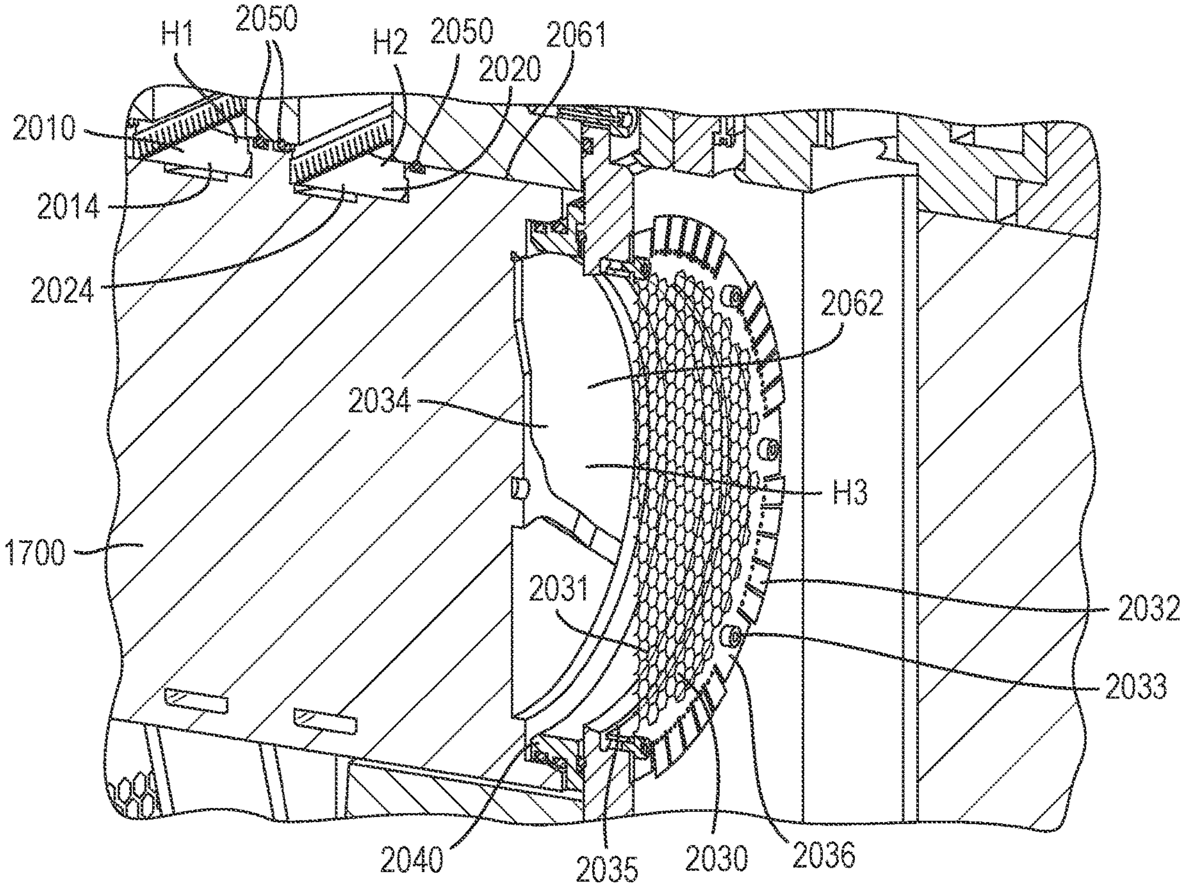
FIGS. 20A-20C show various gas conduits from the gas pump to the vacuum chambers of the spectrometer, according to an embodiment of the present invention.
Figure 20B:
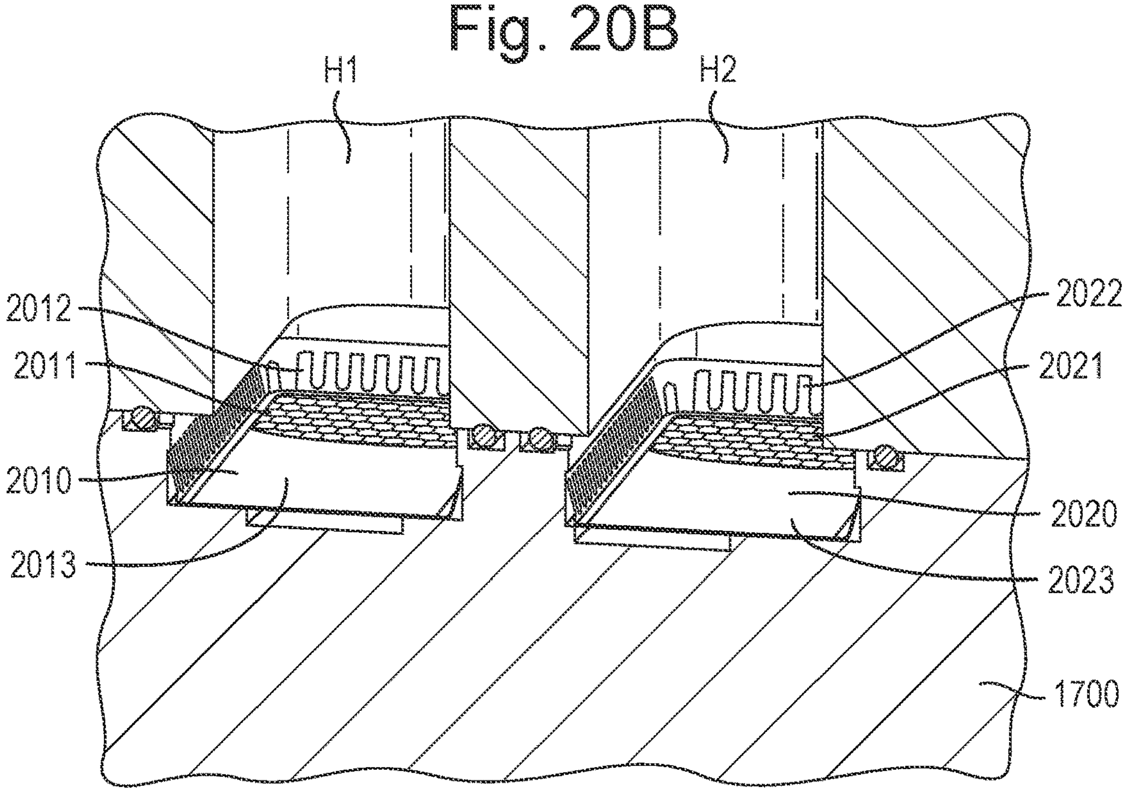
Figure 20C:
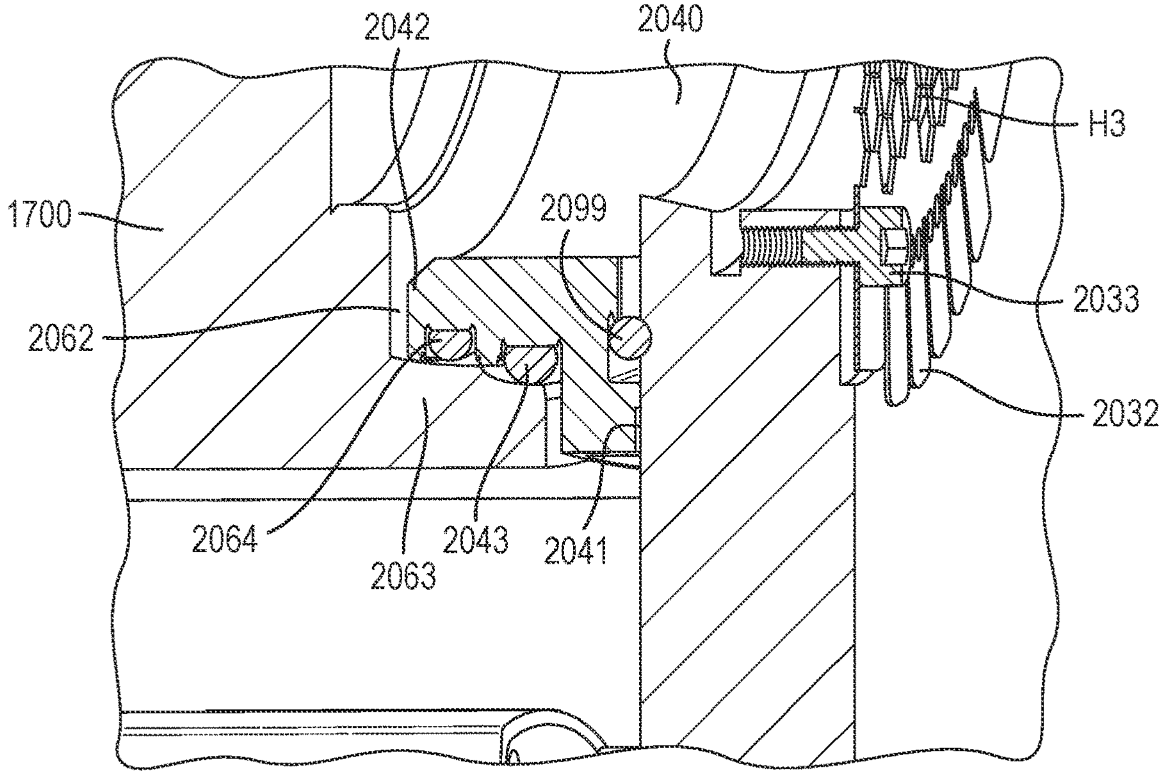

FIGS. 20A-20C schematically illustrate the gas conduits from the turbopump to the gas ports H1, H2. H3 that exhaust gas from the second, third and fourth vacuum chambers.

FIG. 20B illustrates the gas conduits from the turbopump to the gas ports H1, H2 that exhaust gas from the second and third vacuum chambers 1722, 1723 in more detail. Apertured covers 2010, 2020 are provided across the gas conduits for preventing solid objects from falling into the turbopump 1700 (e.g. during maintenance), or being drawn into the turbopump 1700. The covers 2010, 2020 may be meshes, or comprise one or more meshed portion. The covers 2010, 2020 may also have a non-meshed solid section 2013, 2023. The mesh 2011, 2021 may comprise apertures of any shape, including slots, that are sized and configured to allow the exhaust gas from the vacuum chambers therethrough, but catch solid objects moving towards the turbopump. For example, the mesh may be a gridded mesh, although other shaped apertures or slots may be provided. The covers 2010, 2020 may also be electrically conductive so as to provide electromagnetic shielding across the gas conduits. This prevents electromagnetic fields, such as RF fields from the ion guides or other electrodes or wires, from entering or leaving the turbopump through the gas conduits. This reduces or eliminates electrical pickup in the system, which may otherwise adversely affect the detector or other electrical components.

The covers 2010, 2020 may be arranged in their gas conduits such that they are substantially perpendicular to the longitudinal axis of their respective gas conduits. For example, the meshes 2011, 2021 may be horizontal.

The covers 2010, 2020 may be arranged anywhere in the gas conduits. In various embodiments the covers are arranged between the turbopump and the vacuum housing, for example, covering the inlet ports into the housing of the turbopump. This allows easy access to the covers by removal of the turbopump away from the vacuum housing, e.g. to expose the covers and retrieve objects that have fallen onto them. However, it is also contemplated that the covers may be arranged in other locations in the gas conduits, or that different covers may be arranged in different locations in the gas conduits. For example, one or more of the covers may be arranged over one or more of the gas ports in the vacuum chambers.

As described above, the covers 2010, 2020 have a main body comprising a mesh 2011, 2021 that is arranged across the gas conduit. The cover may also comprise a plurality of protrusions 2012, 2022 extending from at least part of its peripheral region. These protrusions may be elongated in a direction away from the main body of the cover, e.g. so as to form finger-portions. These protrusions may serve to hold the covers 2010, 2020 in place in the gas conduit, e.g. by contacting the turbopump housing and/or vacuum housing. The main body of the cover having the mesh may be substantially planar and extend in a first plane, whereas the protrusions may be substantially planar and extend in one or more other plane angled relative to the plane of the main body. This arrangement of protrusions allows, for example, the cover to be seated in a port (such as a port into the turbopump housing) without the cover falling into the port. The cover may have multiple sides and may have one or more protrusions extending from each side.

The multiple protrusions 2012, 2022 on each cover 2010, 2020 also provide multiple respective contact points between the cover and one or more other components of the spectrometer. For example, the protrusions may provide multiple contact points with the vacuum housing and/or turbopump housing. This ensures that electrical charges do not build up on the cover, even if one or some of the contact points provided by the protrusions are compromised. For example, the vacuum housing or turbopump may be grounded, thereby grounding the cover via the protrusions 2012, 2022. The multiple protrusions 2012, 2022 assist in maintaining the covers EMC compliant. The angled configuration of the protrusions 2012, 2022 also enables the covers to be fitted easily whilst making electrical contact with surrounding components.

FIG. 20A schematically illustrates a section of the gas conduit from the turbopump 1700 to the gas port H3 that exhausts gas from the fourth vacuum chamber 1724 in which the TOF mass analyser is housed. The cover 2030 provided across the gas conduit may be a mesh, or comprise one or more meshed portion. The covers may also have a non-meshed solid section. The mesh 2031 may comprise apertures and/or slots that are sized and configured to allow the exhaust gas from the vacuum chamber to pass therethrough to the turbopump. For example, the mesh may be a gridded mesh, although other shaped apertures or slots may be provided.

The cover 2030 may also be electrically conductive so as to provide electromagnetic shielding across the gas conduit. This prevents electromagnetic fields, such as RF fields from the ion guides or other electrodes or wires, from entering or leaving the turbopump through the gas conduit. This reduces or eliminates electrical pickup in the system, which may otherwise adversely affect the detector or other electrical components.

The cover 2030 may be arranged in its gas conduits such that it is substantially perpendicular to the longitudinal axis of the gas conduit. For example, the mesh 2031 may be vertical. The cover 2030 may be arranged anywhere in the gas conduit. In various embodiments the cover 2030 is arranged on the inner side of the vacuum housing, over an aperture 2035 therein. The cover 2030 may be secured to the housing with fixing members (e.g. screws or bolts 2033) that extend through a peripheral region 2036 of the cover 2030 and into the inner wall of the vacuum housing. The cover 2030 may therefore be sized so as to be larger than the aperture 2035 and have a peripheral region 2036 surrounding the aperture 2035 in the housing. The peripheral region 2036 may be a non-meshed portion (i.e. substantially solid), so that the fixing members may secured therethrough.

As described above, the cover 2030 has a main body comprising a mesh 2031 that is arranged across the gas conduit. The cover 2030 may also comprise a plurality of protrusions 2032 extending from at least part of its peripheral region 2036. These protrusions 2032 may be elongated in a direction away from the main body of the cover. e.g. so as to form finger-portions. The multiple protrusions 2032 on the cover provide multiple respective contact points between the cover and the vacuum housing. This ensures that electrical charges do not build up on the cover 2030, even if one or some of the contact points provided by the protrusions 2032 are compromised. For example, the vacuum housing may be grounded, thereby grounding the cover 2030 via the protrusions 2032. The multiple protrusions 2032 assist in maintaining the covers EMC compliant. The main body of the cover and the protrusions may be in substantially the plane.

The protrusions 2032 may be provided at the circumferential edge of the cover 2030 and the cover may have radial slots therein between at least some of the protrusions such that the protrusions 2032 are capable of flexing relative to each other. Additionally, or alternatively, the cover 2030 may have one or more slot or aperture arranged radially inwards and adjacent to each protrusion 2032, so as to allow the protrusion to flex relative to the main body of the cover. These features allow the protrusions to deform whilst the cover is being fitted over the exhaust port, whilst maintaining electrical contact with the vacuum housing wall.

The cover 2030 may have the same shape as the aperture 2035 in the wall, such being substantially circular, although other shaped meshes and apertures are contemplated.

As can be seen from FIG. 20A, the turbopump 1700 has a three-way split flow so as to draw gas from the three gas ports H1, H2, H3. The turbopump 1700 has two gas inlet ports 2014, 2024 on a first side 2061 of its housing for drawing gas through gas ports H1, H2 to evacuate the second and third vacuum chambers 1721, 1722, and an inlet gas port 2034 on a second side 2062 of the turbopump 1700 for drawing gas through gas port H3 to evacuate the fourth vacuum chamber 1724. Vacuum seals are provided for vacuum sealing the turbopump 1700 to the vacuum housing, around the gas conduits to the gas ports. Vacuum seals 2050 are provided at the boundary between the turbopump 1700 and the vacuum housing around the gas inlet ports H1, H2 to the turbopump 1700. However, a vacuum seal is not provided at the boundary directly between the turbopump and the vacuum housing around gas inlet port H3 to the turbopump. This is because the first and second sides 2061, 2062 of the turbopump are at right angles to each other and it is not possible to mount these two, angled sides of the turbopump directly against the two corresponding faces of the vacuum housing without pulling one of the sides against its corresponding face.

As can be seen from FIGS. 20A and 20C, in order to overcome this problem, a sealing adaptor member 2040 is provided between the second side 2062 of the turbopump 1700 and the vacuum housing for mounting the turbopump 1700 to the vacuum housing around gas inlet port H3. The adaptor member 2040 may be a tubular member (e.g. an annular member) having a first side 2041 for mounting against the vacuum housing and a second side 2042 for receiving the second side 2062 of the turbopump 1700 in a sealing manner. The conduit through the tubular sealing member 2040 allows the turbopump 1700 to pump gas through therethrough and out of the gas port H3 in the fourth vacuum chamber 1724. The first side 2041 of the adaptor member 2040 comprises a vacuum gasket seal 2099, such as a Viton rubber gasket seal, for mounting the adaptor member to the vacuum housing in a gas tight manner. The adaptor member may also be configured for receiving the turbopump 1700 on its second side 2042 in a manner that provides a dynamic seal between the turbopump 1700 and the conduit in adaptor member 2040. This dynamic seal enables the turbopump 1700 to be moved relative to the adaptor member 2040 during mounting of the turbopump against the vacuum housing, whilst ensuring that a vacuum seal is maintained therebetween. In other words, the dynamic seal provides a vacuum seal between the adaptor member 2040 and the turbopump over 1700 a range of different positions of the turbopump 1700 relative to the adaptor member 2040.

More specifically, the adaptor member 2040 may have a radially outer surface comprising a vacuum gasket seal 2064 (such as a Viton rubber gasket seal) arranged thereon and extending circumferentially around the adaptor member 2040. The turbopump 1700 may have a tubular flange 2063 protruding from its second side 2062 and extending circumferentially around the inlet port H3 to the turbopump. The flange may 2063 be sized and configured to be mounted around a circumferentially outer surface of the adaptor member such that a radially inner side of the flange 2063 contacts the gasket seal 2064 on the radially outer side of the adaptor member so as to form a vacuum seal. The inner surface of the tubular flange 2063 may taper outwardly in a direction towards the adaptor member 2040, i.e. the flange 2063 may have an inner diameter that increases as a function of direction towards the adaptor member.

The radially outer side of the adaptor member 2040 and the radially inner surface of the flange 2063 may be configured such that when the flange 2063 is arranged over the adaptor member 2040, the longitudinal axis through the flange 2063 may be pivoted with respect to the longitudinal axis through the adaptor member 2040. As such, the adaptor member 2040 may be mounted to the vacuum housing, and the flange 2063 of the turbopump 1700 axially mounted over the adaptor member 2040 whilst the longitudinal axis through the flange 2063 is angled with respect to the longitudinal axis through the adaptor member 2040. The turbopump 1700 may therefore be axially mounted over the adaptor member 2040 without the seals 2050 on the first side 2061 of the turbopump being dragged across the vacuum housing. When the turbopump 1700 is at its desired axial position, it may then be pivoted such that the seals 2050 on its first surface are in contact with the adjacent portion of the vacuum housing to form vacuum seals therewith.

In order to ensure electrical contact between the turbopump housing 1700 and adaptor member 2040, a compressible electrically conductive gasket 2043 is provided between these components. The conductive gasket 2043 may be resiliently compressible and may have an electrically conductive fabric or mesh over its core. The core may be foam or any other compressible material. The conductive gasket 2043 may also prevent electric fields from being transmitted through it. The conductive gasket may be provided, for example, on the radially outer surface of the adaptor member 2040 for contacting the flange 2063 of the turbopump. The conductive gasket may circumferentially surround the adaptor member 2040. In order to allow the dynamic sealing technique described above (e.g. the pivoting), the conductive gasket 2043 may comprise a resiliently compressible member such that it remains in contact with both the turbopump flange 2063 and adaptor member 2040 whilst these two components are moved relative to each other. This maintains electrical contact (and prevents electric fields passing) between the flange 2063 and adaptor member 2040 over a range of different positions of these components. The conductive gasket 2043 may comprise, for example, an electrically conductive material, such as fabric or knitted wire, over a compressible material such as foam.

Although the vacuum seals 2050 and conductive gasket 2043 have been described as being provided on one of two opposing surfaces, they may alternatively be on the other opposing surface. For example, the vacuum seals 2050 may be provided on the vacuum housing rather than on the first side of the turbopump or on the first side of the adaptor member. Alternatively, or additionally, the vacuum seal and/or conductive gasket may be provided on the turbopump flange 2063 rather than on the adaptor member 2040. It is also contemplated herein that the radially outer surface of the adaptor member is tapered instead of, or as well as, the turbopump flange.

The vacuum housing and other internal components of the spectrometer are mounted to a main chassis and metal cover panels are then arranged around the chassis so as to house the internal components. Conventionally, a large number of aesthetic fixing screws have been used to secure the metal cover panels to the main chassis. However, these screws represent a considerable cost per assembly and take some time to remove and reinstall.

Figure 21A:
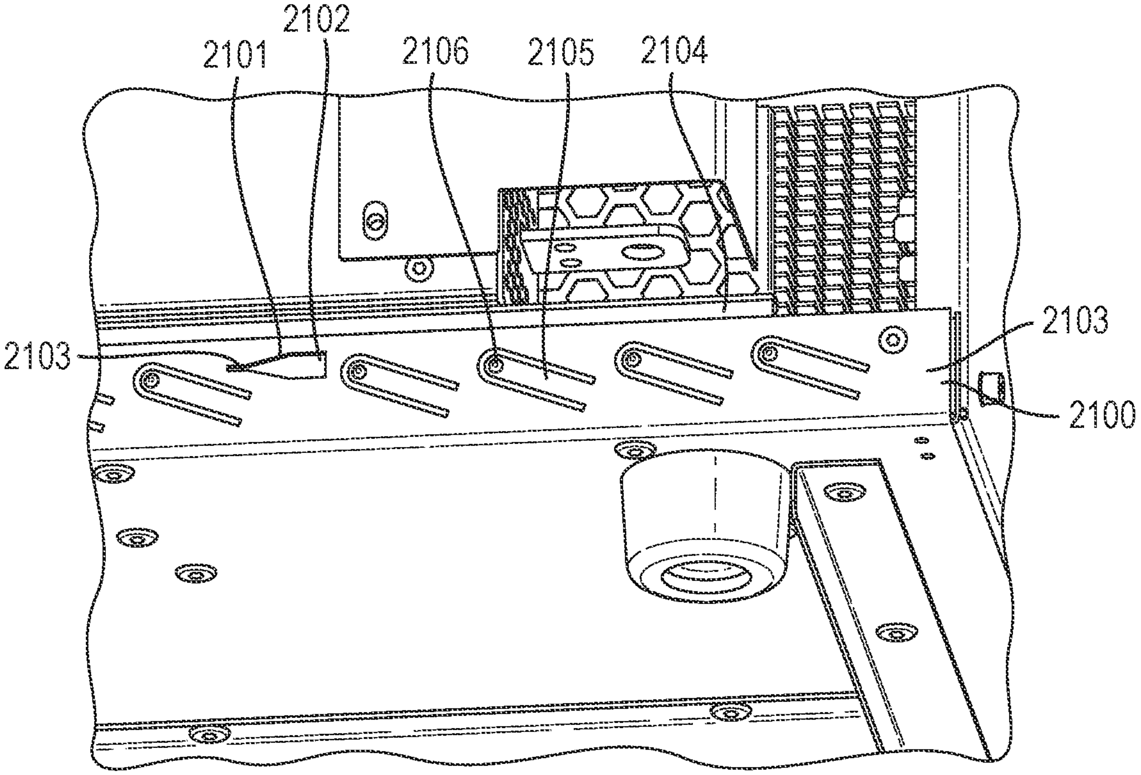
FIGS. 21A and 21B show a portion of the main chassis of the spectrometer and a portion of a cover panel, respectively, according to an embodiment of the present invention.
Figure 21B:
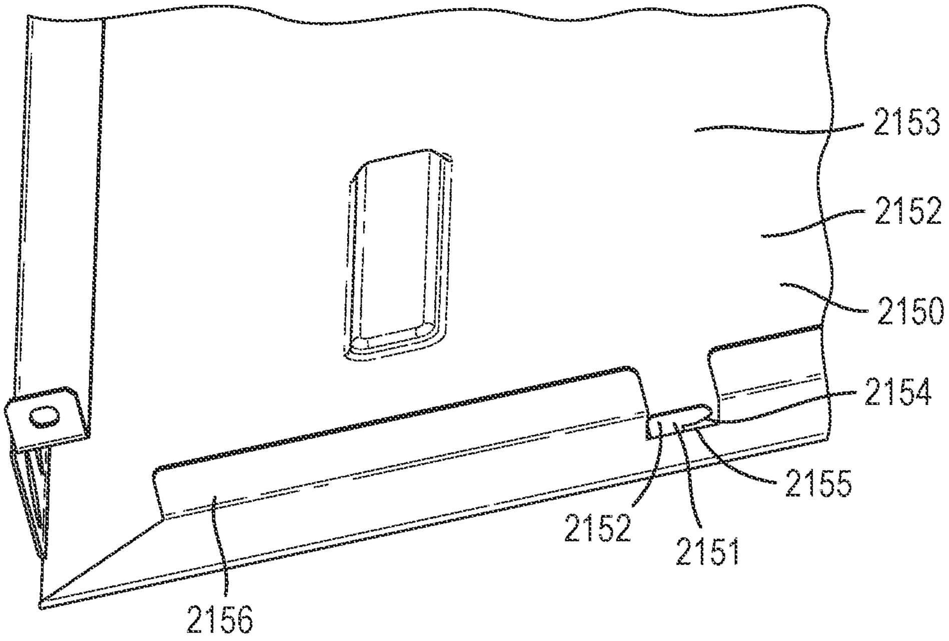

FIGS. 21A and 21B show a portion of the main chassis 2100 and a portion of a cover panel 2150, respectively, according to an embodiment of the present invention. The panel 2150 comprises a hook 2151 protruding inwardly from its internal surface 2152 and the chassis 2100 comprises a complementary slot 2101 that is arranged and configured to receive the hook 2151 therein. The hook 2151 has a projecting portion 2152 that protrudes away from the main body 2153 of the panel 2150 and that is connected to a distal end portion 2154 that is elongated and extends substantially parallel to the main body 2153. The slot 2101 may be elongated and may be dimensioned orthogonal to its longitudinal axis such that it tapers, or otherwise narrows, from a wider portion 2102 at one end to a narrower portion 2103 at the other end. The hook 2151 may have a thickness (in the dimension orthogonal to the longitudinal axis) that is about the same as the narrower portion 2103 of the slot 2101. This allows the hook 2151 to be inserted into the slot 2101 relatively easily at the wider end 2102, but when the hook 2151 is slid towards the narrower end 2101 of the slot, the projecting portion 2152 becomes confined by the narrower portion 2101 of the slot and held tight in the dimension orthogonal to the longitudinal axis. The distal end portion 2154 may be spaced from the main body 2153 of the cover by a distance that decreases as a function of direction towards the projecting portion 2152. The gap 2155 between the distal end portion 2154 of the hook and the main body 2153 of the panel, adjacent the projecting portion 2152 of the hook, may be about the same as the thickness of the chassis material in the portion at which the slot 2101 is located. As such, when the hook is slid relative to the slot, the configuration of the distal end 2154 of the hook pulls the panel 2150 close to the chassis 2100.

The panel 2150 may comprise one or more flange 2156 extending from its inner surface 2152 and substantially parallel to the hook 2151. The flange 2156 is arranged and configured to sit against a side 2104 of the beam 2103 on the chassis 2100 in which the slot 2101 is located. The distance between the flange 2156 and the hook 2151 may be substantially the same as the distance between the edge 2104 of the beam 2103 and the slot 2101. As such the flange 2156 may be placed against the side 2104 of the beam 2103 for guiding the hook 2151 into the slot 2101.

Although only a single hook 2151 and a single slot 2101 are shown, each cover panel 2150 may have multiple hooks and the chassis 2100 may have corresponding slots. When the slot and hooks are located such that they are elongated in the vertical direction, the slot may narrow as a function of the downwards direction and the hook may point down.

The use of such slots 2101 and hooks 2151 enables the number of fixings used to secure to the covers 2150 to the chassis 2100 to be reduced. As a result, the service time to remove the cover panels 2150 and the cost of the fixings are reduced.

In order to ensure that the cover panels 2150 remain electrically connected to the chassis 2100, e.g. for electrical grounding, the chassis is provided with electrical contacts 2105 that may flex inwards as the side panels 2150 are moved against them and secured to the chassis 2100. The flexible contacts 2105 ensure that electrical contact is maintained, but that the panels 2150 can be closed tight against the chassis beams 2103. Each chassis beam 2103 may have multiple such contacts 2105. The contacts may be provided by cut outs in the chassis beam that form tabs from the chassis beam material. For example, the cut-outs may be U-shaped so as to form a flexible tab having a free end 2106 for engaging the adjacent cover panel. The free end 2106 of the tab may be formed so as to be resiliently biased outwards and/or have a projection secured thereto for contacting the cover panel.

The instrument may use a multiple, single reference grounding system. Each electronic assembly may have only a single path to the chassis (e.g. at zero voltage reference), e.g. there is no deliberate chassis current. The ground reference wire may be short, providing minimum AC impedance between the circuit common and chassis.

The spectrometer may also comprise pre-amplification electronics for amplifying the ion signal from the ion detector of the TOF mass analyser, e.g. before the ion signal is processed by the analogue-to-digital converter. Conventionally, these pre-amplification electronics have been mounted in a bespoke casing having a lid formed from a conductive grid that prevents electric fields from entering or leaving the casing. However, such housings are relatively fragile, complex and difficult to access.

Figure 22A:
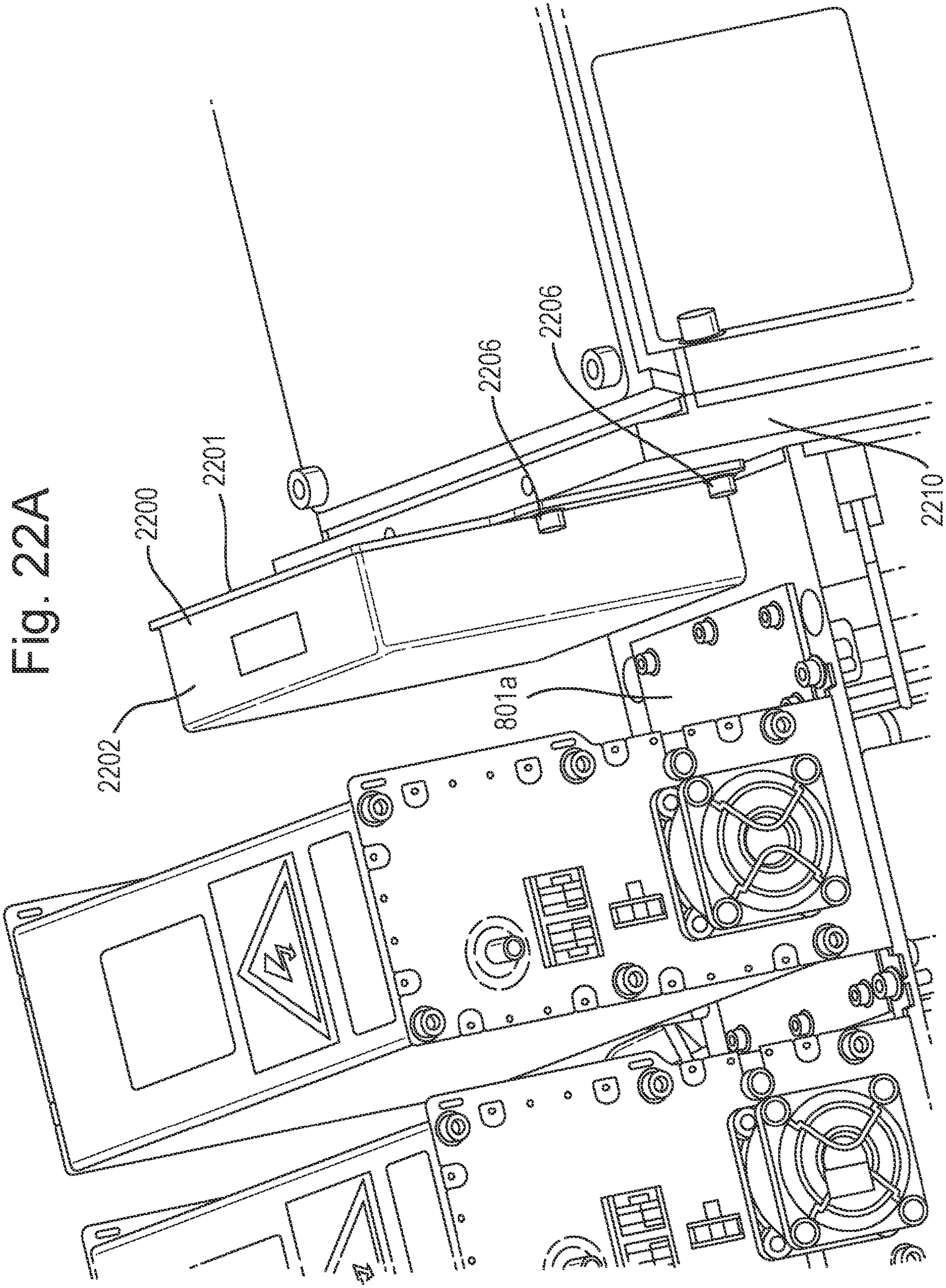
FIG. 22A shows part a spectrometer according to an embodiment of the present invention that includes a pre-amplification electronics module for amplifying the ion signal from the ion detector.
Figure 22B:
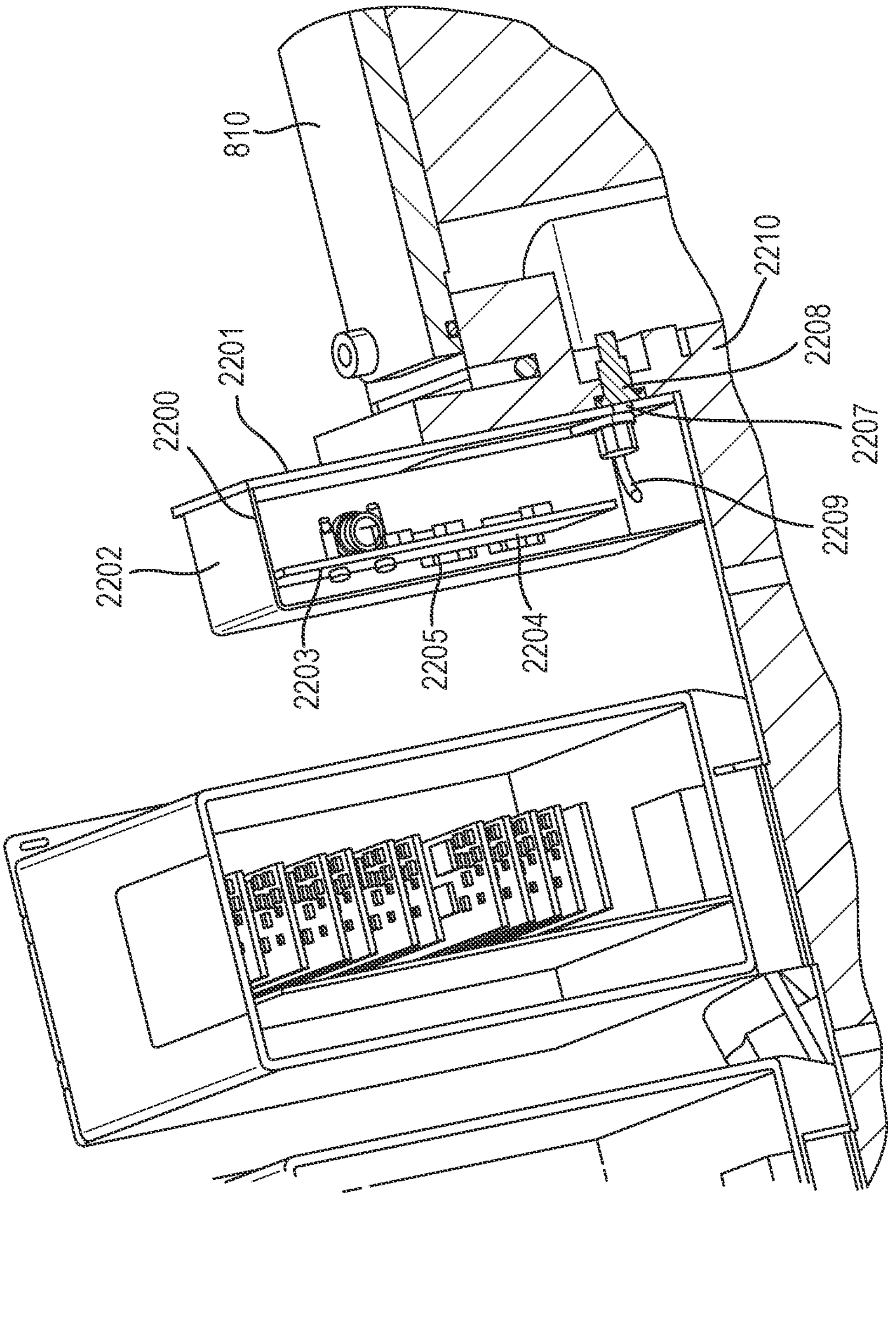
FIG. 22B shows a cross-sectional view through the part of the spectrometer shown in FIG. 22A.

FIG. 22A shows a schematic of part a spectrometer according to an embodiment of the present invention that includes a pre-amplification electronics module 2200 for amplifying the ion signal from the ion detector of the TOF mass analyser, e.g. before the ion signal is processed by the analogue-to-digital converter. FIG. 22B shows a cross-sectional view through the part of the spectrometer shown in FIG. 22A, and shows the interior of the pre-amplification electronics module 2200. As can be seen from FIGS. 22A-22B, the pre-amplification electronics module comprises a substantially planar base plate 2201 for mounting against the main housing 2210 of the spectrometer (e.g. the TOF mass analyser housing) and a box-cover 2202 for connection to the base plate 2201 such that the pre-amplification electronics 2203 are housed between the base plate 2201 and the box-cover 2202. The box-cover 2202 may be formed having walls made from conductive sheet metal so as to prevent electric fields from entering or leaving the module 2200. The box-cover 2202 may be removably connected to the base plate 2201 such that it is separable from the base plate 2201 in order to access the pre-amplification electronics 2203. The pre-amplification electronics 2203, such as a PCB 2204 and other electronic components, may be mounted to the interior of the box-cover 2202. This mounting may be performed with removable fixtures 2205 so that the electronics 2203 may be removed from the box-cover 2202 for maintenance.

The base plate 2201 and/or box cover 2202 may be mounted to the main housing 2210 by removable fixtures 2206 such that the base plate 2201 and/or box cover 2202 may be readily removed from the main housing 2210 and subsequently reinstalled.

Coincident apertures 2207, 2208 may be provided through the base plate 2201 and wall of the main housing 2210 such that electronic feed-through wires 2209 may be passed from the ion detector to the pre-amplification electronics 2203 inside the module 2200.

Although it has been described that the planar base plate 2201 is connected to the housing 2210 and a box-cover 2202 mounted to the base plate 2202 to define an enclosure therebetween, other embodiments are contemplated wherein the base-plate 2201 that is mounted to the housing 2210 is box-shaped and is mounted to the main housing 2210 with the interior of the box facing way from the main housing 2210. The cover 2202 of pre-amplification electronics module may then be substantially planar and connectable to the box-shaped base plate 2201 so as to form an enclosure therebetween that houses the pre-amplification electronics 2203.

It is also contemplated that the pre-amplification electronics 2203 may be mounted to the interior side of the base-plate 2201, rather than to the interior side of the cover 2202.

Although the pre-amplification electronics module 2200 has been described as having a cover 2202 and a base plate 2201, it is also contemplated that the wall of the main housing 2210 (e.g. the TOF mass analyser housing) may form the base-plate 2201 of the pre-amplification electronics module 2200 and that the box-cover 2202 may be mounted directly thereto.

As described above, the pre-amplification electronics module 2200 of the embodiments provides easy access to the pre-amplification electronics 2203 therein, and easy mounting and demounting of the pre-amplification electronics 2203. The structure of the module 2200 provides the required electromagnetic screening and also a relatively robust structure, whilst being easy to fabricate.

A pre-amplification electronics module 2200 has been described for housing pre-amplification electronics 2203. However, the form of the module 2200 is not limited for use for housing pre-amplification electronics 2203, and other electronic components of the spectrometer may be mounted inside corresponding modules that are in turn mountable, for example, to the main housing.

The pusher assembly 805 of the TOF mass analyser is required to be supplied with a high voltage for pulsing the ions into the time of flight region. The high voltage supply may be housed in a high voltage supply module arranged outside of the main housing 2210 and that is detachable from the main housing 2210. An aperture 2300 may then be provided in the main housing 2210, where the TOF mass analyser is located, for allowing an electrical feed-through from the high voltage supply module to the pusher assembly 805. A shielding gasket 2301 may be arranged around the aperture, as shown in FIG. 14B, for preventing electric fields from passing through the aperture. The high voltage supply module is not shown in FIG. 14B.

Figure 23A:
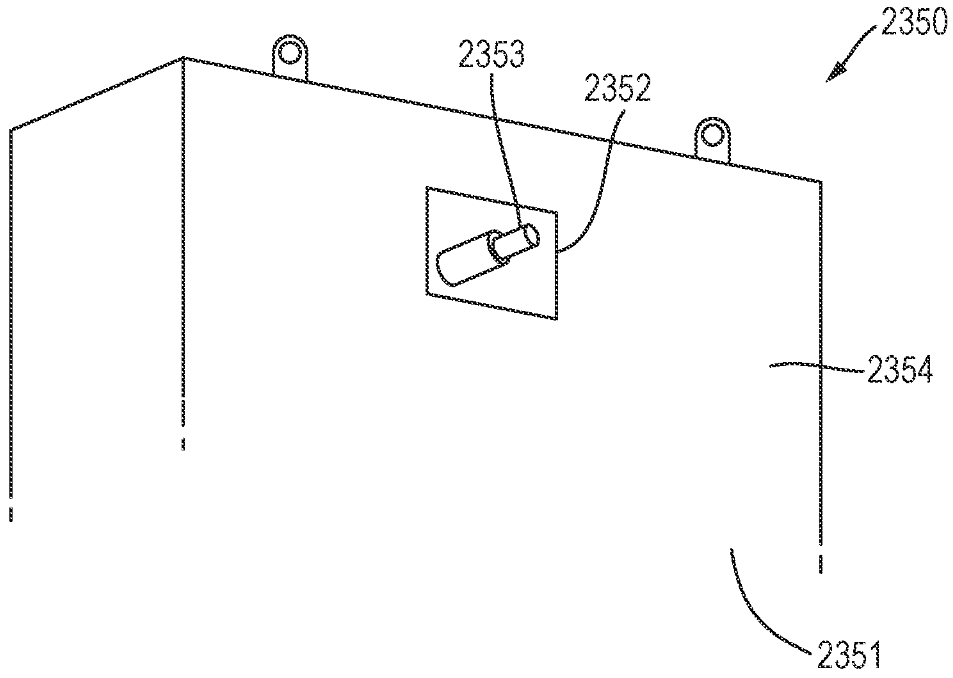
FIG. 23A shows a high voltage supply module according to an embodiment of the present invention for supplying a voltage to the TOF pusher assembly.

FIG. 23A shows a schematic of the high voltage supply module 2350 to be secured to the main housing 2210. The high voltage supply module 2350 comprises a casing 2351 for housing the high voltage supply and associated electronics, such as a PCB etc. A window 2352 is provided through the casing 2351 of the module 2350 in the side 2354 of the module 2350 that is connected to the main housing 2210. Located within the window 2352 of the high voltage supply module 2350 is a spring-loaded pin electrode 2353 for outputting the high voltage to the pusher assembly. In use, the high voltage supply module 2350 is mounted to the main housing 2210 such that the pin electrode 2353 contacts a feed through electrode arranged 2302 within the shielding gasket 2301.

Figure 23B:
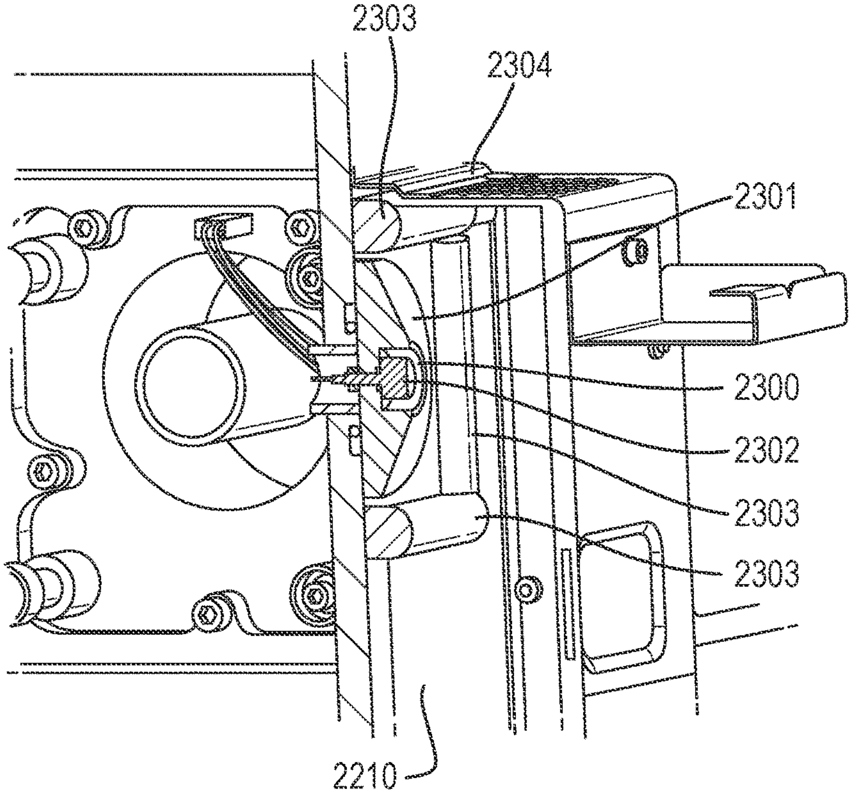
FIG. 23B shows a perspective, cross-sectional view of the portion of the instrument at which the high voltage supply module is connected.
Figure 23C:
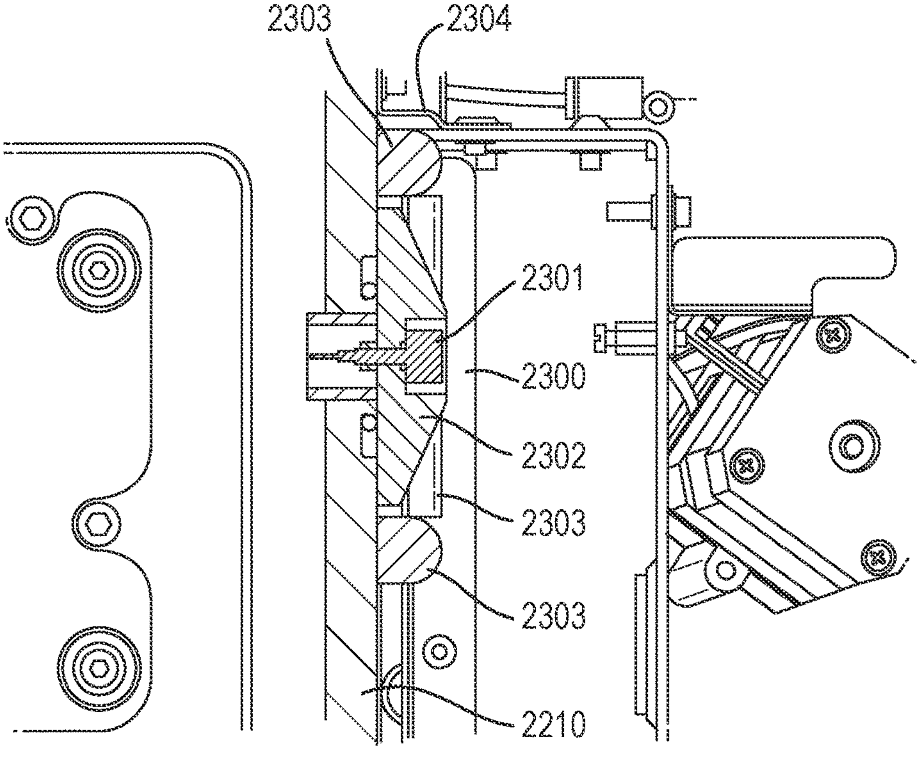
FIG. 23C shows a side cross-sectional view of the same portion.

FIG. 23B shows a perspective, cross-sectional view of the portion of the instrument at which the high voltage supply module 2350 is connected (although the internal components of the high voltage supply module are not shown for simplicity), and FIG. 23C shows a side cross-sectional view of the same portion. These views illustrate the shielding gasket 2301 arranged in and around the aperture 2300 through the main housing 2210 and also illustrate the feed-through electrode 2302 arranged within the shielding gasket 2301. The high voltage supply module 2350 is connected to the main housing 2210 such that the window 2352 in the casing 2351 of the high voltage supply module 2350 is arranged over the gasket 2301 in the main housing wall. The pin electrode 2353 of the high voltage supply module 2350 makes electrical contact with the electrode 2302 arranged within the gasket 2301 for transmitting the high voltage thereto. The pin electrode 2353 may be spring-loaded such that it is biased in a direction out of the window 2352 in the casing 2351 of the high voltage supply module 2350. This ensures that good contact is made between the pin electrode 2353 and the electrode 2302 arranged in the gasket 2301.

Further shielding gaskets 2303 are provided on the external wall of the main housing 1201 for contacting the casing 2351 of the high voltage supply module 2350 around the window 2352 therein. These shielding gaskets 2302 are arranged and configured such that when the high voltage supply module 2350 is secured to the main housing 2210, electric fields passing through the window 2352 in the module are confined.

Figure 23D:
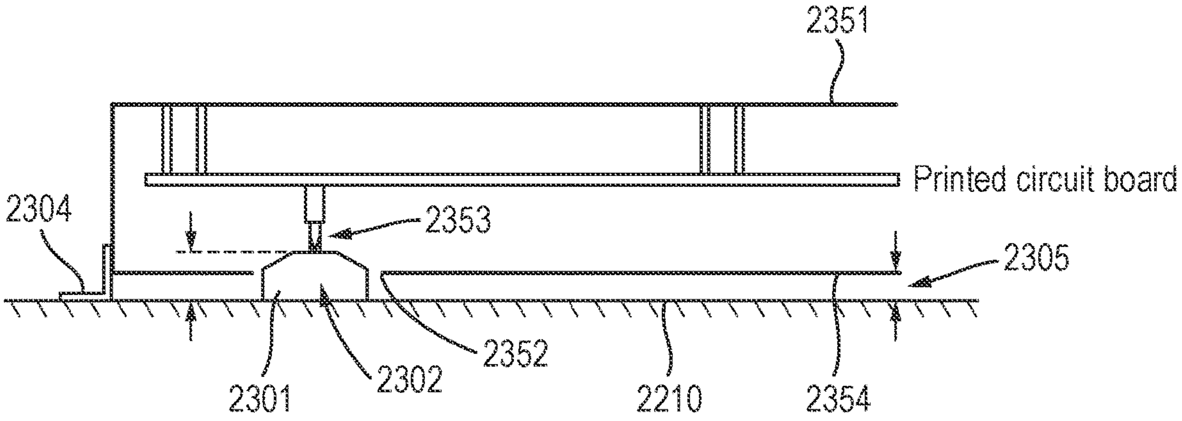
FIG. 23D shows a schematic cross-sectional view of the region at which the high voltage supply module is connected to the main housing.

FIG. 23D shows a schematic cross-sectional view of the region at which the high voltage supply module 2350 is connected to the main housing 2210. The high voltage supply module 2350 may be connected such that a gap 2305 is maintained between the wall of the main housing 2210 and the wall 2354 of the high voltage supply module 2250. This may be achieved using a mounting bracket 2304. Once the high voltage supply module 2350 is connected to the main housing 2210, the shielding gasket 2301 comprising the feed-through electrode 2302 protrudes through the window 2352 in the casing 2351 of the high voltage supply module 2350, compressing the pin electrode 2352 arranged therein. Electrical contact is thus made between the pin electrode 2352 and the feed-through electrode 2302 arranged in the gasket 2301. The high voltage supply module 2350 is therefore able to supply the required voltages, e.g. from its PCB, to the electrodes of the TOF pusher assembly.

The arrangement of the shielding gaskets 2301, 2303 on the main housing 2210 and the pin electrode 2353 in the window 2352 of the high voltage supply module 2350 enables the high voltage supply module 2350 to be electrically connected to and disconnected from the main housing 2210 relatively easily and quickly.

Although the present invention has been described with reference to preferred embodiments, it will be understood by those skilled in the art that various changes in form and detail may be made without departing from the scope of the invention as set forth in the accompanying claims.

The invention claimed is:

1. A mass spectrometer comprising:
- a vacuum housing;
- a gas pump arranged for evacuating gas from the vacuum housing; and
- an electrically conductive gasket arranged between the vacuum housing and the housing of the gas pump;
- wherein the electrically conductive gasket is compressible.

2. The spectrometer of claim 1, wherein at least the external surface of the electrically conductive gasket is an electrically conductive fabric or wire mesh.

3. The spectrometer of claim 1, wherein the electrically conductive gasket is resiliently compressible.

4. The spectrometer of claim 1, wherein the conductive gasket has a compressible foam core.

5. The spectrometer of claim 1, further comprising a vacuum gasket seal between the gas pump housing and the vacuum housing proximate the electrically conductive gasket.

6. The spectrometer of claim 1, wherein the vacuum housing has a first gas exhaust port in a wall thereof and the gas pump has a first gas inlet port for evacuating the vacuum housing through the first gas exhaust port; and wherein the spectrometer comprises an adaptor member arranged between the vacuum housing and the gas pump, wherein the adaptor member has a first side mounted to the vacuum housing about the first gas exhaust port and a second side mounted to the gas pump housing about the first gas inlet port.

7. The spectrometer of claim 6, comprising:
- a first vacuum sealing gasket arranged between the adaptor member and the vacuum housing for maintaining a vacuum seal therebetween and around the first gas exhaust port; and a second vacuum sealing gasket arranged between the adaptor member and the gas pump housing for maintaining a vacuum seal therebetween around the first gas inlet port.

8. The spectrometer of claim 7, wherein the first vacuum sealing gasket is arranged between the first side of the adaptor member and the vacuum housing and the second vacuum sealing gasket is arranged between the second side of the adaptor member and the gas pump housing.

9. The spectrometer of claim 6, wherein the conductive gasket is provided between the gas pump housing and the adaptor member.

10. The spectrometer of claim 6, wherein the adaptor member is a substantially tubular member having its axis therethrough substantially aligned with an axis through the first gas exhaust port and/or first gas inlet port; and the gas pump housing has a tubular flange arranged and configured to be mounted around the outside or inside of the tubular adaptor member.

11. The spectrometer of claim 10, wherein a vacuum sealing gasket is arranged between the tubular flange and tubular adaptor for maintaining a vacuum seal therebetween around the first gas inlet port.

12. The spectrometer of claim 11, wherein the vacuum sealing gasket, gas pump housing and adaptor member are configured so to enable the axis of the tubular flange to pivot relative to the axis of the tubular adaptor whilst maintaining the vacuum seal around the first gas inlet port.

13. The spectrometer of claim 12, wherein the compressible electrically conductive gasket is in contact with both the tubular flange and tubular adaptor and is compressible so as to enable the axis of the tubular flange to pivot relative to the axis of the tubular adaptor.

14. The spectrometer of claim 11, wherein the tubular flange extends from the main body of the pump housing to a distal end and has an internal diameter that increases as a function of distance towards the distal end, so as to allow the tubular flange to pivot relative to the axis of the tubular adaptor.

15. The spectrometer of claim 6, wherein the vacuum housing comprises a first vacuum chamber having the first gas exhaust port in a wall thereof and the first gas inlet port of the gas pump is for evacuating the first vacuum chamber through the first gas exhaust port; wherein the vacuum housing comprises a further vacuum chamber having a further gas exhaust port in a wall thereof and the gas pump has a further gas inlet port for evacuating the further vacuum chamber through the further gas exhaust port; wherein the first gas inlet port is arranged in a first side of the gas pump and the further gas inlet port is arranged in a second side of the gas pump; and wherein the gas pump is mounted to the vacuum housing such that said first gas inlet port is in fluid communication with the first gas exhaust port, and the further gas inlet port is in fluid communication with the further gas exhaust port.

16. The spectrometer of claim 15, wherein the first and second sides of the gas pump are substantially orthogonal to each other.

17. The spectrometer of claim 15, comprising a vacuum sealing gasket between the second side of the gas pump housing and the vacuum housing for vacuum sealing the gas pump housing to the vacuum housing around the further gas inlet port and further gas exhaust port.

18. A method of mass spectrometry comprising; providing the spectrometer as claimed in claim 1; and evacuating gas from the vacuum housing using the gas pump.

19. The method of claim 18, comprising mounting the gas pump to the vacuum housing, and compressing said conductive gasket during said mounting.

* * * * *